(12) United States Patent
Mercier

(10) Patent No.: US 12,182,495 B2
(45) Date of Patent: Dec. 31, 2024

(54) DISPLAY RENDERING METHOD AND SYSTEM

(71) Applicant: KOPPASOFT, Paris (FR)

(72) Inventor: Edouard Mercier, Chatou (FR)

(73) Assignee: KOPPASOFT, Paris (FR)

( * ) Notice: Subject to any disclaimer, the term of this patent is extended or adjusted under 35 U.S.C. 154(b) by 330 days.

(21) Appl. No.: 17/606,576

(22) PCT Filed: Dec. 17, 2018

(86) PCT No.: PCT/IB2018/060196
§ 371 (c)(1),
(2) Date: Oct. 26, 2021

(87) PCT Pub. No.: WO2019/123213
PCT Pub. Date: Jun. 27, 2019

(65) Prior Publication Data
US 2023/0367953 A1    Nov. 16, 2023

Related U.S. Application Data

(60) Provisional application No. 62/607,016, filed on Dec. 18, 2017.

(51) Int. Cl.
G06F 3/04845    (2022.01)
G06F 3/0485     (2022.01)
G06F 40/106     (2020.01)
G06F 40/117     (2020.01)

(52) U.S. Cl.
CPC ........ G06F 40/117 (2020.01); G06F 3/04845 (2013.01); G06F 3/0485 (2013.01); G06F 40/106 (2020.01)

(58) Field of Classification Search
CPC .. G06F 40/117; G06F 3/0485; G06F 3/04845; G06F 40/106
See application file for complete search history.

(56) References Cited

U.S. PATENT DOCUMENTS

| | | | |
|---|---|---|---|
| 7,415,666 B2* | 8/2008 | Sellers | G06F 3/0485 |
| | | | 715/251 |
| 9,262,036 B2* | 2/2016 | Nurse | G06F 40/143 |
| 9,348,496 B2* | 5/2016 | Lewis | G06F 3/0485 |

(Continued)

*Primary Examiner* — Anil K Bhargava
(74) *Attorney, Agent, or Firm* — WOMBLE BOND DICKINSON (US) LLP

(57) ABSTRACT

A method for generating a dynamic display rendering in a viewing area of a display of a smart device includes providing a main content from a source for display in the viewing area, displaying the main content, providing input data for causing a movement of the main content displayed in the viewing area, providing at least one alternative content distinct from the main content. In response to a substitution input variable in combination with substitution parameters embedded in the main content and associated with the alternative content, dynamically substituting for at least one element of the main content a modified element containing at least part of the alternative content, and displaying the main content with the modified element. Also provided is an associated system, smart device and digital content with application in particular to new types of image-related animations when scrolling through content.

19 Claims, 37 Drawing Sheets element scrolling percentage

(56) References Cited

U.S. PATENT DOCUMENTS

| | | | |
|---|---|---|---|
| 2006/0200764 A1* | 9/2006 | Sellers | G06F 3/0485 |
| | | | 715/251 |
| 2011/0035263 A1* | 2/2011 | Ramanathan | G06Q 30/02 |
| | | | 705/14.4 |
| 2014/0040423 A1* | 2/2014 | Goh | G06Q 30/0241 |
| | | | 709/217 |
| 2014/0040790 A1* | 2/2014 | Nurse | G06F 8/34 |
| | | | 715/762 |
| 2014/0089787 A1* | 3/2014 | Takami | G06F 16/986 |
| | | | 715/234 |
| 2014/0095514 A1* | 4/2014 | Filev | G06F 40/106 |
| | | | 707/748 |
| 2014/0122995 A1* | 5/2014 | Beckmann | G06F 16/957 |
| | | | 715/234 |
| 2015/0007101 A1* | 1/2015 | Lewis | G06F 3/0485 |
| | | | 715/784 |

\* cited by examiner

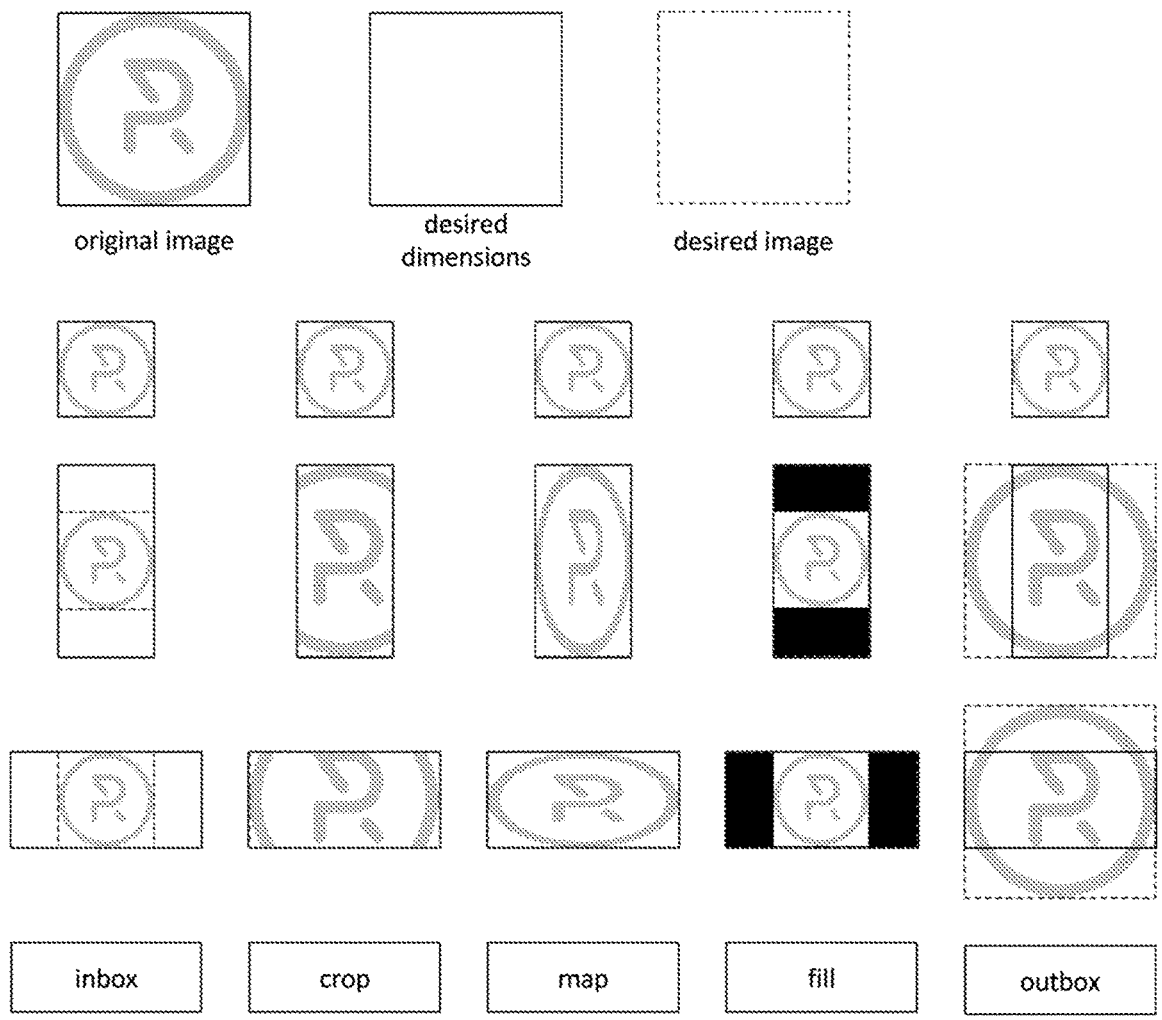
FIG. 1BIS
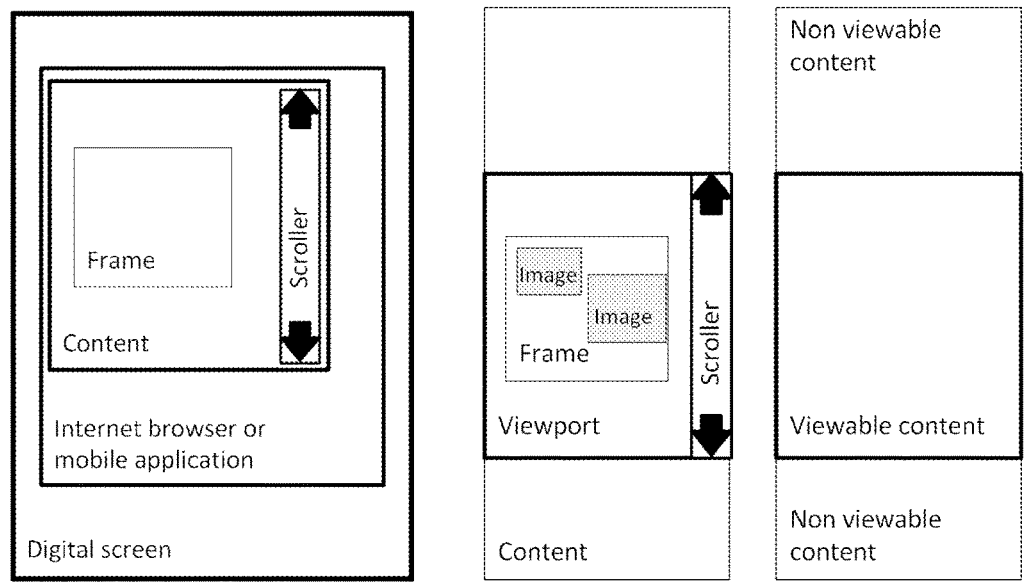
FIG. 2 element scrolling percentage element scrolling percentage computation when the element height is less than the viewport height

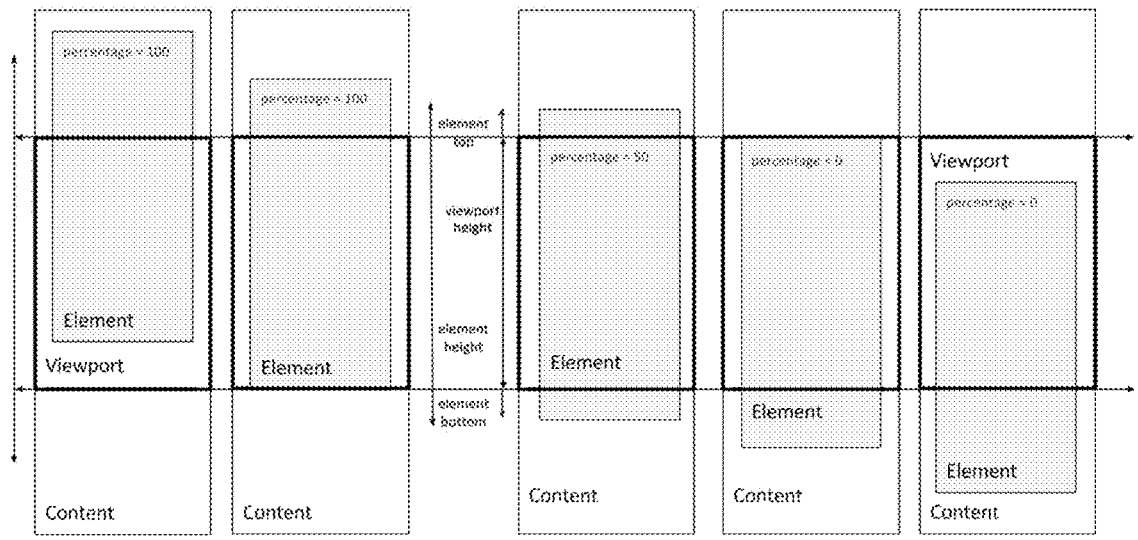
element scrolling percentage computation when the element height is greater than the viewport height
FIG. 7
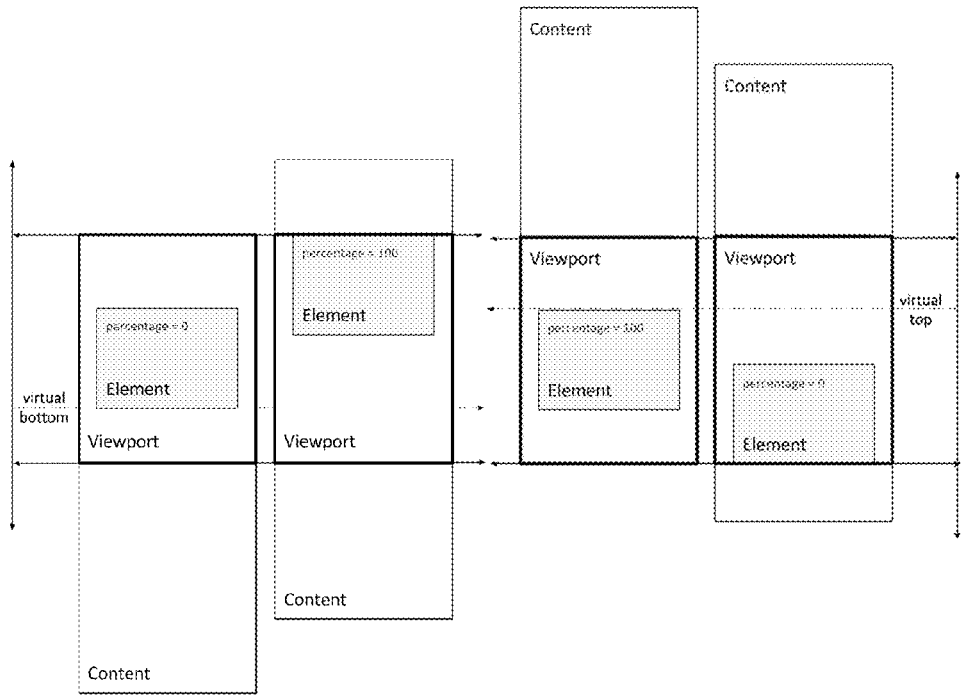
element scrolling percentage computation when its bottom edge cannot reach the viewport bottom
FIG. 8A
element scrolling percentage computation when its top edge cannot reach the viewport height
FIG. 8B element scroll-ranged percentage "loading" state workflow Overlay "display" state workflow Overfly "display" state workflow "extension" state workflow

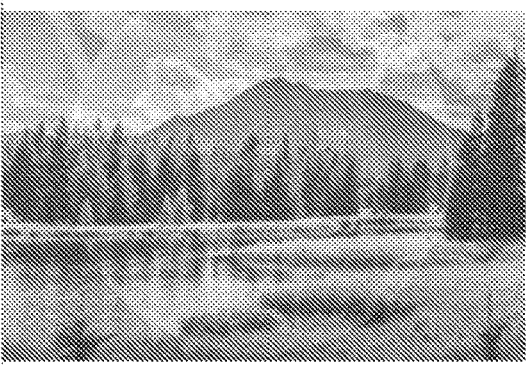
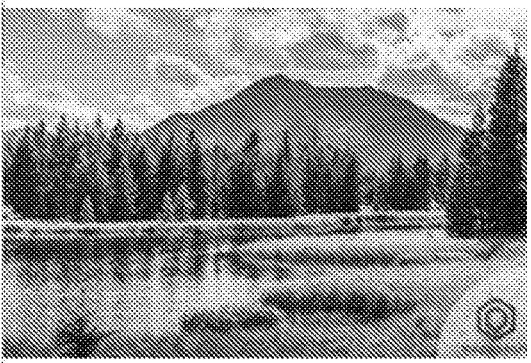
FIG. 20G　　　　　　　　　　FIG. 20H
FIG. 20I　　　　　　　　　　FIG. 20J

FIG. 21A  FIG. 21B
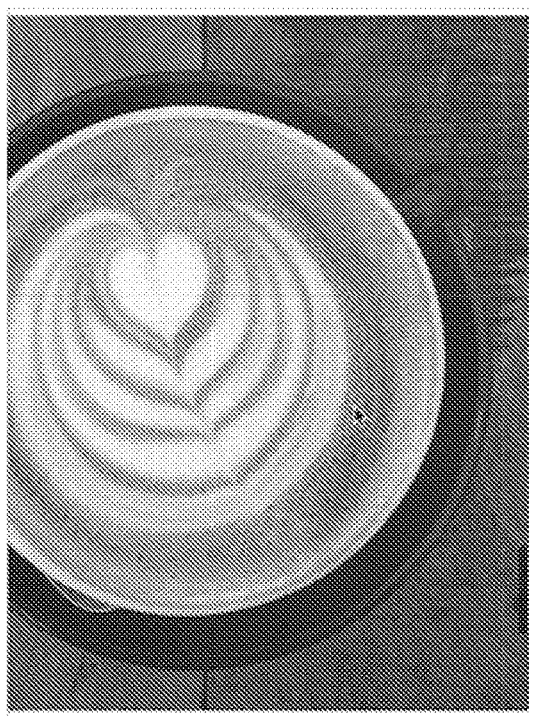
FIG. 21C  FIG. 21D $$P_{down}(c,r) = \sum P_{input}(i,j) * (count)$$
$$i \in [c \times factor, cmax = \text{Math.min}(width, (c+1) \times factor - 1]$$
$$j \in [r \times factor, rmax = \text{Math.min}(height, (r+1) \times factor - 1]$$

FIG. 24BIS

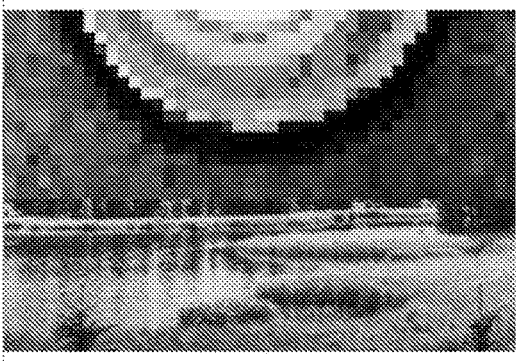
FIG. 27A
FIG. 27B
FIG. 27C
FIG. 27D

Overfly "display" state computation depending on the "scrollingPercentage"

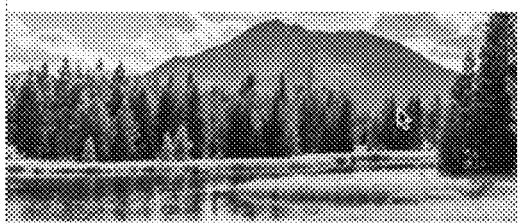
FIG. 31E
FIG. 31F
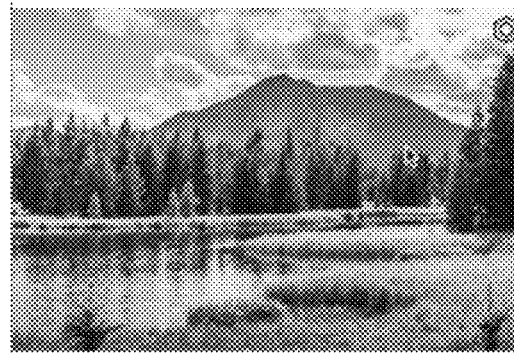
FIG. 31G
FIG. 31H

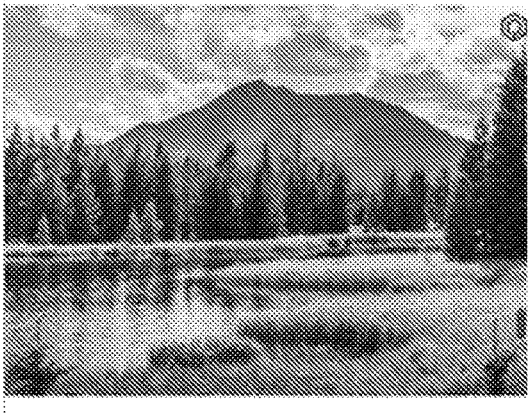
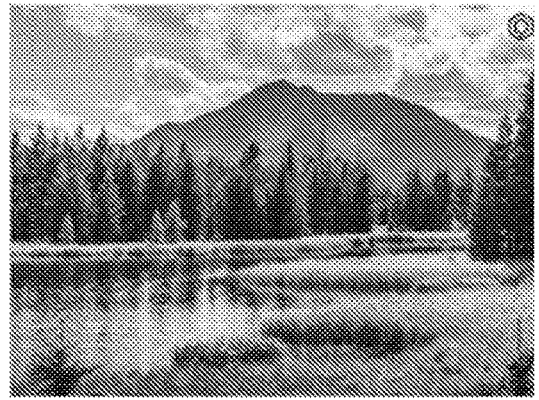
FIG. 32A
FIG. 32B
FIG. 32C
FIG. 32D

"extension" state workflow

DISPLAY RENDERING METHOD AND SYSTEM

FIELD OF THE INVENTION

This invention relates to the field of digital visual rendering ("user-experiences") based on images and video, and more particularly computer-implemented methods offering digital user experiences with animated images based on input information comprising end-user scrolling on a web page or a native mobile application, and/or device orientation in case of a smartphone, tablet or any device equipped with a gyroscope, and or user position detection.

BACKGROUND OF THE INVENTION

Various dynamic display renderings for image-containing contents on computer screens are known.

Certain techniques involve a certain treatment on an image in a content while it is located in the viewing area (typically a dedicated window or frame of the screen), herein after "viewports". For instance, it is known to generate a distinct scrolling effect in a displayed image, different from the whole content scrolling.

SUMMARY OF THE INVENTION

The present invention aims at expanding the dynamic display possibilities in such framework and also at allowing to make promotional contents accessible in an attractive but a mini-invasive manner.

To this end, it is provided according to a first aspect a method for generating a dynamic display rendering in a viewing area of a display of a smart device, comprising the following steps:
  providing a main content from a source for display in the viewing area,
  displaying said main content,
  providing input data for causing a movement of the main content displayed in the viewing area,
  providing at least one alternative content distinct from the main content,
  in response to a substitution input variable in combination with substitution parameters embedded in said main content and associated with said alternative content, dynamically substituting to at least one element of the main content a modified element containing at least part of said alternative content, and
  displaying said the main content with the modified element.

Preferred but optional features of the method include the following features, taken individually or in any technically-compatible features:
  said alternative content comprise at least one among a content element provided by a second source and a content element embedded in said main content.
  said alternative content comprises at least a still image or a set of animated images provided by a server being capable of resizing and/or reformatting said image(s).
  said element of the main content comprises a main image, and said dynamic substitution comprises a dynamic transition from said main image using at least part of said alternative content and based on the variations of the substitution variable.
  said dynamic transition relies on a dynamically changing alternative content.
  said substitution parameters comprise a transition type.
  said alternative content comprises at least one content particle.
  said particles belong to a group comprising still images, animated images, shapes and text.
  said alternative content comprises a plurality of content particles each having associated thereto its own set of substitution parameters.
  said substitution parameters comprise order values for dynamically transforming said particles in a given order.
  said substitution variable is derived from the current position of a given portion of the main content relative to the viewing area when the content moves inside the viewing area in response to input data.
  said element of the main content is an image or a pointer to an image, embedded in the main content.
  said dynamic substitution step comprises providing predetermined element substitutions for given values the substitution variable, and further comprises a step of interpolating between said predetermined element substitutions for an intermediate value of the substitution variable.
  said substitution parameters comprise at least one interpolation curve type.
  said substitution parameters comprise at least one rendering range, and wherein the method comprises a step of comparing the substitution variable with the range boundaries.
  said substitution variable is derived from data selected in a group comprising user input data and time data.
  the method comprises a step of selectively overriding a time-related substitution variable with a user input-related substitution variable.
  said user input data are selected in a group comprising data for content scrolling, user position or motion data, and smart device position or motion data caused by a user.
  said user input data comprise content scrolling data, said alternative content comprises a video content, and said dynamic substitution comprises scrubbing through said video content in response to variation of the substitution variable.
  said main content comprises a marked-up content such as an HTML content.
  said substitution parameters are embedded in said marked-up content in association with at least one image tag (<IMG>) of the element in said main content.
  the dynamically substitution step comprises an initial step of substituting to said image tag an image content tag (<CANVAS>) inside which the dynamic substitution is performed.
  said dynamic substitution step is performed by a dedicated rendering program package downloaded from a source associated with the main content.

According to a second aspect, it is provided a system for dynamic display rendering, comprising:
  a source for providing a main content,
  a source for providing an alternative content distinct from the main content,
  a smart device in communications with said sources and having a display defining a viewing area,
  a display processor for displaying and moving the main content in the viewing area in response to input data, said smart device further comprising a rendering engine adapted, in response to a substitution input variable in combination with substitution parameters embedded in said main content, to dynamically substitute to at least one element of said main content a modified element containing at least part of said alternative content, for display by means of said display processor.

Preferred but optional features of the system include the following features, taken individually or in any technically-compatible features:

said alternative content comprise at least one among a content element provided by a second source and a content element embedded in said main content.

said alternative content comprises at least a still image or a set of animated images provided by a server being capable of resizing and/or reformatting said image(s).

said element of the main content comprises a main image, and said rendering engine is capable of generating a dynamic transition from said main image using at least part of said alternative content and based on the variations of the substitution variable.

said dynamic transition relies on a dynamically changing alternative content.

said substitution parameters comprise a transition type.

said alternative content comprises at least one content particle.

said particles belong to a group comprising still images, animated images, shapes and text.

said alternative content comprises a plurality of content particles each having associated thereto its own set of substitution parameters.

said substitution parameters comprise order values for dynamically transforming said particles in a given order.

said substitution variable is derived from the current position of a given portion of the main content relative to the viewing area when the content moves inside the viewing area in response to input data.

said element of the main content is an image or a pointer to an image, embedded in the main content.

said rendering engine is capable of performing a dynamic substitution that depends on said transition animation type and that varies gradually with the display feature value.

said rendering engine is capable, from predetermined element substitutions for given values the substitution variable, of interpolating between said predetermined element substitutions for an intermediate value of the substitution variable.

said substitution parameters comprise at least one interpolation curve type.

said substitution parameters comprise at least one rendering range, and wherein the method comprises a step of comparing the substitution variable with the range boundaries.

said substitution variable is derived from data selected in a group comprising user input data and time data.

the rendering engine is capable of selectively overriding a time-related substitution variable with a user input-related substitution variable.

said user input data are selected in a group comprising data for content scrolling, user position or motion data, and smart device position or motion data caused by a user.

said user input data comprise content scrolling data, said alternative content comprises a video content, and said dynamic substitution comprises scrubbing through said video content in response to variation of the substitution variable.

said main content comprises a marked-up content such as an HTML content.

said substitution parameters are embedded in said marked-up content in association with at least one image tag (<IMG>) of the element in said main content.

said rendering engine is capable of substituting to said image tag an image content tag (<CANVAS>) inside which the dynamic substitution is performed.

said rendering engine is a dedicated rendering program package downloaded from a source associated with the main content.

It is further provided a smart device with display rendering capability, said device being capable of communicating with a source for providing a main content and a source for providing an alternative content, comprising a display defining a viewing area, a display processor for moving the main content display in the viewing area in response to input data, and a rendering engine adapted, in response to a substitution variable in combination with substitution parameters embedded in said main content, to dynamically substitute to at least one element of the main content a modified element containing at least part of said alternative content, for display by said display processor.

This device can be further featured for defining a system as defined above, including in a non-limiting manner its optional features.

It is also provided a marked-up digital content, containing at least one displayable element or a pointer to such element, and associated thereto, at least a description of, and/or pointer to, an alternative digital content and a set of substitution parameters, for use by a smart device as defined above for generating therein a dynamic substitution of said content.

In preferred but non-limiting aspects:

said substitution parameters comprise a substitution type and substitution rendering parameters.

said substitution parameters are contained in a tagged area associated with the displayable element.

BRIEF DESCRIPTION OF THE DRAWINGS

Other features, aims and advantages of the present invention will appear more clearly from the following detailed description of a preferred embodiment thereof.

In the drawings:

FIG. 2 illustrates how different display-related entities involved in the present invention are connected to each other, FIGS. 6 to 8 illustrates the computation of an element scrolling percentage in certain specific conditions, FIGS. 21A-21F illustrate different display renderings in a "horizontal overlay" user experience, FIGS. 27A-27M illustrate different display renderings in a "vertical overfly" user experience, FIGS. 31A-31K illustrate different display renderings in a "vertical understitial" user experience, FIGS. 32A-32D illustrate different display renderings in a "horizontal understitial" user experience, FIGS. 36A-36F illustrate different display renderings in a "scravelling" user experience,

DETAILED DESCRIPTION OF PREFERRED EMBODIMENTS

Figure 1:
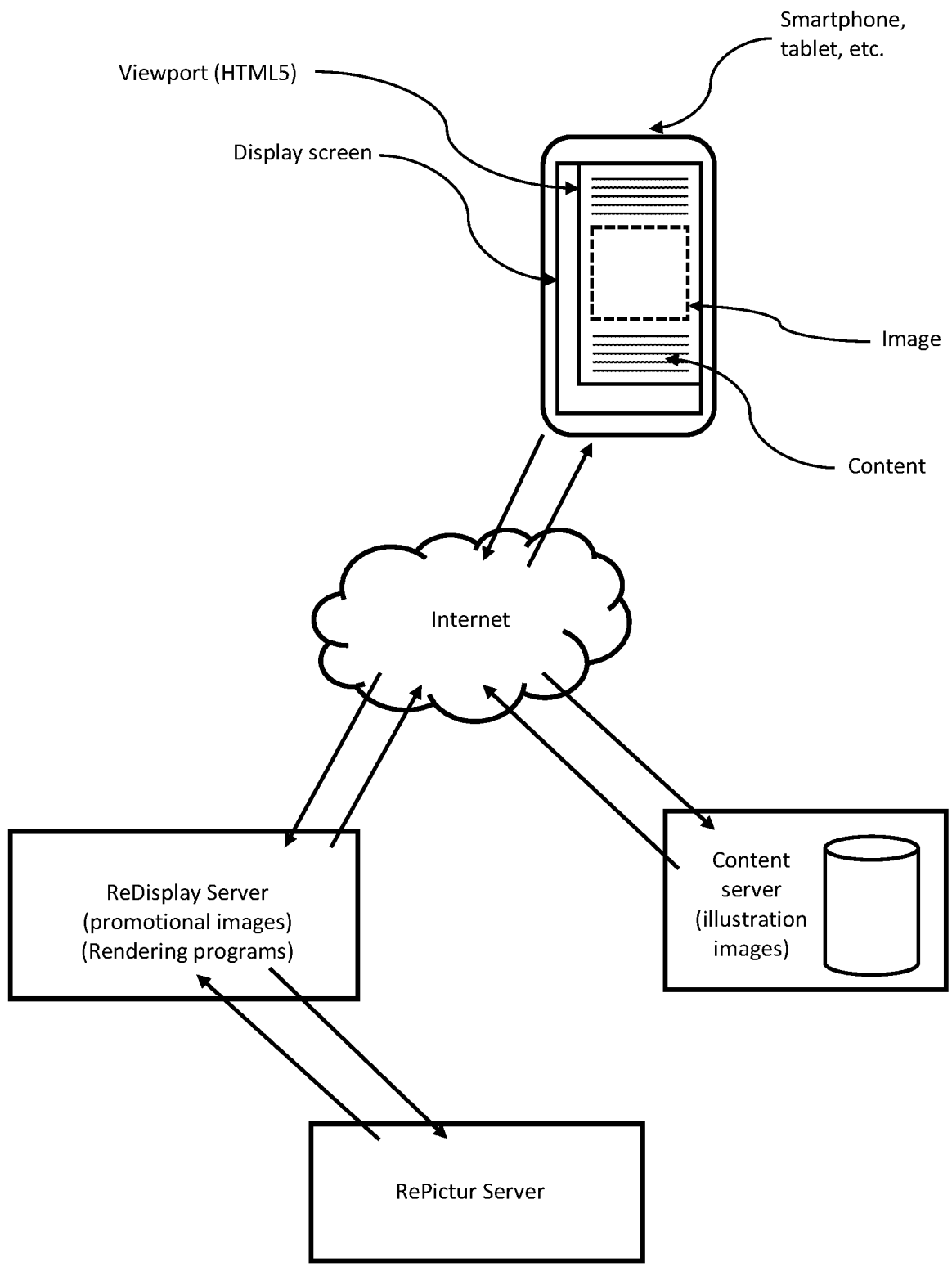
FIG. 1 is a block diagram of a general computer-based architecture for implementing the present invention, FIG. 1BIS illustrates five rendering modes pf a commercially available "RePictur"™ service.

Referring first to FIG. 1, the present invention is preferably implemented in an architecture where a smart device (desktop computer, laptop, tablet, phablet, smartphone, etc.) has the usual processing means, storage means, a display screen and input devices (touch screen, touch pad, mouse, etc.).

The smart device has communications capacities for connecting to various kinds of servers.

In the present species, a content server is capable of providing contents including illustration images, and said contents (e.g. news, documentary, etc.) can be viewed on the screen of the smart device by progressively scrolling through the content (in general vertically from top to bottom).

The architecture further comprises a server (hereinafter "RePictur server" or "resizing server") capable or resizing and reformatting image files on the fly, preferably without having to first upload the complete image file.

The RePictur server communicates with a so-called "ReDisplay" server which is the fundamental part for implementing the dynamic display renderings according to the invention as will be explained below.

The RePictur server stores the alternative images such as promotional images to be dynamically displayed at the smart device, also stores the programs (JavaScript programs in the present implementation) to be provided to the smart device for execution of the dynamic display renderings in said smart devices, and controls the resizing and reformatting of said alternative images by channeling them through the RePictur server as necessary.

I—Introduction

1) Foreword—the rePictuR Technology

Certain visual user experiences or renderings (i.e. a dynamic substitutions of elements in a main content) described in this specification rely on a technology which enables to resize dynamically an "original image", i.e. a bitmap made of pixels encoded in various formats, to another form of this original image that we call the "desired image", based on specifications which state its dimensions, its width and height, its rendering mode, and its encoded format. In our case, this technology is rePictuR, a Software as a Service (SaaS) solution available at www.repictur.com, which computes a desired image through an Internet web service, taking as parameters the original image Internet URL, the desired dimensions and the desired image format like JPEG, PNG, WebP, GIF and animated GIF.

The rePictuR rendering modes, referred as the "render" parameter, because it is of importance when detailing the way the reDiplay experience work, are explained herebelow with reference to FIG. 1:

"crop": the original image will be resized homothetically so that one of its dimension is equal to its corresponding desired dimension; if the other dimension of this resized image is greater than its desired dimension counterpart, it will be cropped so that the pixel center of the resized image and cropped image are identical, which involves that some horizontal or vertical borders will be discarded. The original image aspect ratio is preserved on the desired image.

"inbox": the original image will be resized so that the desired image will be as large as possible to fulfill the rectangle defined by the requested dimensions. The original image aspect ratio is preserved in the desired image;

"map": the original image will be stretched or squashed in order to exactly fill the desired dimensions if necessary. The original image aspect ratio may not be preserved in the desired image.

"fill": the original image will be resized so that the desired image will be as large as possible to fulfill the rectangle defined by the requested dimensions, the space not being occupied by the image being filled with a background. The original image aspect ratio is preserved on the desired image, but left and right horizontal or top and bottom vertical stripes will appear.

"outbox": the original image will be resized so that the desired image will have one dimension equal to the corresponding desired dimensions, the other dimension being greater or equal to its corresponding desired dimension. The original image aspect ratio is preserved in the desired image.

The rePictuR platform ensures a main HTTP web service which takes the original image URL, its desired specifications, i.e. its dimensions, format . . . , and outputs the desired image as the HTTP request response. rePictuR offers a JavaScript SDK which computes this desired image URL through a function which takes the specifications as parameters: once computed, this URL can be invoked in order to invoke the web service, and hence retrieve the desired image bitmap.

Other commercial services providing the resizing original images into desired formats, such as imgix (www.imgix.com) or Cloudinary (cloudinary.com) could alternatively be used. The main difference with the rePictuR service is that rePictuR performs this service without requiring the original image to be uploaded beforehand to the service back-end, this is just done "on the fly", which eases the process.

2) Computer Program Implementation

The computer programs involved in the processes described herein are delivered as a library, commonly named "Software Development Kit" (SDK), which can be declined in three forms:

1. a JavaScript library, delivered as a single file "redisplay.js", which is dedicated to the Internet browser, which is imported in the HTML source-code of a web page, via the traditional <script type="text/javascript" src="redisplay.js"></script> asynchronous import statement;
2. an Android library written in the Java language, which is delivered as a standard Java ARchive (JAR) "redisplay—android.jar" file, which is imported to the source-code of a mobile application project. This library mainly resorts to the Android WebView graphical view component, able to run HTML5 code: when running and displaying the experiences, it loads dynamically the previous JavaScript library from a server, so as to reuse as much code as possible and reduce the dedicated native code. This implies that the library is a hybrid library combining Java and JavaScript code;
3. An iOS library written in the Swift language, which is delivered as a standard iOS Framework "redisplay—ios.framework" file, which is imported to the source-code of a mobile application project. This library mainly resorts to the iOS UIKit UIWebView graphical view component, able to run HTML5 code: when running and displaying the experiences, it loads dynamically the previous JavaScript library from a server, so as to reuse as much code as possible and reduce the dedicated native code. This implies that the library is a hybrid library combining Swift and JavaScript code.

As stated, one peculiarity of the Android and iOS mobile libraries is that they reuse the code of the JavaScript library, and they just act as a thin layer between their hosting native application and the JavaScript run within an inner Internet browser view.

3) General Principles

The various experiences described herein are designed for running on any device equipped with an Internet browser which supports the HTML5 standard (or higher), equipped with a digital screen, touch-based or equipped with a mouse or a pad which enables to scroll up and down the content of a web page or a mobile application, that is named here "scroller". Each experience displays a visual content (image) on the screen, embedded in the content of a web page or a mobile application, which is animated according to vertical scrolling movement applied by the end-user to the content via the scroller, or following the orientation of the device in case it is equipped with a gyroscope or other movement detector. More generally, various input data can be used for controlling the animation rendering, including time.

4) "Experience": Definition

A user-experience or simply "experience" consists in displaying in an Internet browser or a mobile application one or more images within the boundaries of a frame on a digital screen of any smart device—a computer, a smartphone, a tablet, any device—equipped with such screen. The way the images are rendered in the frame depend on a substitution variable, e.g. the vertical position of the frame within its wrapping content, the device movement provided it is equipped with a gyroscope, or other input stimuli, or else time, while it is being visible, partially or totally, on the screen, and on alternative content of various natures. Thus in addition to displaying images or in replacement thereof, an experience may play a graphical animation over the frame, and may display texts, shapes, images and motions over it, which may change over time. The experience is made up of all the things that happen within its frame.

5) The Relationship Between Entities

FIG. 2 shows how the above-mentioned entities, i.e. the digital screen, the Internet browser or mobile application window, the content, the scroller, the viewport, the viewable content, the "non-viewable content and the frame, are bound one to each other. The viewport is the physical space on the digital screen which displays the portion of the content according to the "scroller" position: because the content height might oversize the viewport height, it only displays the viewable content, by contrast to the non-viewable content which may be progressively displayed in the viewport as the end-user scrolls up or down via the scroller. The images are displayed within the frame boundaries.

Certain of these entities are now described with greater detail.

a) The Scroller

Figure 3:
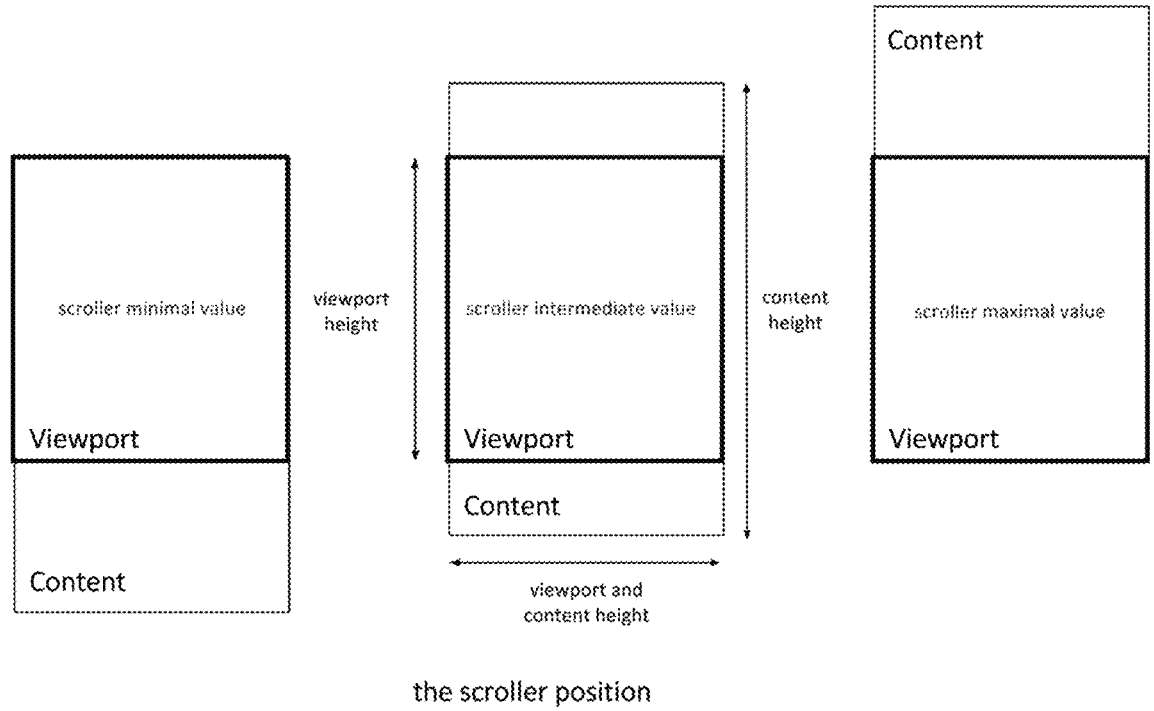
FIG. 3 illustrates the behavior of a scroller device used in the present invention.

Referring now to FIG. 3, the scroller is the device which enables to change the vertical fragment of the content being displayed in the viewport (in case the content is higher than the viewport height). As previously stated, it is either actioned by a touch event of devices equipped with touch screens, or by a mouse, a pad or any device which usually enables to scroll content vertically.

The "position" of the scroller is a number which has a minimal value when the fragment of the content displayed in the viewport reaches the content top, and has a maximal value when the fragment of the content displayed in the viewport reaches the content bottom. It is here focused on the vertical position of the scroller and ignore its potential horizontal position if the content width is greater than the viewport width, and hence assume that the content and viewport widths are equal. In an alternative embodiment, a horizontal scroller could be used in addition to the vertical scroller or instead of it.

b) The Visibility, Display and Scrolling Percentages of an Element (Display Features)

In order to perform the experiences, the system and method rely on three metrics regarding an element present on a content displayed in a viewport with a scroller, namely:

the element "visibility percentage": it indicates how much of the total surface of the element is visible in the viewport;

the element "scrolling percentage": it indicates how much the element has been scrolled inside the viewport.

the element "display percentage": it is a combination of the above two metrics, which enables defining a continuous function which accounts for the exact position of the element inside the viewport and whether it is intersecting said viewport.

These metrics are expressed in percentage, so that 0 means 0% and 100 means 100%.

The JavaScript SDK of the invention offers three corresponding methods which compute those three percentages, which are widely used per se, as well as methods which expose the cached results of these computations, in order to avoid recomputing them unless the element vertical position has changed or the viewport height has changed.

i) The Element Visibility Percentage

Figure 4:
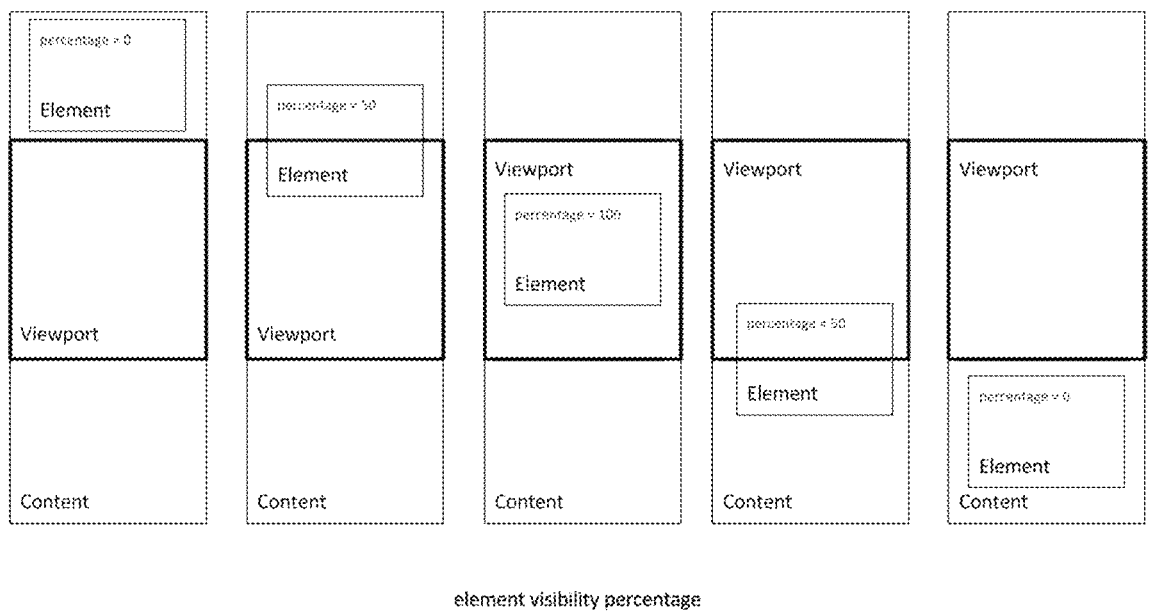
FIG. 4 illustrates the determination of an element visibility percentage.
Figure 5:
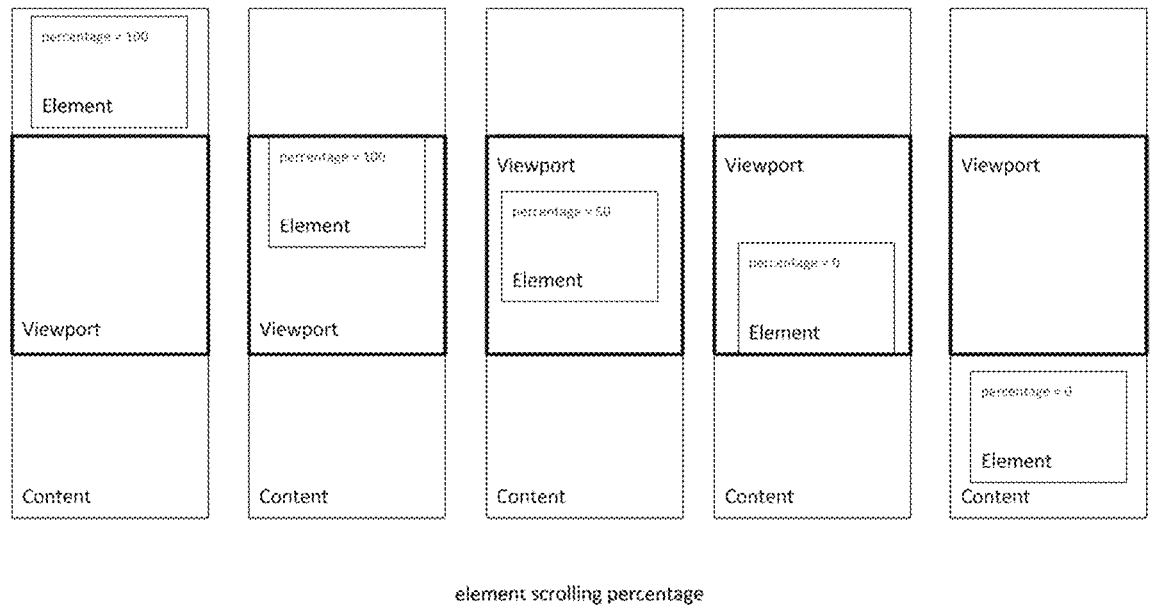
FIG. 5 illustrates the determination of an element scrolling percentage.
Figure 6:
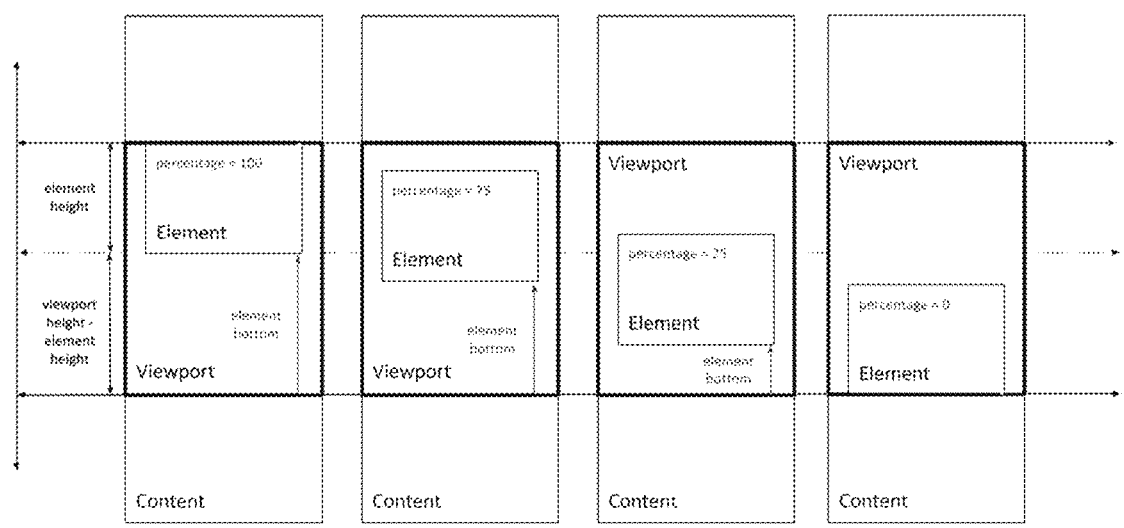

Referring now to FIG. 4, this percentage ranges from 0 when the element is totally out of the viewport, and 100 when it is totally visible in the viewport. It is equal to the ratio between the visible surface of the element and its total surface. Note that if the element height is greater than the viewport height, its visibility percentage will always be less than 100. In the opposite case, the visibility percentage is positive and less than 100 when it intersects the viewport top edge or bottom edge.

ii) The Element Scrolling Percentage

Turning now to FIGS. 5-8, there are three cases for computing this percentage.

1. The element height is less than the viewport height: when the element is fully visible on the screen, i.e. its visibility percentage is equal to 100, which involves that it bottom edge is above the viewport bottom edge and the element top edge is below the viewport top edge, its value is equal to the distance between the element bottom edge and the viewport bottom edge, divided by another height which is the viewport height minus the element height, the result being multiplied by 100 in order to get a percentage. For the other cases, when its bottom edge is below or aligned with the viewport bottom edge, its value is 0; when its top edge is above or aligned with the viewport top edge, its value is 100 (cf. FIG. 6).

2. The element height is greater than the viewport height: when the bottom edge is below the viewport bottom edge and its top edge above the viewport top edge, the value is equal to the distance between the element and viewport top edges, divided by a height, which is the element height minus the viewport height, the result being multiplied by 100 in order to get a percentage. For the other cases, when its bottom edge is above the viewport bottom edge, its value is 100; when its top edge is below the viewport top edge, its value is 0 (cf. FIG. 7).

3. The element position inside the content prevents either its bottom edge from being aligned with the viewport bottom edge or its top edge from being aligned with the viewport top edge, which occurs when, respectively, the element is either very close to the top of the content, or very close to the bottom of the content: in those cases, a virtual value is computed which replaces the viewport top or bottom and the formula expressed in case 1 or 2, depending on the element height compared to the new virtual viewport height, is applied to compute the value.

a. When the element bottom cannot reach the viewport bottom edge, the virtual value is a virtual bottom, which is equal to the distance between the viewport bottom edge and the element bottom edge when the scroller value is minimal, i.e. has reached the top of the content (cf. FIG. 8a).

b. When the element top cannot reach the viewport top edge, the virtual value is a virtual top, which is equal to the distance between the viewport top edge and the element top edge when the scroller value is maximal, i.e. has reached the bottom of the content.

(cf. FIG. 8b).

iii) The Element Display Percentage

While the visibility percentage indicates how much the element is visible in its viewport and the scrolling percentage indicates how much the element has been scrolling vertically, the display percentage is a combination of these two percentages and enables knowing precisely the position of the element within the viewport. It ranges from −100 to +200 and offers a continuous function varying with the element vertical scrolling position.

Common Case

In the most common case, i.e. when the element height is less than the viewport height and when the element position inside the content does not prevent its bottom edge from being aligned with the viewport bottom edge or its top edge from being aligned with the viewport top edge.

1. the display percentage is equal to −100 when the element top edge touches the viewport bottom edge, i.e. when the element is bound to start being visible from the bottom, namely when the visibility percentage is equal to 0;
2. the display percentage is equal to the visibility percentage minus 100, i.e. greater than −100 and less than 0 as long as it intercepts the viewport bottom edge, i.e. while it is appearing from the bottom;
3. the display percentage is equal to 0 when the element bottom edge is aligned with the viewport bottom edge, i.e. when the visibility percentages reaches the 100 for the first time while appearing from the bottom;
4. the display percentage is equal to the scrolling percentage, i.e. greater than 0 and less than 100 as long as the visibility percentage is equal to 100;
5. the display percentage is equal to 100 when the element top edge is aligned with the viewport top edge, i.e. when the scrolling percentages reaches the 100 value for the first time while appearing from the bottom;
6. the display percentage is equal to 200 minus the visibility percentage, i.e. greater than 100 and less than 200 as long as it intercepts the viewport top edge, i.e. while it is disappearing by the top;
7. the display percentage is equal to 200 when the element bottom edge is aligned with the viewport top edge, i.e. when the visibility percentages reaches the 0 for the first time while disappearing by the top.

This percentage enables knowing precisely the position of the element within the viewport while it intercepts the viewport surface.

In summary, if we name "displayPercentage" the display percentage, "visibilityPercentage" the visibility percentage and "scrollingPercentage" the scrolling percentage:

1. displayPercentage=visibilityPercentage−100 when scrollingPercentage<=0,
2. displayPercentage=scrollingPercentage when visibilityPercentage>=0,
3. displayPercentage=200−visibilityPercentage when scrollingPercentage>=100.

Particular Cases

In other cases, i.e. when the element height greater than or equal to the viewport height, and/or when the element position inside the content prevents either its bottom edge from being aligned with the viewport bottom edge or its top edge from being aligned with the viewport top edge, the display percentage is computed the following way:

the following computation is made:
potentialVisibilityPercentage=visibilityPercentage/ maximumVisibilityPercentage where maximumVisibilityPercentage is the maximum value that visibilityPercentage can reach, and then:

1. when scrollingPercentage>0 and scrollingPercentage<100, displayPercentage=scrollingPercentage,
2. when scrollingPercentage<=0, displayPercentage=potentialVisibilityPercentage−100,
3. when scrollingPercentage>=100, displayPercentage=200−potentialVisibilityPercentage.

This ensures that the display percentage is a continuous function.

iv) The Element Scroll-Ranged Percentage

Figure 9:
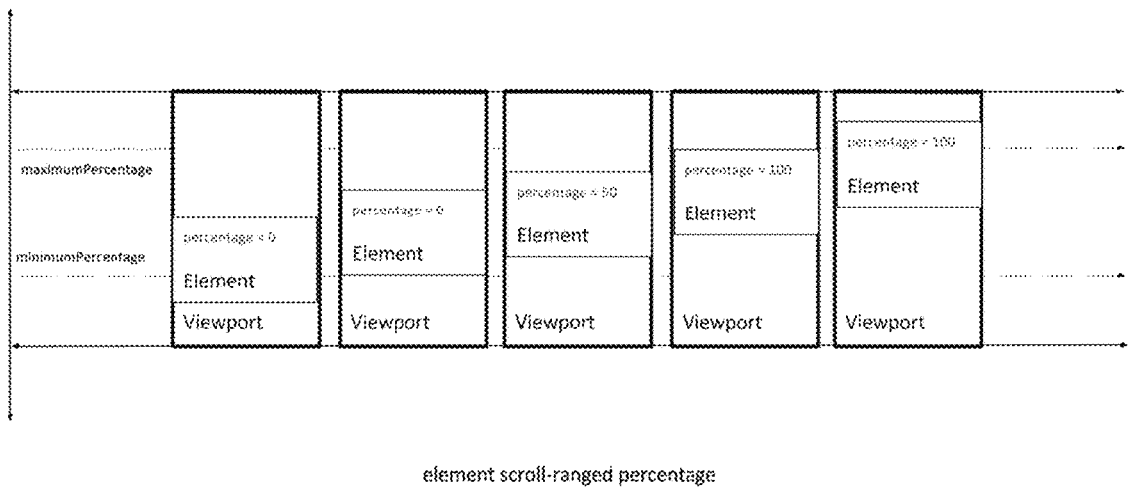
FIG. 9 illustrates the computation of an element scroll-range percentage.
Figure 10:
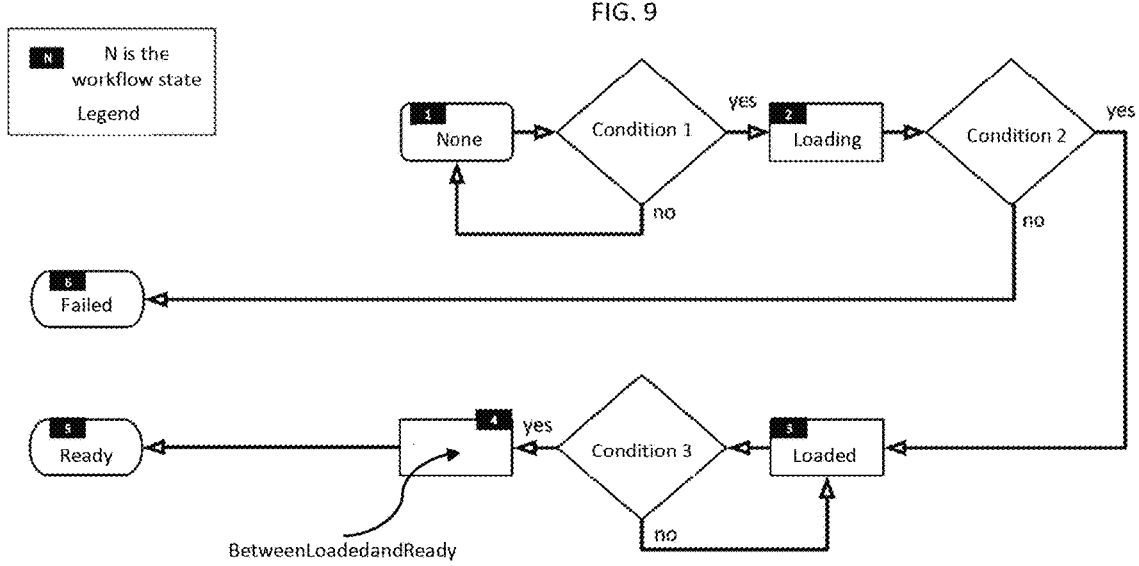
FIG. 10 is a workflow of a "load" state variable useful in the present invention.

Referring now to FIG. 9, the SDK offers a function which computes a value named the element "scroll-ranged percentage", a floating number between 0 and 100: it takes as parameters the element scrolling percentage scrollingPercentage and a scroll range, which is a pair of two integers between 0 and 100, the second, maximumPercentage being greater than the first, minimumPercentage, and outputs a value scrollRangedPercentage equal to "Math.min(1, Math.max(0, scrollingPercentage−minimumPercentage)/(maximumPercentage−minimumPercentage))" where the "Math.min" and "Math.max" functions outputs respectively the lowest and the greatest of two given numbers.

This scroll-ranged percentage introduces the concept of virtual top and bottom viewport edges and determines where the element is located between those virtual bottom and top edges.

c) The HTML "<img>" tag

In order for a Web page to be able to run an experience, it must embed the corresponding JavaScript SDK, via a regular HTML5 asynchronous import "script" statement. When this is done, as soon as the document has been loaded by the Internet browser, the SDK initialization phase will be run. This initialization phase consists in analyzing the document.

During this initialization phase, the way the JavaScript SDK determines whether and where an experience should be run comprises parsing the HTML Document Object Model (DOM) (cf. https://www.w3.org/TR/WD-DOM/introduction.html) and detecting the HTML "<img>" nodes that fulfil certain criteria: for every "<img>" HTML tag which meets these criteria, the SDK will initialize and run an experience. These criteria will be described below. Among the criteria, the "<img>" HTML element must refer to an experience description entity. Each matching "<img>" tag is actually a "placeholder" for an experience, which enables to use a built-in HTML tag to insert experiences within a HTML page.

d) The Experience Description

Each experience is attached a set of parameters which indicate when it should be displayed, i.e. the conditions that should be met for it to be rendered in the content, the way it is displayed, that it is to say its graphical layout, the way it behaves according to the scroller position, gyroscope state or other input stimuli, and the way animations are run over the experience frame as those inputs change, namely the texts and shapes that are rendered.

These parameters are captured into an entity named "description", which is a document described in the JSON format through a specific grammar, which is normalized and mapped in the Java and JavaScript languages. The description of an experience is a series of key-value pairs, the key being the name of the parameter, the value being its value, which can be of one of the following types:

an integer,
a floating number,
a boolean (value "true" or "false"),
a string,
a JSON object, in which case this object follows the same rules as for the herein described value.

Certain parameters have implicit default values declared in the grammar, certain others are optional, and still certain others are mandatory.

When referring to each parameter, it may be named indifferently "parameter", "attribute" or "property". In particular when mentioning in short the "attr" parameter of an experience, it is meant the "attr" parameter of its description.

The system and method of the invention hence offer a formalism which enables to declare the behavior of the experience and its rendering in a self-describing unit, based on a textual and structured document, and the rendering engine is responsible for interpreting this description in real-time. This offers a new device for digital designers to design experiences without any programming work to have the experiences rendered (or "played") on a variety of digital supports. The invention thus provides a new kind of "player": its SDK acts as a video player, but instead of rendering a video frame over the time, it renders a frame which is computed depending on its description and on an animation percentage (which will be described below).

In addition, in order to make sure that legacy experience descriptions can still be used with versions of the SDK which do not support their "schemaVersion", the invention may also implement a back-office web service which takes an experience description string as a parameter and returns the same semantical description migrated it to the latest version of the schema. This allows addressing any back-compatibility issue.

e) The Description "Schema Version" s, the Grammar and SDK Versioning

Each rendering description comprises a "schemaVersion" property, which is an integer indicating what version of the schema description it complies with: as the grammar of the experience description evolves over time, because the implementation may introduce new concepts and new features, the schema is versioned along with the JavaScript and Java parsers.

Likewise, the JavaScript SDK, which in a particular embodiment is the core of the implementation, is also versioned, and supports experience descriptions having a "schemaVersion" belonging to a range of schema versions, for backward compatibility reasons.

f) The Experience Description "Type" Property

Each description comprises a "type" property, which is a string that can take a value among a number of values, and in the present embodiment: "overlay" (the "Overlay"), "overfly" (the "Overfly"), "understitial" (the "Understitial"), "lenticular" (the "Lenticular"), "scrolltoon" (the "Scrolltoon") and "scravelling" (the "Scravelling"), this type describing the nature of the experience:

These six experiences models, that will be described in detail below, each offer additional specific rendering and behavioral features, which can be seen as formats.

The "Lenticular", "Scrolltoon" and "Scravelling" models provide features which supplement the "Understitial" model, which means that the built-in features of those models can all be translated into the "Understitial" model by using "image" or "motion" particles and by setting its "percentage" parameter to 100. These three experiences were introduced because the description schema and the SDK were not able to provide a generic way to achieve their behavior and rendering, as former versions of the SDK used to hard-code routines achieving those specific features: as the SDK and the description schema evolved, those features have been generalized and introduced, so that the "Understitial" model can now be used instead with appropriate adjustments.

Hence, except for the specific cases of the "Overlay" and "Overfly" models which both offer specific behavior by involving the natural "<img>" image defined via its "src" attribute, the invention offers a universal way for describing experiences via the "Understitial" model.

g) The "<img>" Criteria and the Description Declaration

As stated above, the SDK scans all the incoming HTML document to search for the "<img>" content and creates an experience for those fulfilling certain criteria. For an experience to be loaded regarding its "<img>" content, this latter must meet at least one the following conditions, namely:

it declares the native HTML "src" attribute, which defines the URL of the image (this URL starting with a prefix string corresponding to the address of the dedicated image server), and which contains the experience identifier. Advantageously, the invention offers a back-office which is able to store an experience description associated to an identifier, along with an image corresponding to a preview of its rendering, i.e. a bitmap corresponding to the experience rendering for a specific display percentage; this back-office is interoperable via an Application Program Interface (API) exposed by HTTP web services: the provided identifier located in the "src" URL must correspond to an experience description which must have been previously imported. The invention also includes an HTTP server providing web services, receiving the resulting HTTP request initiated by the Internet browser user agent, and responsible for returning a Scalable Vector Graphics (SVG) image, complying to SVG v1.1, which contains and displays a bitmap (via a SVG "<image>" tag) corresponding to the experience visual content, along with the experience description JSON string, wrapped into a SVG "<foreignObject>" tag. With this declaration mode, the experience depends on an additional server, but on the other hand it is sufficient to provide a regular HTML attribute for declaring the experience identity. In addition, when the experience description has been previously declared, a preview of the experience can be displayed at the end-user side while the experience is loading, and the experience description is retrieved in the same single HTTP request;

it declares a specific HTML attribute "redisplay-desc", the value of which is the inlined experience description content, i.e. its JSON string. By using a single quote character (') for delimiting the HTML attribute, the JSON string can be inlined thanks to the double quote (") that will be safely escaped. In this way, the experience description can be located directly within the HTML page by means of a non-standard HTML attribute, and there is no specific server needed for storing it;

it declares a specific HTML attribute "redisplay-params", which is a JSON string representing integration parameters. As for the "redisplay-desc" attribute, this attribute can be delimited by a single quote. In that case, this JSON object should contain an "experienceId" property, which is the identifier of an experience which has been previously uploaded in the back-office, as described for the first case: the back-office will be requested by the SDK, via an HTTP request and through a dedicated web service, to return the experience description. In this way, the experience description can be located remotely on the back-office, the experience integration requiring to use a non-standard HTML attribute;

it declares the same specific HTML attribute "redisplay-params" as in the previous case, except that the JSON object should contain a "descriptionUrl" property which is a string URL that can be accessed via an HTTP request and which returns the experience description. The SDK will retrieve the experience description via this HTTP request, adding query parameters like the "id" attribute of the experience, which enables for the server side, along with the usual "Origin" and "Referer" HTTP request headers to know what experience description to serve. This way, the experience description is located remotely on any server, this server being able to serve any experience dynamically depending on its integration location, the experience integration requiring to use a non-standard HTML attribute;

it declares the same specific HTML attribute "redisplay-params" as in the previous case, except that the JSON object should contain a "getDescription" property which is a string corresponding to a JavaScript function which returns the JSON description. The SDK will retrieve the experience description by invoking this function. This way, the experience description is located locally in the HTML page and provided by a bespoke function, the experience integration requiring to use a non-standard HTML attribute.

In all cases, the retrieved description may be optionally validated dynamically by the SDK via a "validate" Boolean property belonging to the "redisplay-params" JSON object: if enabled, then before loading the experience the SDK will check that it has the proper syntax, namely that it is a valid JSON object and that it complies to the description grammar corresponding to its declared "schemaVersion". Furthermore, the SDK will inspect and check each parameter of the description, i.e. that it has the right type, is valid and consistent, is present when mandatory, otherwise the experience will not be loaded. This offers a preliminary checking process.

The simplicity of the JavaScript SDK within an HTML page along with the various integration modes of an experience makes the availability of the solution according to the invention versatile and universal, so as to respond to most of the use cases. In particular, since an experience may be integrated via a plain regular HTML "<img>" element and specified by its built-in "src" attribute, the technology may be integrated on any HTML Content Management System (CMS) which offers the possibility to insert a regular HTML image and let the end-user declare the "src" attribute.

e) The iOS and Android SDKs

The present invention may provide an iOS® and Android® SDKs, which enable to run all experiences within a native mobile application developed with the classical iOS® and Android® operating systems frameworks.

However, in order to share as much code as possible between the JavaScript SDK used for running the experiences within an Internet browser (desktop, laptop or mobile) and the native mobile applications, the iOS and Android SDKs preferably use and rely on the JavaScript SDK. This is done by using to the native iOS "UIWebView" and Android "WebView" graphical widget elements, which act as HTML browsers displaying content within the graphical space allocated to them. For this purpose, the mobile SDK introduces a "reDisplayView" graphical widget element, which contains a UIWebView for iOS and a WebView for Android: this component contains the code which injects the JavaScript SDK within the embedded UIWebView or WebView, and which runs the initialization phase with a special flag parameter indicating to the JavaScript SDK that it is being executed within a mobile application.

The iOS and Android SDKs include methods which enable to integrate this reDisplayView widget inside an iOS "UICollectionView" or an Android "RecyclerView", namely inside graphical widgets which are able to scroll vertically as soon as the height of the content they display exceeds their viewport height. This graphical widget element is named here "ContentView".

The reDisplayView widget dynamically builds an HTML document which embeds the JavaScript SDK in the "<head>" node, and the "<body>" node of which is only made of a single "<img>" HTML element owning a "redisplay-params" attribute which contains the experience parameters.

The reDisplayView widget also ensures a communication bridge between the JavaScript SDK and the native code: certain messages may be transmitted from the JavaScript code to the native code and vice versa. These messages enable the JavaScript SDK to:

know the viewport of the ContentView widget,
know the height of the ContentView widget,
know the vertical offset position of the reDisplayView widget within its ContentView widget,
send signals to ask to the native code to set the reDisplayView height dynamically,
ask to the native code to persistently store and retrieve JSON objects identified by a string key,
send a signal to the native code to open a dialog box.

The first three messages enable the JavaScript SDK to compute a virtual position of the "<img>" node, as if it were hosting within an HTML document which contains an empty "<div>" node the height of which is equal to the reDisplay vertical offset position and followed by a "<div>" node, the eight of which is equal to the ContentView height minus the reDisplayView height, minus the first "<div>" height. With this virtual position, from the point of view of the JavaScript code executed in the reDisplayView widget, the HTML document behaves like the ContentView widget.

II—Principles Common to all Experiences

In this section the mechanisms common to all experiences are explained. it will be referred to in other parts of the description.

1) The "Load" State

As soon as the experience parameters have been successfully parsed, they are checked, and if they do not comply, the experience is aborted, which means that it will not be displayed. If the experience parameters comply, an internal object "handler" representing the experience is created in memory, responsible for orchestrating the experience user experience.

For this purpose, the SDK maintains an internal "load" state for the experience, in order to keep track of its internal loading progress and status.

Figure 11:
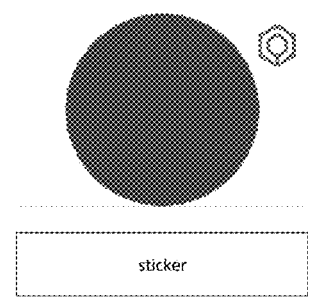
FIG. 11 illustrates a "sticker" that can be displayed in certain circumstances.
Figure 12A:
FIGS. 12A-12E illustrate different text renderings that can be implemented in the present invention.
Figure 12B:
Figure 12C:
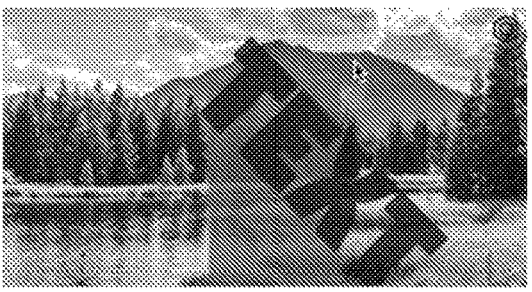
Figure 12D:
Figure 12E:

Herebelow are the various states of the "load" state, as depicted in FIG. 11, where the "frame" is to be understood as the "illustration image frame", the "image" as the "illustration image" in case of the "Overlay" and "Overfly" experiences. For other experiences, the "frame" mentioned in that section is the "canvas" and the "image" is the experience "main source":

1. "None": this is first state of the experience, as long as it has not started loading. The experience "autoLoad" parameter which is a Boolean, indicates whether it should start loading as soon as the experienced is parsed, or whether it should wait for the frame to become visible, i.e. when the frame scrolling visibility percentage is greater than 0. On that purpose, the handler object identifies the wrapping content scroller, in order to listen later on the vertical scroll position, and monitors that position for the whole experience lifetime.

2. "Loading": this is the experience state as soon as it starts being loaded.

a. The SDK waits for the image to be downloaded in the first place: if the loading fails because an HTTP response indicates an error or because of a time-out (set by the web browser), the state transitions to the "Failed" state.

b. Otherwise, if the experience includes a promotional image, the SDK starts downloading it, with the right dimensions specifications, with a time-out set to the browser default time-out. If the download fails for any reason, the state transitions to the "Fail" state.

c. Otherwise, the SDK starts downloading the "reminder.icon" image if this parameter is defined, otherwise it skips to the next stage. The reminder image is downloaded via the rePictuR resizing service with the "render" parameter set to "inbox" and with dimensions set to 80×80 pixels. If the download fails for any reason, the state transitions to the "Fail" state.

d. Otherwise, the SDK starts downloading the animation files referred through the "animations.firstClick" and "animations.secondClick" parameters if they are defined, otherwise it skips to the next stage. If the download fails for any reason, the state transitions to the "Fail" state.

e. Otherwise, the SDK starts downloading the fonts referred through the "texts[ ].fontUrl" parameters if any, otherwise it skips to the next stage. If the download fails for any reason, the state transitions to the "Fail" state.

f. Otherwise, the SDK starts downloading the images and motions referred through the "images[ ].url" and "motions[ ].url" parameters via the rePictuR resizing service, if any, otherwise it skips to the next stage. If the download fails for any reason, the state transitions to the "Fail" state.

g. If all those downloads were successful (note that the browser cache can be used to avoid downloading again existing files), then the experience state transitions to the "Loaded" state.

3. "Loaded": this state indicates that all prerequisite resources have been downloaded and are available for the whole experience to run. The experience checks whether the scrolling visibility percentage of the frame is positive. In that case, it transitions to the "BetweenLoadedAndReady" state. If, at this time, the scrolling visibility percentage is equal to 0, the SDK will monitor the scroller position, and on every value change for this value, it checks the scroller position: as soon as it becomes positive, the state is transitioned to "BetweenLoadedAndReady". This scroller position monitoring is necessary to determine the experience behavior.

4. "BetweenLoadedAndReady": the experience handler object creates a HTML5 canvas. The dimensions of this canvas depend on the experience, which we detail later on when describing each experience. The handler then replaces the "img" HTML element with that newly created canvas, which will be exclusively used to render the experience from this time. A first render of the experience is performed, just before the "img" element be replaced by the canvas, in order to deliver a smooth transition for the end-user, so that she cannot detect the HTML node swap. At the end of this process, the experience transitions to the "Ready" state.

5. "Ready": from that time, the SDK starts listening to the scroller position or the gyroscope orientation: the experience will be rendering in the previously created HTML5 canvas, the size of which may change. In the case of the Overlay experience the "display" state transitions to "OnElement". In the case of the Overfly experience, the "display" state may transition to "OnElement", "TransitionToPromotion" or "Promotion" depending on the scroller position. The value of this state will not change anymore.

6. "Failed": this state is there to account for any issue that might have occurred before the experience reaches the "Ready" state. The value of this state will not change anymore.

2) Sticker Display

If the experience "hasSticker" parameter, which is a boolean, is set to "true", the experience displays a sticker icon, e.g. as shown in FIG. 11, in the upper right corner of the overlay frame, which acts like a watermark for the hereby product. This icon, displayed over the overlay frame must be clickable and open a dialog box when clicked, which delivers some information about the product.

However, in case the experience has an "extension" state, when its value is equal to "Opening" or "Closing", the sticker should not be displayed. In addition, it the experience has a "display" state, when its value is set to "TransitionToPromotion" or "TransitionToElement", it should neither be displayed. Those specifications prevent the reader from being distracted.

3) Particles Rendering Engine

The SDK according to the invention offers an engine which renders texts, shapes, images and motions over the frame on which the experience is displayed: those elements are called content elements or "particles". The particles are optional parameters of the experience.

In the following sections, "frameWidth" and "frameHeight" respectively designate the width and height of the frame.

a) The Animation Percentage

These particles are both described and rendered according to an input, which is the "animation percentage". This animation percentage is a floating number which should be greater or equal to −100 and less than or equal to +200. Since the rendering of a particle depends on the animation percentage, the fact that the animation percentage value may vary over time enables to design and declare animations on those particles, hence contributing to a more overall animation associated to the experience.

The animation percentage value depends on the way the experience is currently configured, namely its "mode":

when set to "scrolling", the animation percentage is equal to the display percentage, which enables to design an experience which follows the scroller position, hence generating a scroll-motion effect;

when set to "frozen", the animation percentage is fixed, the value of which is defined by an attribute declared in the experience description, to a percentage value set between −100 and +200, which enables to design experiences the rendering of which is fixed;

when set to "time", the animation percentage is equal to a value which is equal to "min(100, duration*100/animationDuration)" ("min" being the logical "minimum" function between two values), where "duration" is the time elapsed in milliseconds since a "triggering event" occurred and "animationDuration" is a positive integer which indicates in milliseconds how long the animation should last. The "triggering event" detection is monitored in real-time, the computation of which is configured via a "conditions" attribute (explanations are provided below). This way, the experience is designed so as to run animations, the progress cursor of which increments automatically along with the time;

when set to "in-scroll", the animation percentage is equal to "verticalScrolling*100/animationVerticalScrolling" where "verticalScrolling" is the amount of vertical scrolling movement, expressed in pixels, that has been operated by the end-user while the scroller pointer is positioned over the experience frame and "animationVerticalScrolling" is a positive integer which indicates how much vertical scrolling should be cumulatively operated to consider that the animation percentage is equal to 100. This way, the experience is designed so as to propose a scrubbing animation effect to the end-user;

when set to "manual", the animation percentage is computed by an external function, which is provided by the integrator via a dedicated JavaScript function name declared in the "redisplay-params" attribute of the HTML "img" element corresponding to the experience. This callback method is invoked in real-time by the SDK rendering engine, and should consistently return a value between −100 and +200. This way, the experience is designed so that its animation progression is totally depending on a foreign custom routine: the routine which computes the animation percentage may be linked to whatever input like the gyroscopic sensor, the date and time, the fine-grained geolocation or any custom algorithm crafted by the integrator. Moreover, this way, the experience HTML "img" element used as placeholder can be placed anywhere in the content, can be moving, typically when in the content feed, or fixed, for instance in overlay or even in filigree, which considerably expands the integration use cases of the invention.

b) The Experience Process, Scores and Tracks

During the lifetime of an experience, its "mode" may vary depending on the time or the end-user inputs: the "process" attribute declared in the experience description indicates the various modes that should be run by the engine one after the other via the "process.scores" attribute: each "score" indicates its "conditions" attribute, which is a logical expression evaluated in real-time, indicating whether the score should be starting.

Moreover, the score contains a "trackId" attribute, which is a string identifier indicating in what "track" the score particles are defined for the score: the experience description contains a "tracks" attributes, which is an array of "track" attributes, each track declaring an "id" identifier attribute and the "texts", "shapes", "images" and "motions" attributes, which are particles. This way, to each score are attached rendering instructions, the "track", gathered in distinct and specific particles declarations. The fact that the tracks are declared independently and referred via the "trackId" attribute enable to re-use the same track for different scores.

As mentioned, the previous score "conditions" is a boolean expression: it takes as arguments the following parameters: "visibilityPercentage", "scrollingPercentage", "displayPercentage", "idleDurationInMilliseconds" (which is the duration in milliseconds since the end-user vertical scrolling has not been changing), and"displayDurationInMilliseconds" which the cumulated duration of the time frames while the "visibilityPercentage" is equal to 100, i.e. the experience frame is totally visible.

Note that those parameters could be extended.

As soon as the conditions expression evaluation returns "true", the score is considered to be started, the previous score being stopped and the engine sending simultaneously a "triggering event" for the newly started score. From this moment, the score is considered to be running, one score being running at most at the same time.

Thanks to the declaration of multiple scores being started one after another by the SDK engine depending on real-time conditions, the experience may be designed so as to provide a series of succeeding and interruptible end-user inner experiences which behave and react differently to the end-user stimuli and to time on one side, and which renders totally differently on the other side, because its rendering depends on the score particles defined in its associated track. In addition, thanks to the score "manual" mode, the progression of the animation is freely configurable in real-time by the person in charge of integration, which enables to mix situations where the animation percentage is computed in a totally autonomous way by the SDK, or when this computing is defined by a custom routine, but also to mix the positioning and anchoring of the "img" HTML element using as the experience placeholder.

c) The Particles Rendering

At a given time, as explained above, only the particles corresponding to the currently running score are taken into account to render the experience within its frame.

These particles are rendered according to the animation percentage, i.e. their position, size, color, opacity, orientation depend on that value. Each particle can adopt one among two states which indicate how it should be rendered, each state corresponding to a display percentage value, and the engine is responsible for computing the state of the particle for a display percentage value different from either of the two states via a mathematical interpolation.

The particle rendering is performed at the penultimate stage of the rendering process of the experience, i.e. after the images of the experience have been displayed over the frame, but before the click-to-open or click-to-action animations, so that the latter are overlaid.

d) The "Order" Attribute

Each particle is given an "order" attribute, which enables the engine to compute the order in which all particles should all be rendered, and hence provides an additional layer-based rendering mechanism. The engine uses this value in order to know in what order the particles should be displayed, whatever their kind: it iterates over all the particles, render each of them sequentially, the one with the lowest value will be rendered first.

e) The "From" and "To" Attributes (Rendering Thresholds)

In order for the SDK rendering engine to compute the state of the particle depending on the animation percentage, each particle is given two references via the "from" and "to" attribute, which are two JSON objects having the same structure, indicating respectively the initial and final states of its rendering: this JSON object state object contains attributes which are all numerical values, like its position, dimensions, orientation, opacity and color. In the case of the color, it can be considered as a triple of numerical value, each channel color, i.e. red, green, blue, being a numerical value.

The "from" and the "to" parameters always contain at least the inner parameter "percentage": it is a number ranging from −100 to +200, which represents a display percentage. The "from" and "to" contains other attributes which describe the state of the particle rendering: when the display percentage is equal to "percentage", the particle is rendered according to its corresponding state.

When the display percentage is equal to the "from.percentage" value, which is an integer ranging from −100 to +200, the particle is displayed in the frame with the parameters defined within the "from" object.

When the display percentage is equal to the "to.percentage" value, which is an integer ranging from −100 to +200, the particle is displayed in the frame with the parameters defined within the "to" object.

When the display percentage is greater than "from.percentage" and less than "to.percentage", the renderer computes the state of the particle according to the attributes defined in the "from" and "to" parameters as an interpolation between their "from" and their "to" values, defined by the "interpolator" attribute of the particle (the explanation of which is given below).

When the display percentage is less than "from.percentage" or when it is greater than "to.percentage", the particle is not rendered.

In order to position the particle on the frame, each state defines a "reference point", via its "x" and "y" coordinates, along with the way this "reference point" will be used when displaying the particle: hence, the state contains the following attributes:

"x": a floating number, interpreted as a percentage, which indicates the horizontal percentage of the frame width which is used to compute the horizontal position of the particle "reference point", from the left edge of the frame. From this value, we compute the "abscissa" equal to x*frameWidth/100;

"xAlign": a string which takes a value among "start", "middle" and "end", which indicates how the preceding "x" value should be interpreted:

when "xAlign" is equal to "start", the particle will be displayed at the right of "abscissa", which enables to set a left horizontal alignment;

when "xAlign" is equal to "middle", the center of the particle will be displayed at "abscissa", which enables to center it horizontally;

when "xAlign" is equal to "end", the particle will be displayed at the left of "abscissa", which enables to set a right horizontal alignment;

"y": a floating number, interpreted as a percentage, which indicates the vertical percentage of the frame height which is used to compute the vertical position of the particle "reference point", from the top edge of the experience. From this value, we compute the "ordinate" equal to y*frameHeight/100;

"yAlign": a string which takes a value among "start", "middle" and "end", which indicates how the preceding "y" value should be interpreted:

when "yAlign" is equal to "start", the particle will be displayed below the "ordinate", which enables to set a top vertical alignment;

when "yAlign" is equal to "middle", the center of the particle will be displayed at "ordinate", which enables to center it vertically;

when "yAlign" is equal to "end", the particle will be displayed above the "ordinate", which enables to set a bottom vertical alignment.

Each state also defines the following attributes:

"rotation": a floating number, expressed in degree, representing the angle between the particle horizontal baseline and the abscissa axis, which will be used when displaying the particle;

"alpha": a floating number between 0 and 100, which indicates the transparency of the particle. 0 means 0%, i.e. that the particle is totally transparent, hence not visible once displayed, 100 means 100%, i.e. that the particle is totally opaque.

The way the size and the color of the particle is expressed depends on the particle nature.

f) The Interpolators

The SDK defines interpolators, which are mathematical functions which take a number between 0 (0%) and 100 (100%) as an input and which outputs a number:

1. when the input is equal to 0, the output must be equal to 0, 2. when the input is equal to 100, the output must be equal to 100.

Each function is continuous. Each interpolator is given a name among the values "linear", "easeInQuart", "easeOutQuart", "easeInOutQuart", "easeInOutQuad", "easeInOutBack", "easeInBackOutQuad", "easeInQuadOutBack", "easeInOutSine", "easeInOutCubic", "easeOutCubic", "easeOutCirc", "easeOutQuad", "easeInOutSmooth", "easeInOutSmoothBack", "easeOutSmoothBack", "easeOutElastic", "easeOutBounce" corresponding to a CSS animation-timing-function. a further implementation can provide that the four cubic Bëzier curve coordinates are inputted to compute the interpolation.

An interpolator may be defined for each particle, and when not defined, the "linear" one is selected as a default implicit value, the "linear" interpolator being the identity function. As explained above, the interpolator is used to compute the state of a particle being two defined states, each state corresponding to a display percentage value, and being defined by the "from" and "to" attributes. When the display percentage is greater than or equal to "from.percentage" and less than or equal to "to.percentage", the percentage used to compute the particle attributes state is computed with the "function((displayPercentage−from.percentage)/(to.percentage−from.percentage))" formula, where "function" is the function corresponding to the interpolator.

Given the defined states "from" and "to" for a particle and a display percentage greater than or equal to "from.percentage" and less than or equal to "to.percentage", the SDK rendering engine will compute the values of each numerical value of its attributes of the particle by applying the interpolator function: for the attribute "attr", its computed value will be equal to "(1−interpolator)*from.attr+interpolator*to.attr". This way, the SDK is able to compute and then render each particle for any display percentage value.

g) The Texts

A "text" is to be understood as a series of characters displayed from the left to right, using a specific font for its rendering.

The "texts" experience parameter is an array of JSON objects which describe each text. Herebelow are the attributes of a single "text" element in addition to the "order", "interpolator", "from" and"to" attributes common to all particles:

"text": this is a string of characters which represents the text to be displayed;

"fontUrl": this is the Internet location of the font used to render the text. The supported formats are WOFF, WOFF2, OTF, TTF. During the loading phase of the experience, the SDK downloads the font definition if not already available in the Internet browser cache.

The "from" and the "to" parameters contain the following inner parameters:

"textSize": a positive or null floating number which indicates how high or wide the text is displayed, depending on the "textSizeComputation" parameter;

"textSizeComputation": a string which takes a value among "horizontalFull", "horizontalSingle", "verticalFull" and "verticalSingle", which indicates how the previous "textSize" value should be interpreted:

when "textSizeComputation" is equal to "horizontalFull", the text height will be computed so that the width of the text displayed on the frame is equal to textSize*frameWidth/100;

when "textSizeComputation" is equal to "horizontalSingle", the text height will be computed so that the width the text displayed on the frame of each text character is equal to textSize*frameWidth/100;

when "textSizeComputation" is equal to "verticalFull", the text height is equal to textSize*frameHeight/100;

when "textSizeComputation" is equal to "verticalSingle", the text height is equal to textSize*frameWidth/100;

"textColor": a string representing a red-green-blue-alpha color, expressed in the RGB color model (cf. https://en.wikipedia.org/wiki/RGB_color_model), which indicates the color to be used when displaying the text.

h) The Shapes

A "shape" is to be understood as a geometrical regular shape.

The "shapes" experience parameter is an array of JSON objects which describe each shape: the possible shapes are e.g. rectangles, ellipses and polygonal lines. Here are the attributes of a single "shape" element, in addition to the "order", "interpolator", "from" and "to" attributes common to all particles:

"shape": this is a string which represents the type of shape, and which has a value among "rectangle", "ellipse" and "polyline".

The "from" and "to" parameters contain the following inner parameters, in addition to the "percentage", "x", "y", "xAlign", "yAlign", "rotation" and "opacity" attributes:

"width": when the shape is not a "polyline", a positive or null floating number which is the percentage of the frame width to indicate the shape width. From this value, a shape width equal to width*frameWidth/100 is computed;

"height": when the shape is not a "polyline", a positive or null floating number which is the percentage of the frame height to indicate the shape height. From this value, a shape height equal to height*frameHeight/100 is computed;

"vertices": when the shape if a "polyline", a series of abscissa and ordinates floating numbers, expressed respectively regarding the frame width and height, which define the vertices of the polygonal lines, a segment being displayed between two consecutives vertices;

"color": a string representing a red-green-blue-alpha color, expressed in the RGBcolor model, which indicates the color to be used when displaying the shape.

i) The Images

An "image" is to be understood as a bitmap, i.e. a series of pixels in a rectangle frame, each pixel having a color expressed in the RGBA color model.

The "images" experience parameter is an array of JSON objects which describe each image. Here are the attributes of a single "image" element, in addition to the "order", "interpolator", "from" and "to" attributes common to all particles:

"url": this is a string which is the URL at which the image is defined and accessible. During the loading phase of the experience, the SDK downloads this image via the rePictuR platform, if not already available in the Internet browser cache, while preserving the original image width over height ratio;

"format": a string which indicates under what format the image should be retrieved, the possible values being "JPEG", "PNG", "WEBP" and "GIF";

"quality": an integer number ranging from 1 to 100, which indicates the image quality in case of a non-lossless format, i.e. for "JPEG" and "WEBP";

"sizeComputation": a string which indicates how the image dimensions will be computed, which can take the value "horizontal" or "vertical".

The "from" and the "to" parameters contain the following inner parameter, in addition to the "percentage", "x", "y", "xAlign", "yAlign", "rotation", "opacity" attributes:

"size": a positive or null floating number which is the percentage of either the frame width when "sizeComputation" is equal to "horizontal", or the frame height when "sizeComputation" is equal to "vertical", to indicate the image dimensions. From this value, a dimension which is equal to "size*dimension/100" is computed, where "dimension" is equal to "frameWidth" or "frameHeight" depending on "sizeComputation", which is passed to the rePictuR resizing server when retrieving the image.

Various renderings involving text and rectangles are illustrated in FIGS. 12A-12E.

j) The Motions

A "motion" is to be understood as a series of ordered frames of the same dimensions, each frame being a bitmap being a series of pixels in a rectangle frame, each pixel having a color expressed in the RGBA color model. The motion may be embodied via an animated GIF image or by any video, whatever its format and encoding. The SDK engine will only render one frame of the motion, the computation of the selected frame being defined via the state "motionCursor" attribute, which offers a video scrubbing experience as the end-user scrolls vertically.

The "motions" experience parameter is an array of JSON objects which describe each motion. Here are the attributes of a single "motion" element, in addition to the "order", "interpolator", "from" and "to" attributes common to all particles:

"url": this is a string which is the URL at which the motion asset is defined and accessible. During the loading phase of the experience, the SDK downloads it via the rePictuR platform, if not already available in the Internet browser cache, which resizes all its frames, while preserving the original motion width over height ratio. In the case of a video, the rePictuR also encodes it into the format supported by the browser;

"sizeComputation": a string which indicates how the motion dimensions will be computed, which can take the value "horizontal" or "vertical".

The "from" and the "to" parameters contain the following inner parameters, in addition to the "percentage", "x", "y", "xAlign", "yAlign", "rotation", "opacity" attributes:

"size": a positive or null floating number, which is the percentage of either the frame width when "sizeComputation" is equal to "horizontal", or the frame height when "sizeComputation" is equal to "vertical", to indicate the motion dimensions. From this value, we compute a dimension which is equal to "size*dimension/100", where "dimension" is equal to "frameWidth" or "frameHeight" depending on "sizeComputation", which is passed to the rePictuR server when retrieving the motion.

"motionCursor": a floating number between 0 and 100, which indicates the motion frame used when rendering the motion. If the motion is made of N frames, the selected frame will be the one at position "N*(motionCursor/100)".

k) An Experience Description Example

In order to illustrate all the experience description parameters, herebelow is an example of an experience description, which involves an experience description complying to the "schemaVersion" 8, which is an Understitial, made of 1 score and 1 track with 1 layer, in which are declared 1 text particle, 2 rectangle shape particles, 1 image particle and 1 motion particle.

```
{
  "modelVersion": 8,
  "type": "understitial",
  "sources": [ { "url": "http://shared.koppasoft.com/patent/nature.jpg" } ],
  "format": "JPEG", "percentage": 80, "actionUrl": "https://www.koppasoft.com",
  "process":
  {
    "scores": [ { "id": "default", "mode": "scrolling", "programs": [ { "trackId": "default" } ] } ]
  },
  "tracks":
  [
    {
      "id": "default",
      "layers":
      [
        {
          "depth": 1,
          "texts":
          [
            {
              "order": 2, "text": "TEXT" "font": "reDisplay",
              "fontUrl": "https://storage.googleapis.com/understitiel-test/Digitalt.ttf",
              "from": { "percentage": 0, "x": 75, "xAlign": "start", "y": 0, "yAlign": "start", "size": 25, "sizeComputation": "horizontalFull", "color": "#FF000080", "rotation": 0 },
              "to": { "percentage": 100, "x": 100, "xAlign": "start", "y": 0, "yAlign": "start", "size": 100, "sizeComputation": "verticalFull", "color": "#0000FFFF", "rotation": 90 }
            }
          ],
          "shapes":
          [
            {
              "order": 0, "shape": "rectangle",
```

```
            "from": { "percentage": 0, "x": 0, "width": 100, "y": 0,
"height": 100, "color" : "#FFFFFF80" },
            "to": { "percentage": 100, "x": 0, "width": 100, "y": 0,
"height": 100, "color": "#FFFFFF80" }
          },
          {
            "order": 1, "shape": "rectangle",
            "from": { "percentage": 0, "x": 62.5, "xAlign": "middle",
"width": 25, "y": 12.5, "yAlign": "middle", "height": 25, "color":
"#0000FFFF", " rotation": 90 },
            "to": { "percentage": 100, "state": 0, "x": 62.5,
"xAlign": "middle", "width": 20, "y": 75, "yAlign": "middle",
"height": 50, "color": "#00F00080", "rotation": 0 }
          }
        ],
        "images":
        [
          {
            "order":         3,          "url":
"http://shared.koppasoft.com/patent/logo.png", "format": "PNG",
"sizeComputation": "vertical",
            "from": { "percentage": 0, "x": 32.5, "xAlign": "middle",
"y": 75, "yAlign": "middle", "size": 50, "color": "#00000080",
"rotation": -45 },
            "to": { "percentage": 100, "x": 32.5, "xAlign": "middle",
"y": 12.5, "yAlign": "middle", "size": 25, "color": "#000000FF",
"rotation": 0 }
          }
        ],
        "motions":
        [
          {
            "order":      0,        "kind":        "animatedGif',    "url":
"http://shared.koppasoft.com/patent/scrolltoon.gif",
"sizeComputation": "vertical",
            "from": { "percentage": 0, "x": 0, "xAlign": "start",
"y": 0, "yAlign": "start", "size": 25, "color": "#000000FF",
"rotation": 0 },
            "to": { "percentage": 100, "x": 0, "xAlign": "start",
"y": 100, "yAlign": "end", "size": 20, "color": "#000000FF",
"rotation": 0 }
          }
        ]
      }
    ]
  }
]
}
``` l) The Usage Metrics

The SDK according to the invention monitors in real-time the position of the experience frame in its viewport, as well as the end-user interactions: this is necessary for its internal rendering process and to properly react to the end-user input stimuli.

The SDK takes benefit of this real-time monitoring and is able to collect and send metrics events for each experience. It is also possible to subscribe to all those events except for the "Request" one which is triggered on server side, via a JavaScript callback mechanism which enables to subscribe in real-time to those events: this enables to plug the metrics to any outer analytics system the integrator may need to resort to.

Herebelow are the events which are triggered for an experience during its lifecycle:

- "Request": this event is triggered on the server side, not by the SDK, when the back-office server receives a request for serving the experience description.
- "Load": this event is triggered as soon as the experience has been successfully loaded. This event is triggered no matter whether the experience is visible in its viewport or not. However, if the experience failed to load, it will not be triggered.
- "Display": this event is triggered as soon as the experience frame has been visible at least a given percentage in its viewport. This percentage is defined in the experience description via the "metrics.displayPercentage" attribute. This way, the experience description designer may indicate that the experience will have been "displayed" to the end-user provided a minimum of its surface will have been visible.
- "View": this event is triggered as soon as the experience has been fully visible at least for a given duration in its viewport. This duration is defined in the experience description via the "metrics.viewDurationInMilliseconds" attribute. This way, the experience description designer may indicate that the experience will have been "viewed" by the end-user provided it has been totally visible for a minimum duration.
- "Scroll": this event is triggered as soon as the end-user has been scrolling up and down while the experience is visible in its viewport. For the time being, this behavior reporting cannot be customized. This way, we can detect when the end-user has been "playing" with the experience.
- "Open": this event is triggered as soon as the end-user clics on the experience frame, provided the "actionUrl"

attribute of the experience is defined. This way, we can record when the end-user has opened the content behind the experience.

The fact that the experience description offers the opportunity to indicate how much percentage of its frame should be displayed and the minimum duration during which it is totally visible by the end-user, enables to define performance criteria.

Once those events have been triggered and collected locally, they are sent to the back-office via a web service. The latter stores all those events.

In the JavaScript and mobile SDKs, when the device does not have an Internet connection, the events are stored locally and then sent back once the Internet connection is restored. In addition, in order to minimize the device consumption (CPU, bandwidth), it may occur that events are sent through batches.

m) Clicking Action

If the experience "actionUrl" parameter is defined, when the end-user clicks on the frame, the SDK will open the content related to the URL referred by the "actionUrl" parameter, via a new Internet browser tab or a dedicated mobile application screen if the actionUrl is a "deep link". Any existing click-to-action animation is immediately stopped.

5) Principles Common to the "Overlay" and "Overfly" User Experiences

Several experiences will be described in the following. Among those experiences, the "Overlay" and "Overfly" experiences consist in displaying a portion of a "promotional image" above an "illustration" image. In this paragraph, we focus on the way the promotional image is handled, the experience workflow states, the way it is displayed, in order to prevent from repeating this process when we will describe them. Hence, the three forthcoming sections will be referenced when describing the "Overlay" and "Overfly" experiences. Consequently, this is not necessary to read them now, but instead to read them when they are referred to.

6) Promotional Image Management

The illustration image is defined via a native "img" HTML element, hence leaving the responsibility of the Internet browser to load it.

The promotional image is defined via its URL, through the "source" parameter.

In most cases, the promotional image dimensions may not be the same as the illustration's: the experience will use the rePictuR service with the "render" parameter set to "outbox", to retrieve a form of the promotional image with either the same width or the same height as the illustration image, and the other dimension greater or equal, that we name the "resized promotional image". There are two cases:

either the width/height ratio of the illustration image is greater or equal to the width/height ratio of the promotional image: in that case, which will be referred as the "larger ratio" case, the resized promotional image will have the same width as the illustration image and a greater height;

or the width/height ratio of the illustration image is less or equal to the width/height ratio of the promotional image: in that case, which will be referred as the "smaller ratio" case, the resized promotional image will have the same height as the illustration image and a greater width.

Figure 13:
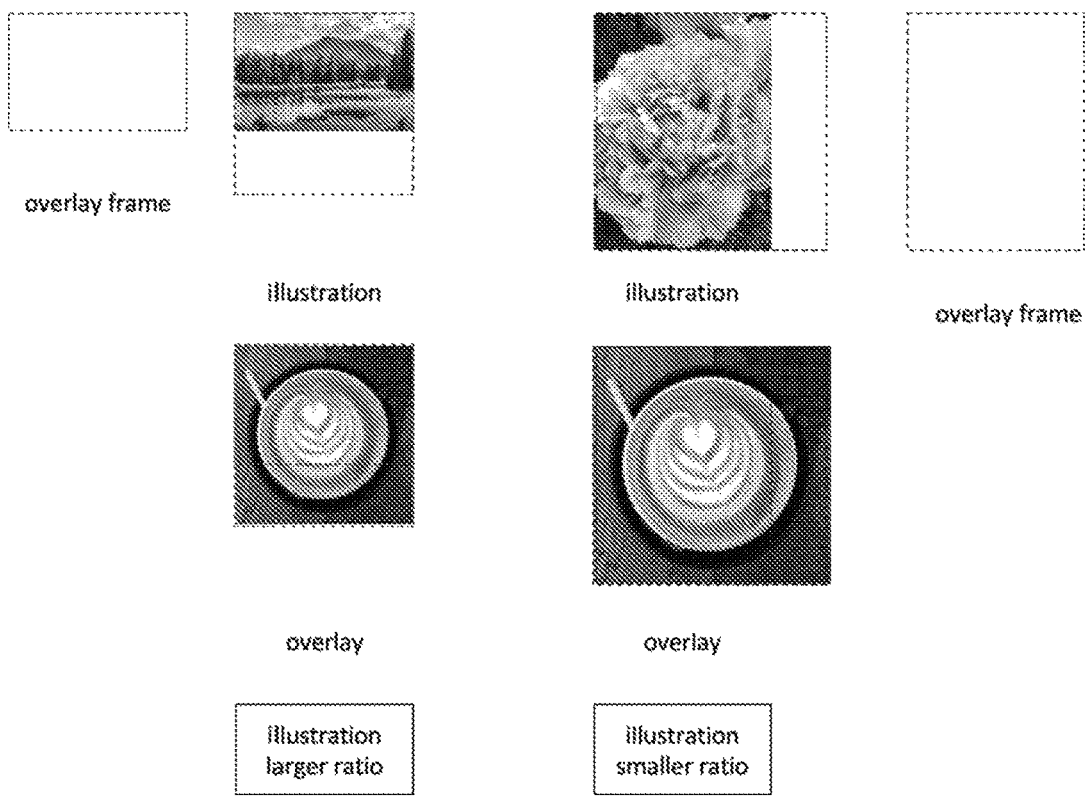
FIG. 13 illustrates the principles of promotional image resizing.

Both cases are illustrated in FIG. 13.

This means that the resized promotional image will have a larger or equal surface than the illustration image, but it is ensured than one of its dimensions is equal to its corresponding dimension on the illustration image. Consequently, when the illustration image will be replaced/overwritten by the resized promotional image, only a fragment of it will be displayed, given that the experience will keep the exact same room as the illustration image to display the resized promotional image During the remaining of the experience description, we will name this "resized promotional image" the "overlay image" for brevity, and the frame initially wrapping the illustration image as the "overlay frame".

7) Experience Workflow States

In addition to the common "load" state described above, the SDK maintains two internal additional states for the experience, the "display" and "extension" states, in order to determine what possible workflow state transition may be applied to incarnate the experience, once it has been properly loaded.

The created HTML5 canvas has the same dimensions as the "img" HTML element, which is the illustration image.

a) The "Display" State

Figure 14A:
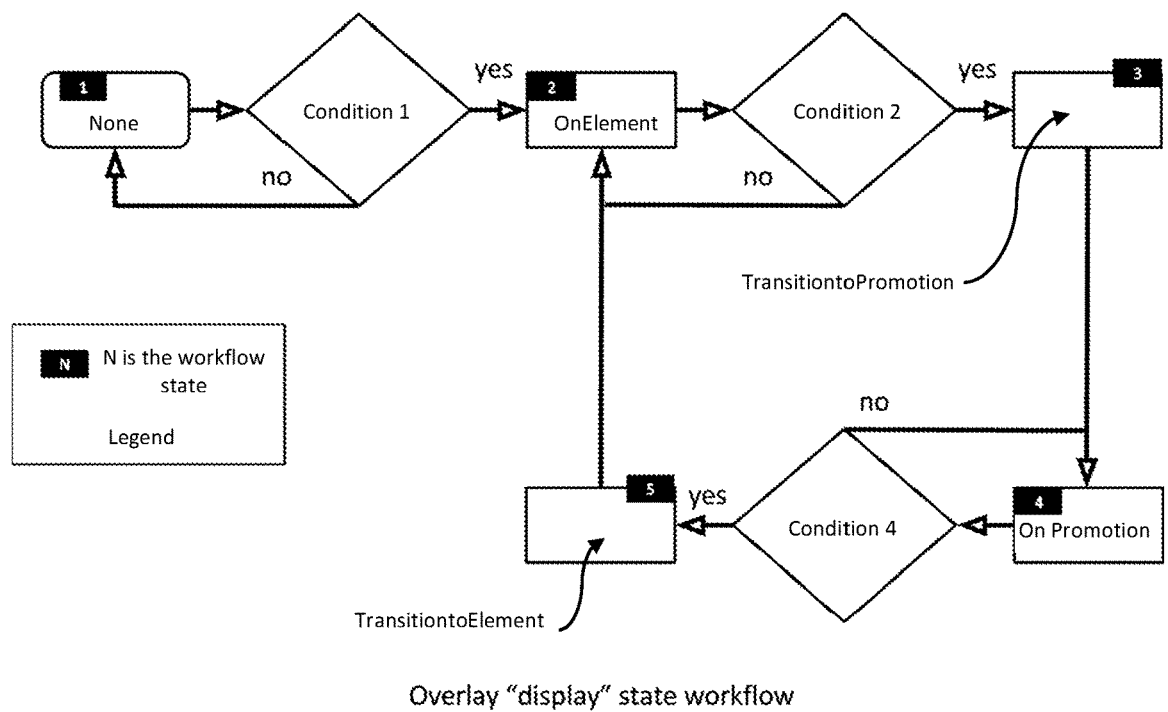
FIGS. 14A and 14B are workflows of a "display" state variable useful in the present invention for an "overlay" and an "overfly" types of user experiences.

For the "Overlay" experience described below, herebelow are the possible values of the "display" state, as illustrated in FIG. 14A.

1. "None": this is the initial state, which remains as long as the "load" state is not equal to "Ready". As soon as the "load" state is equal to "Ready", the state transitions to "OnElement".

2. "OnElement": this state indicates that the illustration image is exclusively being displayed in the overlay frame. As soon as the required conditions, described in the "Required conditions for the appearance transition animation" section, are met for the experience transition animation to run, the state transitions to "TransitionToPromotion".

3. "TransitionToPromotion": this state is a transient state during the experience transition animation which is played, explained in the "Overlay image appearance and disappearance transition animations" section. As soon as the animation has completed, the state transitions to "On Promotion".

4. "OnPromotion": this state indicates that the experience overlay is being displayed. As soon as the necessary conditions are met, described in the "Opened promotion closing action" section, its state transitions to the "TransitionToElement" state.

5. "TransitionToElement": this state is a transient state during the experience transition animation explained in the "Overlay image appearance and disappearance transition animations" section. As soon as the animation has completed, the state transitions back to "OnElement".

Figure 14B:
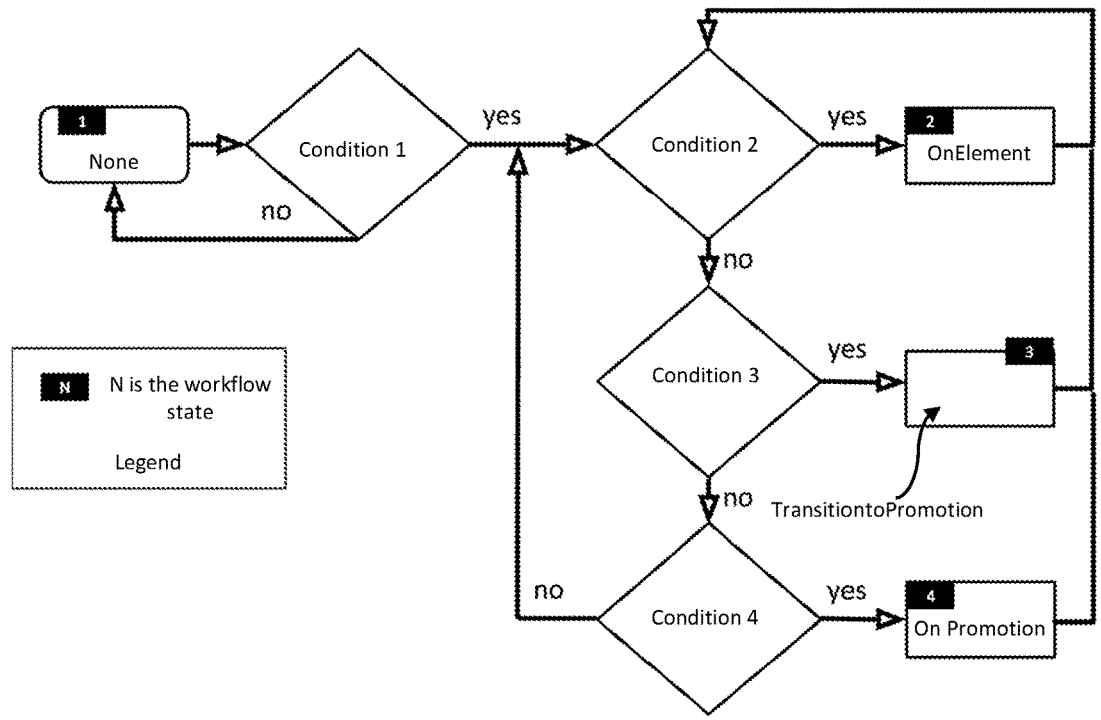

For the "Overfly" experience, here are the possible values of the "display" state, as illustrated in FIG. 14B.

1. "None": this is the initial state, which remains as long as the "load" state is not equal to "Ready". As soon as the "load" state is equal to "Ready", the state transitions to another state, among the three forthcoming values.

2. "OnElement": this state corresponds to the situation where the illustration image is exclusively being displayed in the overlay frame. This state remains a long as $0 \leq visibilityPercentage < startPercentage$ or $endPercentage < visibilityPercentage \leq 100$.

3. "TransitionToPromotion": this state corresponds to the situation where the illustration image is displayed partially but does not covers entirely the overlay frame. This state remains a long as $startPercentage \leq visibilityPercentage < lowerPercentage$ or $upperPercentage < visibilityPercentage \leq endPercentage$.

4. "OnPromotion": this state corresponds to the situation where the illustration image totally covers the overlay frame. This state remains a long as lowerPercentage≤visibilityPercentage upperPercentage.

b) The "extension" state

Figure 15:
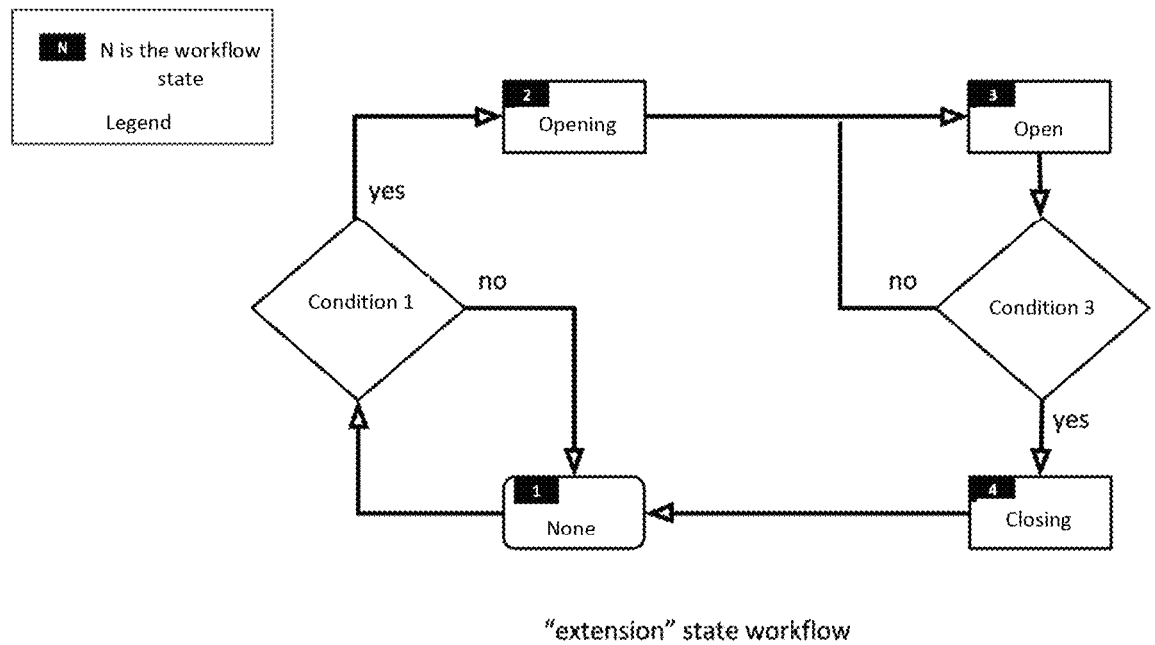
FIG. 15 is a workflow of an "extension" state variable useful in the present invention.

Herebelow are the possible values of the "extension" state, as illustrated in FIG. 15.

1. "None": this is the initial state, which remains as long as the "display" state is not equal to "OnPromotion". When the state is set or reset to that value, a click-to-open animation is being run once, as described in the "Promotion click-to-open animation" section. As soon as the end-user performs a specific action described in the "Promotion opening animation" section, the state transitions to "Opening".

2. "Opening": this is a transient state which lasts as long as the animation, described in the "Promotion opening animation" section, is running. Once completed, the state promotes to the "Open" state.

3. "Open": this is a state which remains as long as the end-user has not performed an action, described in the "Promotion closing action", to close the opened promotion; in that latter case, it transitions to "Closing". As soon as the experience reaches that state, a click-to-action animation is run, as described in the "Promotion click-to-action animation" section. The end-user may perform a specific action described in the "Promotion clicking action" section.

4. "Closing": this is a transient state which lasts as long as the animation, described in the "Opened promotion closing animation" section, is running. Once this animation is over, the state reverts to "None".

8) Overlay Image Dynamic Display

Figure 16:
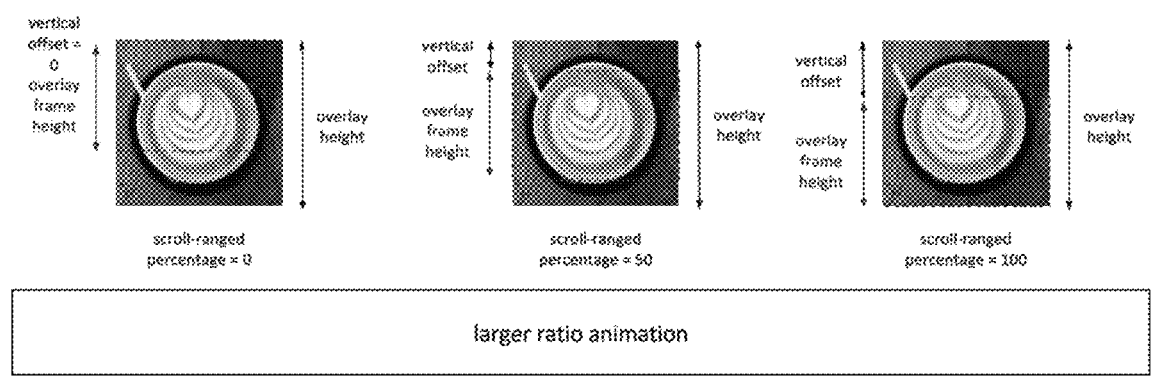
FIGS. 16-19 illustrate the computation of an "offset" value useful in an "overlay" image dynamic display.
Figure 17:
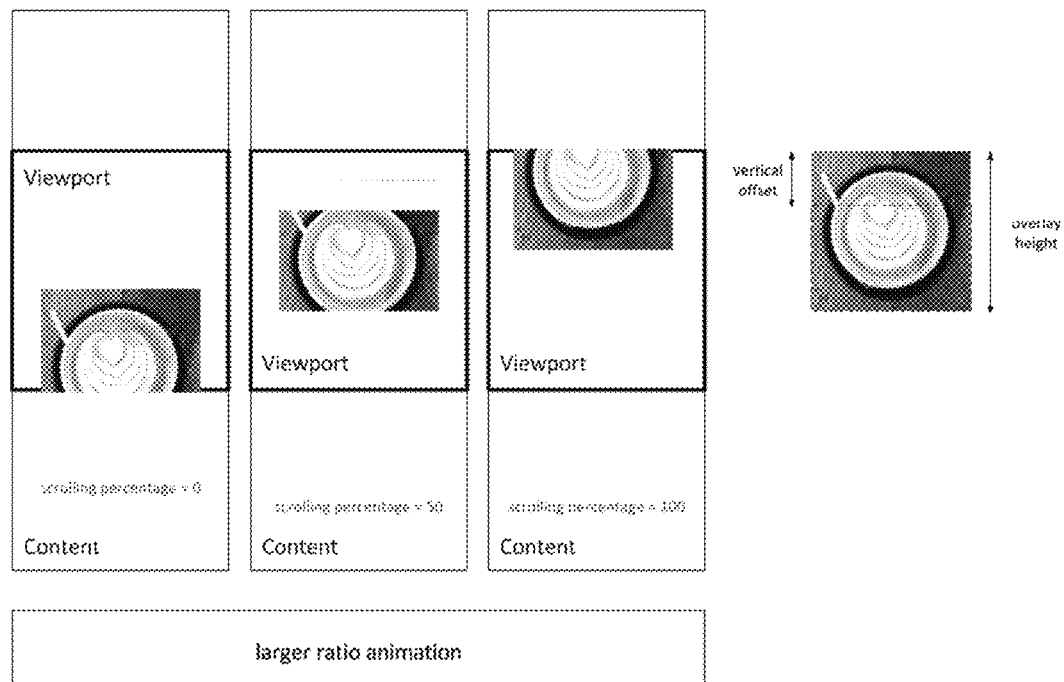
Figure 18:
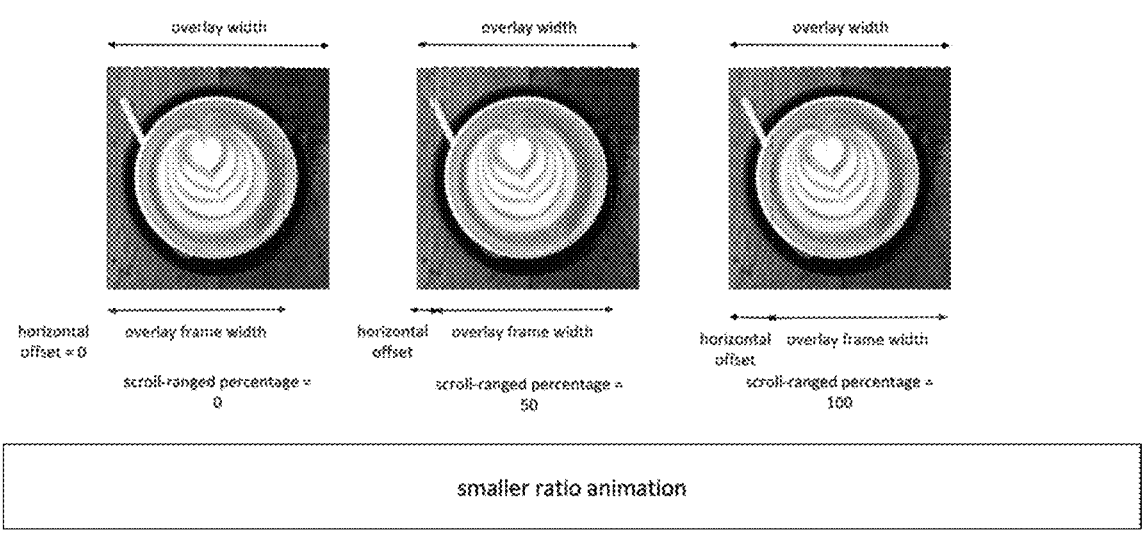
Figure 19:
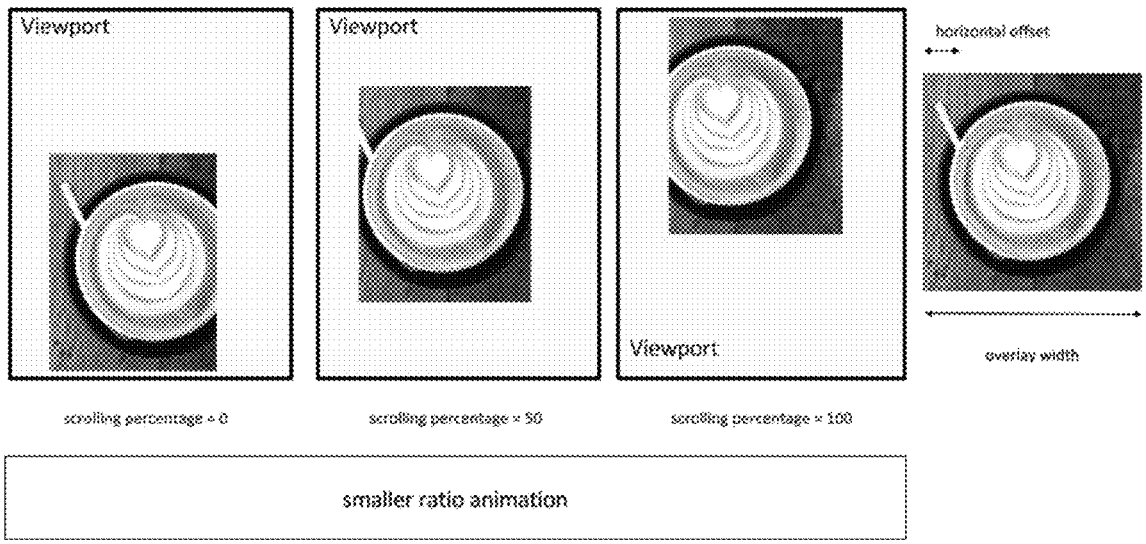
Figure 20A:
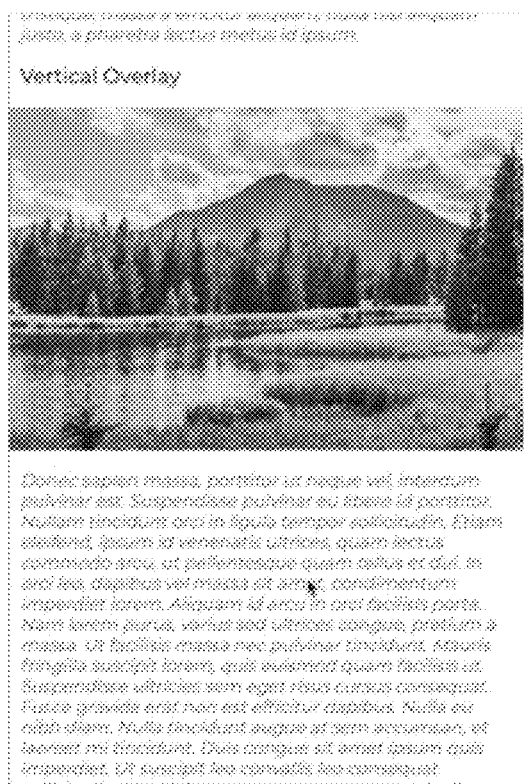
FIGS. 20A-20N illustrate different display renderings in a "vertical overlay" user experience.
Figure 20B:
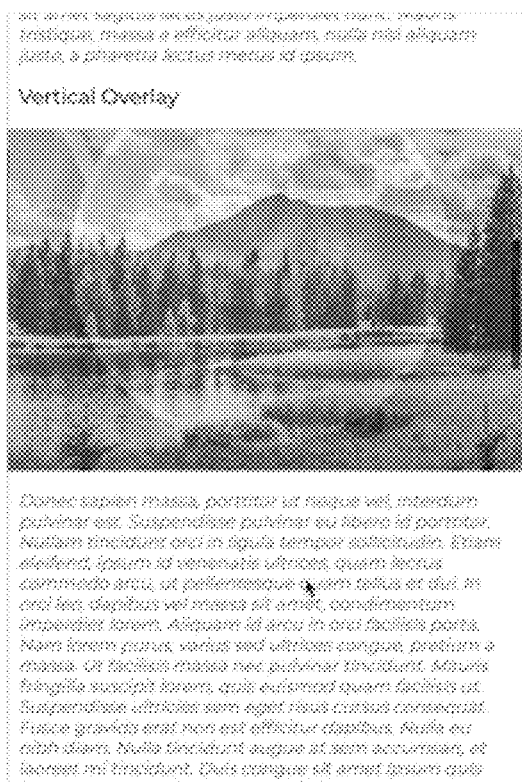
Figure 20C:
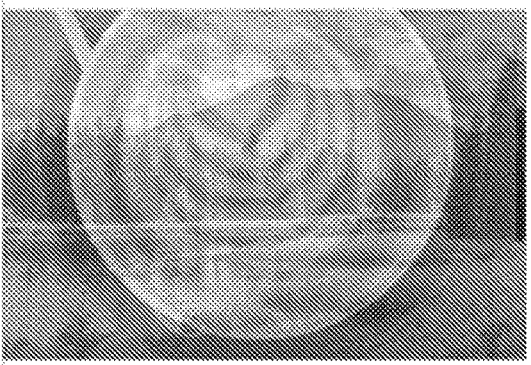
Figure 20D:
Figure 20E:
Figure 20F:
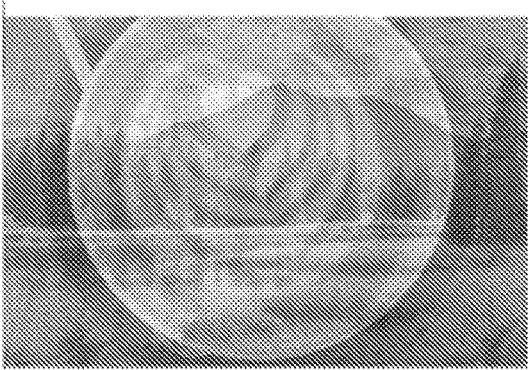
Figure 20K:
Figure 20L:
Figure 20M:
Figure 20N:
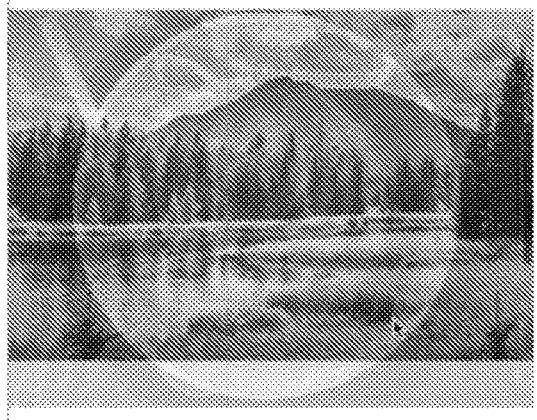
Figure 21E:
Figure 21F:

When the "display" state is "OnPromotion" and "extension" state is "None", the overlay image is displayed over the illustration image, its surface totally covers the overlay frame: we say that the "promotion is visible". Note that each pixel which has some transparency on the promotion image will let the illustration image pixel currently positioned under it visible. This means that the illustration image is replaced by a portion of the overlay image, this portion dynamically depending on the scroller position. Indeed, the experience measures in pseudo real-time, by listening to the events which reveal a change in the scroller vertical position, the overlay frame scrolling percentage:

in case of the "larger ratio", the displayed portion will have the same width as the illustration, its vertical "offset" will be computed proportionally to the scrolling percentage (cf. FIGS. 16 and 17);

in case of the "smaller ratio", the displayed portion will have the same height as the illustration, its horizontal "offset" will be computed proportionally to the scrolling percentage (cf. FIGS. 18 and 19).

The value of this "offset" depends on two numbers extracted from the "scrollRanges" parameter, which is an array of increasing numbers ranging from 0 to 100, that we name "minimum Percentage" and "maximumPercentage", "maximumPercentage" being greater than "minimum Percentage":

in the case of the Overlay experience, the minimum Percentage and maximumPercentage are the first and second values of the "scrollRanges" parameters (which only contain those two values);

in the case of the Overfly experience, the minimum Percentage is the "lowerPercentage" and the maximumPercentage is the "upperPercentage".

The value of this offset will be set to 0 when the scrolling percentage is equal to 0, when the scrolling percentage is equal to 100, its value will be equal to the difference between the overlay and the illustration images dimension, the dimension to consider being the width in the case of the larger ratio, the height in the case of the smaller ratio; let's name "maximumOffset" this value. For a scrolling percentage greater than 0 and less than 100, the offset value is a linear interpolation of the two previous values, i.e. offet=(scrollingPercentage−minimumPercentage)/(maximumPercentage−minimumPercentage)*maximumOffset.

As long as the "extension" state is set to "None", the overlay image will always be displayed within the illustration image frame, which means that it will be truncated it its dimensions exceeds it.

9) Promotion "Click-to-Open" Animation

As soon and as long as the "display" state is "OnPromotion" and the "extension" state is "None", which involves that the promotional image totally covers the illustration frame, a "click-to-open" animation is being run once over the overlay frame.

This animation is defined by the "animations" parameter which contain two attributes:

"firstClick": this attribute is the URL of the animation to download and which will be used for the hereby animation. If not defined, a default animation located locally in the SDK will be used;

"secondClick": this attribute is the URL of the animation to download and which will be used for the animation to run if the end-user has touched the overlay frame while experience "extension" state is set to "Open". If not defined, a default animation located locally in the SDK will be used.

As mentioned earlier, the experience will have previously downloaded the "firstClick" animation definition: this animation is described via a JSON format designed in the JavaScript bodymovin library (cf. https://github.com/bodymovin/bodymovin, released under a MIT licence), which is able to interpret an Adobe After Effects animation (cf. http://www.adobe.com/products/aftereffects.html), previously translated via the Lottie plug-in (cf. https://medium-.com/airbnb-engineering/introducing-lottie-4ff4a0afac0e).

Note that this animation needs to have been downloaded before the experience state switches to the "Ready" state. This animation is run by the bodymovin library runtime, configured so that at each animation frame displaying a specific SDK callback function is invoked so as to erase and display the overlay frame display, in order to prevent from any animation overwriting issue.

10) Promotion Opening Animation

While the overlay image is displayed and totally covers the illustration frame, i.e. its "display" state is equal to "OnPromotion" and its "extension" state equal to "None", if the end-user clicks on it via a touch on a touch-screen or via a pointing device, the experience will open it, so as to fully display the promotion image, in the case of the larger ratio. In the case of the smaller ratio, the effect of this action will directly skip to the promotion clicking sequence described in the "Promotion clicking" section. During this animation, the "display" state remains equal to "OnPromotion" but the "extension" state transitions to "Opening", and once completed to "Open".

The content above and beneath overlay frame will be pushed upward and downward in order to enlarge the overlay frame height, while the scroller position will be updated so that the center of the overlay is at the center of the viewport. This process will be done progressively through a smooth transition during which an event will be triggered at regular intervals and given a "time" parameter.

If "N+1" is the number of those events and "duration" is the duration of this transition expressed in millisecond, each event will be triggered every "duration/N" millisecond, a first event being initially triggered; if "i" is an ordinal between 0 and N, for the ith event, its "time" value is equal to "i*(100/N)". During this transition:
- the overlay frame height starts from its initial value "startHeight", at the first event, until a final value, "endHeight", at the last Nth event. If "overlayImageHeight" is the height of the overlay image, endHeight=Math.min((100−freePercentage)*viewPortHeight, overlayImageHeight), where "freePercentage" is an experience parameter, a number greater than or equal to 0 and less than 100, which enables to prevent the frame to span too much vertical space. For the event "i", its height will be equal to "startHeight+(endHeight−startHeight)*(i)", so that the value is a linear interpolation;
- the scroller position starts from its initial value "startPosition", at the first event, until a value "endPosition" such as the overlay image is centered vertically, at the last Nth event. For the event "i", its value will be equal to "startPosition+(endPosition−startPosition)*(i)", so that the value is a linear interpolation.

11) Promotion "Click-to-Action" Animation

As soon and as long as the promotion is open, i.e. the "display" state is "OnPromotion" and the "extension" state is "Open", provided the "actionUrl" experience parameter is defined, a "click-to-action" animation loops endlessly over the overlay frame. This animation is run through the same bodymovin library. The nature of this animation is defined through the "secondClick" attribute described in the "Promotion click-to-open animation" section. This animation prompts the end-user to click once again on the overlay frame, in order to redirect her to the content hosted on the URL defined by the "actionUrl" parameter.

12) Promotion Clicking Action

As soon and as long as the promotion is open, i.e. the "display" state is "OnPromotion" and the "extension" state is "Open", the experience provides the mechanism described in the general "Clicking action" section.

When the end-user focuses back on the experience, that is to say if the experience is run through an Internet browser when the selected tab is the one which encompasses the originated experience, if the experience is run through a native mobile application when the end-user comes back to the screen the experience was originally displayed on, the experience will skip to the sequence described in the "Opened promotion closing animation" section, as if an action was performed to close it and to provide the visual effect that the experience resumes.

13) Opened Promotion Closing Action

As soon and as long as the promotion is open, i.e. the "display" state is "OnPromotion" and the "extension" state is "Open", if the scroller value changes, the experience will start the animation described in the "Opened promotion closing animation". The promotion click-to-action animation is immediately stopped. The experience hence allows the end-user to resume its digital content reading experience without having to click anywhere, but just by scrolling vertically.

14) Opened Promotion Closing Animation

When this animation starts, the "extension" state is set to "Closing", and when the animation is completed, its state is set back to "None" and the "display" state is set to "OnElement".

This animation is the reverse of the "Promotion opening animation", namely the overlay frame will progressively shrink to the same dimensions as the illustration image, shifting the content above the overlay frame downwards and the content beneath upwards to fill back the space it used to take up, while, at the same time, the "Overlay image disappearance transition animation" will run, so as to provide a smooth transition to the original illustration state.

Once the illustration image is displayed back, it is displayed as if no overlay image had been displayed, except if it has a "reminder" parameter, as described on the "Reminder display" section.

The overlay image will not be displayed any longer, i.e. the experience "display" state will remain in the "OnElement" state, as long as the illustration image visibility percentage is greater than 0, i.e. as long as a single pixel of it is visible to the end-user in the viewport. As soon as this percentage is equal to 0, the experience may be run again. The "maximumDisplayCount" parameter, which is a positive integer, controls how many times the experience may occur: every time the experience starts running, an internal counter (starting with the 0 value) is increased by 1, and when this counter is greater that this parameter, the experience will not be run anymore, provided the content is not reloaded.

15) Reminder Display

If the experience "reminder" parameter is set, as well as the "actionUrl", and that its "reminder.icon" attribute, which is an image URL, is defined, the experience displays this image—previously downloaded during the loading phase—over the overlay frame on the right-bottom corner when the "display" state is set to "OnElement" and if it went through the "OnPromotion" state in the past. This reminder image must be clickable by the end-user, and in the case she clicks on its region, the experience will perform the action described in the "Promotion clicking" section. This feature enables the end-user to see the "actionUrl" content.

III—The "Overlay" Experience

1) Overview

This experience displays a "promotional image" above an "illustration image"; its "type" parameter is "overlay". The illustration image is immediately displayed in the content and, depending on conditions, a portion of the promotional image will appear above the illustration image, fitting exactly the illustration frame, totally covering it, with an transition animation and will remain displayed during a specific amount of time, the position displayed will change while the scroller position changes, and will eventually disappear with an transition animation if the scroller position does not change for a certain amount of time. When the promotional image is displayed, the end-user may click on it (via a touch-screen event or a mouse click), which will expanse it, revealing its entire estate. If the end-user clicks again on it while being expended, a content will be opened. Otherwise, if no action is taken by the end-user, the promotional image will disappear and will be replaced by the initial illustration image, with an optional reminder.

The way the promotional image is handled is described in the "Promotional image management" section.

2) Rendering

Two exemplary renderings of this experience, i.e. "Vertical Overlay" and "Horizontal Overlay", are shown in FIGS. 20A-20N and 21A-21F of the drawings, respectively.

3) Loading and Workflow States

The way the experience is loaded and the description of the states and related workflow is described in the above "Experience workflow states" section.

4) Overlay Image Appearance and Disappearance Transition Animations

The experience runs two opposite animations relying on two images, labeled as the "first image" and the "second image":

1. before displaying the promotion image, under conditions described in the "Required conditions for the appearance transition animation" section, the first image is the illustration image, the second image is the overlay image, this animation being referred as the "appearance transition animation";
2. and before stopping to display the promotion image, namely display back the illustration image, under conditions described in the "Visible promotion closing" section, the first image is the overlay image, the second image is the illustration image, this animation being referred as the "disappearance transition animation".

We consider the overlay image and not the full promotion image, because only the overlay image has the same dimensions as the illustration image and the overlay frame. This involves that, during the animation, the scroller position is monitored and the portion of the overlay image that will be taken into account is computed with the same offset as the one described in the "Promotional image dynamic display" section.

The two animations are the same, the only thing which changes is the order of the two images they rely upon and their duration, the second being preferably set to a shorter value so that the end-user can return more quickly to the illustration image.

5) Required Conditions for the Appearance Transition Animation

Figure 22:
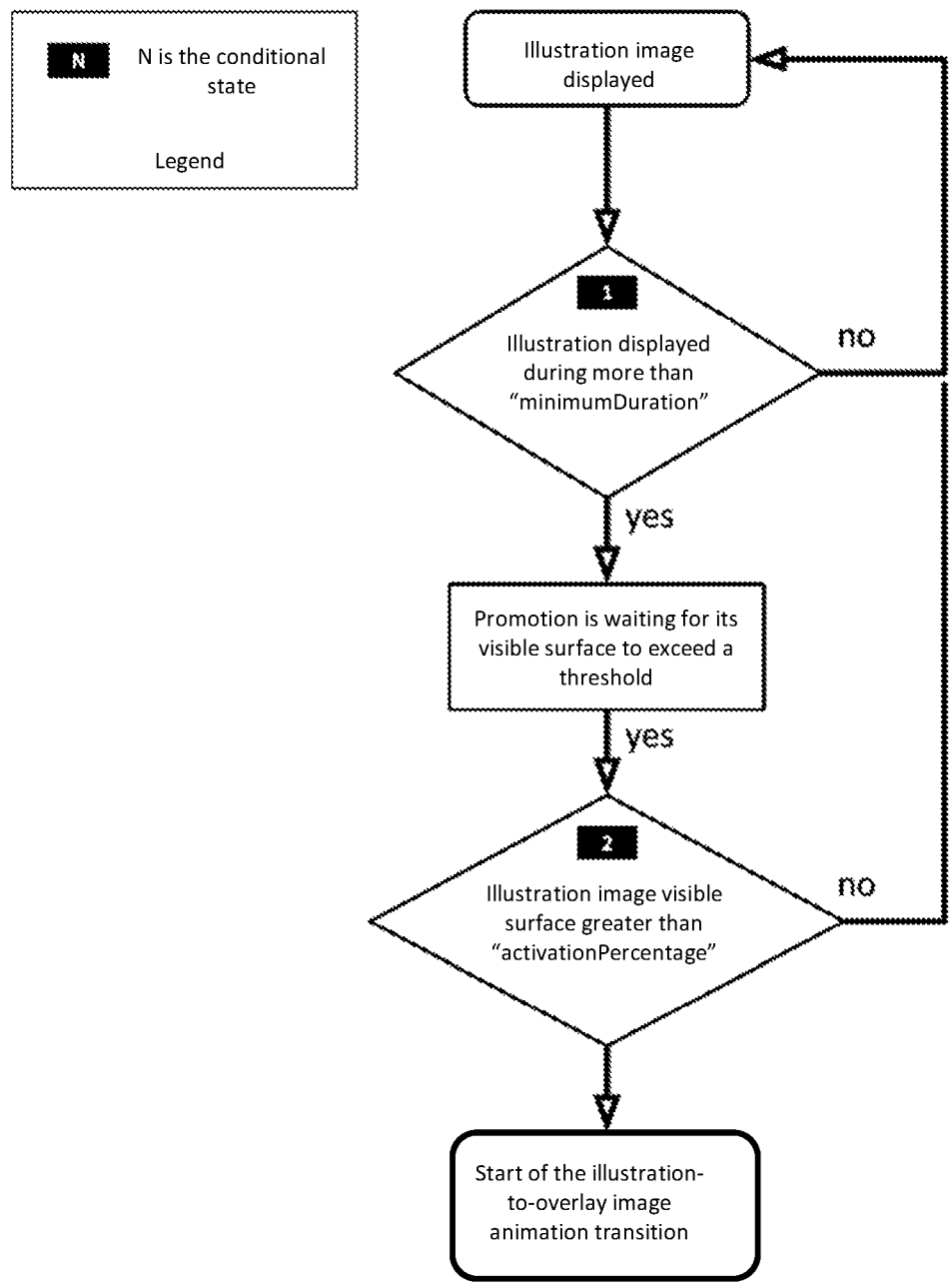
FIG. 22 illustrates a workflow for the determination of an "OnPromotion" condition.

In order for the appearance transition animation to be run, i.e. its "display" state to be equal to "OnPromotion", certain conditions must be met, which are described via the experience parameters, as illustrated in FIG. 22.

1. the minimum duration the illustration image should be displayed on the screen, expressed in millisecond, which is referred as the "illustrationMinimumDisplayInMilliseconds" parameter, shorted as "minimumDuration": as long as this duration is not reached, the illustration image remains displayed and the promotional image is not revealed to the end-user;
2. the percentage of the illustration to be visible on the viewport, expressed in percentage of its surface, which is referred as the "activationPercentage" parameter: when computing how much time it has been displayed, if its visibility percentage is greater or equal to that threshold value, it will increase the duration counter.

As soon as all the previous conditions are met, the "display" state is promoted to "TransitionToPromotion", an transition animation is run, which initially displays the illustration and eventually displays the overlay image. At the end of this animation, the "display" state is "OnPromotion" and the "extension" state is "None".

6) The Transition Animation a) Transition Animation Overview

This transition animation depends on a parameter, referred to as the "transition" parameter.

While running the transition animation, the SDK computes its "rendering", which is the visual result of the animation state at every step, consisting in an image bitmap of the same dimensions as the overlay frame, named the "animation rendered image", i.e. a series of pixels colors organized in a row-and-column grid, being displayed over the overlay frame, previously cleared at every rendering. Each pixel is given the traditional red-blue-green-alpha value ranging from 0 to 255, which indicates that the pixel holds an "alpha" value, which is transparency/opacity factor. The alpha of a pixel ranges from 0, meaning that it is totally transparent, hence invisible which involves that the background it is displayed on is totally visible, to 1, meaning that it is totally opaque, hence totally eclipsing the background it is being displayed on. The transparency is the opposite of the opacity.

This "animation rendered image" is the result of the displaying in a frame of the same size as the overlay frame initialized with transparent pixels, of the first image on which a transformation is applied, and then over, the displaying of the second image on which another transformation is applied, the two transformations depending on the progress percentage.

In order to run the transition animation, a timer is set so that an event is triggered at regular intervals, each event allowing to compute the rendering: to this event is attached a "progress percentage" value, referred as "progressPercentage", ranging from 0, the start of the animation, to 1, the completion of the animation, this parameter being time-proportionally incremented.

The duration of this animation is customizable via a parameter named the "transitionDurationInMilliseconds": a new computing of the animation rendered image is performed at 60 Hz. —in order to ensure a smooth visual effect—, hence the number of renderings will increase linearly with this duration parameter.

Five different values are available for the "animation" parameter, that we describe.

"none": no animation will be run and the second image will suddenly replace the first image. In that specific case, no timer is used.

"opacity": the animation consists in displaying the first image with a decreasing opacity, i.e. fading, while, at the same time, the overlay is being displayed over the second with an increasing opacity.

"grey": the animation consists in displaying the first image with a tint of grey progressively increasing while its opacity is decreasing, i.e. fading, until it is only displayed in grey shades, while, at the same time, the second image is being displayed over with a decreasing tint of grey and an increasing opacity.

"pixelation": the animation consists in displaying the first image with an increasing pixelation effect while its opacity is decreasing, i.e. fading, while, at the same time, the second image is being displayed over with a decreasing pixelation effect and an increasing opacity.

"noise": the animation consists in displaying the first image with an increasing noise effect while its opacity is decreasing, i.e. fading, while, at the same time, the second image is being displayed over with a decreasing noise effect and an increasing opacity.

b) The "Opacity" Transition Animation

For this transition animation, the images are being displayed with an opacity, noted "opacity" according. For the first image, the formula is the following:

opacity=1−progress Percentage.

Regarding the second image, the formula is:

opacity=progressPercentage.

Figure 23:
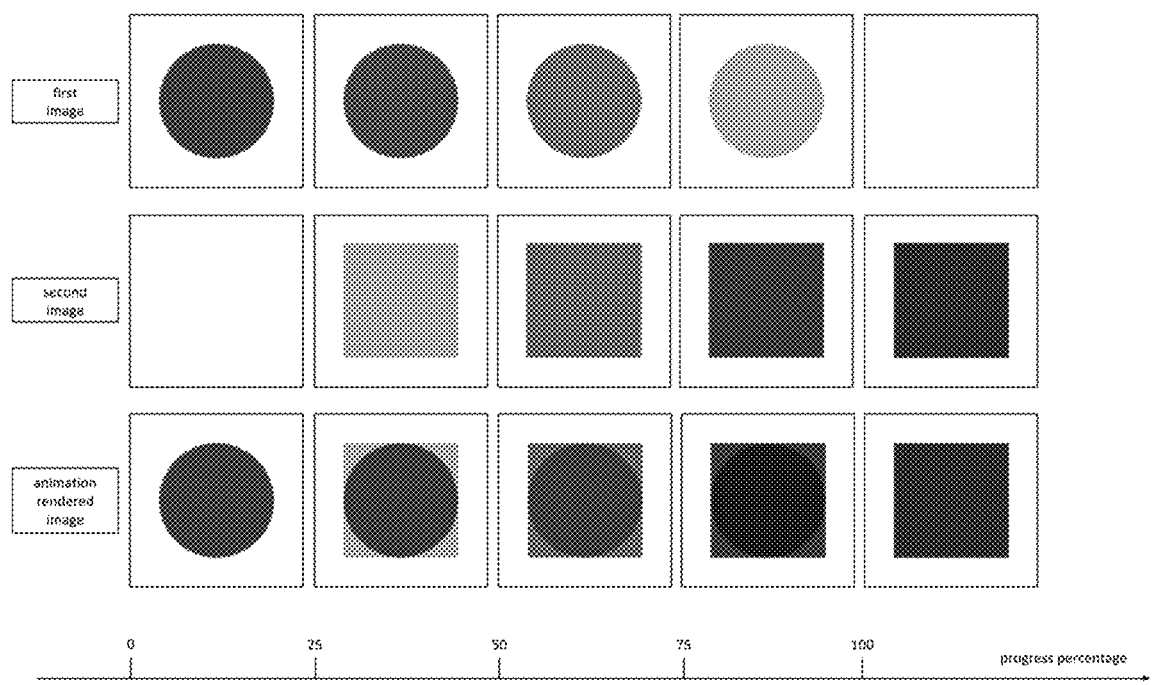
FIGS. 23-26 illustrates the principles of "opacity", "grey", pixelation" and "noise" transition animation, respectively, FIG. 24BIS shows an equation involved in a certain transition animation.

FIG. 23 shows different examples of opacity transition animations.

c) Grey Transition Animation

For this transition animation, the images are being displayed with an opacity, noted "opacity" and a tint of grey, noted "greyPercentage": this is the same process as the "opacity" animation, plus a grey effect. The grey effect turns every pixel value $P_f(c,r)$ of an image into a new value, according to the following formula:

$$P_f(c,r)=(P_{or}(c,r)+F_r,P_{og}(c,r)+F_g,P_{ob}(C,r)+F_b,P_{oa}(c,r)),$$

where c is the column of this pixel, r its row, $P_{or}(c,r)$, $P_{og}(c,r)$, $P_{ob}(c,r)$ and $P_{oa}(c,r)$ respectively the value of the pixel red, green, blue and alpha channels, $$F_r=(\text{mean}-P_{or}(c,r))\times\text{greyPercentage},$$

$$F_g=(\text{mean}-P_{og}(c,r))\times\text{greyPercentage},$$

$$F_b=(\text{mean}-P_{ob}(c,r))\times\text{greyPercentage},$$

mean being the average value of the pixel red, green, blue channels, i.e. mean=$(P_{or}(c,r)+P_{og}(c,r)+P_{ob}(c,r))\div 3$.

For the first image, the formula is the following:

opacity=1−progressPercentage;

greyPercentage=Math.min(1, progressPercentage*2), which involves that the first image is totally displayed in grey from the middle of the animation.

Regarding the second image, the formula is:

opacity=progressPercentage;

greyPercentage=Math.max(0, 1−progressPercentage*2), which involves that the second image is totally displayed in full from the middle of the animation.

Figure 24:
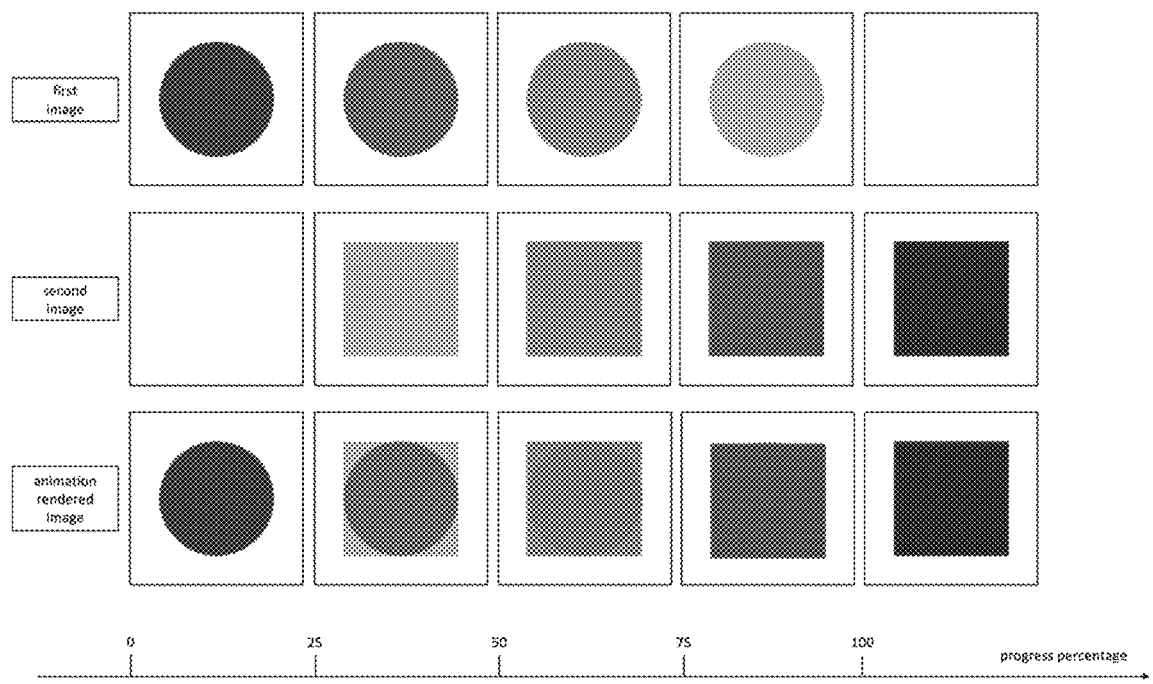

FIG. 24 shows different examples of grey transition animations.

d) Pixelation Transition Animation

The pixelation of an image is a two-step process, which is used for this animation, and which we now explain.

The first step consists in considering an image, named the "input image", of dimensions (width, height) in pixels and assuming that width and height are integers, and downsizing it by a positive integer factor (usually a power of 2, i.e. factor=$2^n$ where n is a positive integer, and usually width and height are multiple of factor), namely displaying it in a frame of dimensions (width÷factor, height÷factor), which yields a new image called the "down-sized image": since the down-scaled image dimensions are smaller (a factor$^2$ smaller) when width and height are multiples of factor) than the image, its pixels values are interpolated according to the formula shown in FIG. 24BIS, where:

$P_{down}(c,r)$ is the pixel value of the down-sized image at position (c,r), c∈ [1, Math.ceil(width÷factor)], r∈[0, Math. ceil(height÷factor)], c being the column of this pixel, r its row, $P_{input}$ (i,j) being the value of the input image pixels at position (i,j) and count=(cmax−c×factor)×(rmax−r× factor) is the number of pixels for the interpolated pixel. This formula computes a mean of the image pixels around its neighborhood.

The second step displays the down-scaled image into a frame of the same dimensions as the image, which yields an "up-scaled image": since the up-scaled image is larger than the down-scaled image (a factor$^2$ larger) when width and height are multiples of factor), its pixels value are interpolated according to the following formula:

$$P_{up}(i,j)=P_{down}(\text{Math. floor}(i\div\text{factor}), \text{Math. floor}(j\div\text{factor}))$$

where Math. floor(x) is the floor integer value of x, $P_{up}(i,j)$ being the pixel value at position (i,i), c∈[1, width], r∈[1, height].

This pixelation process provides a visual effect that the input image has been enlarged with a resolution loss.

The animation effect displays the two images with an "opacity" and a pixelation effect with a "factor": this is the same process as the "opacity" animation, plus a pixelation effect. For the first image, the formula is the following:

opacity=1−progressPercentage;

factor=Math.round(Math.max(1, Math.min(pixelMaximumEdge, pixelMaximumEdge*((1−percentage)*2)))), which involves that the first image pixelation is maximal from the middle of the animation For the second image, the formula is the following:

opacity=progressPercentage;

factor=Math.round(Math.max(1, Math.min(pixelMaximumEdge, pixelMaximumEdge*(percentage*2)))), which involves that the second image pixelation does not apply anymore from the middle of the animation.

Figure 25:
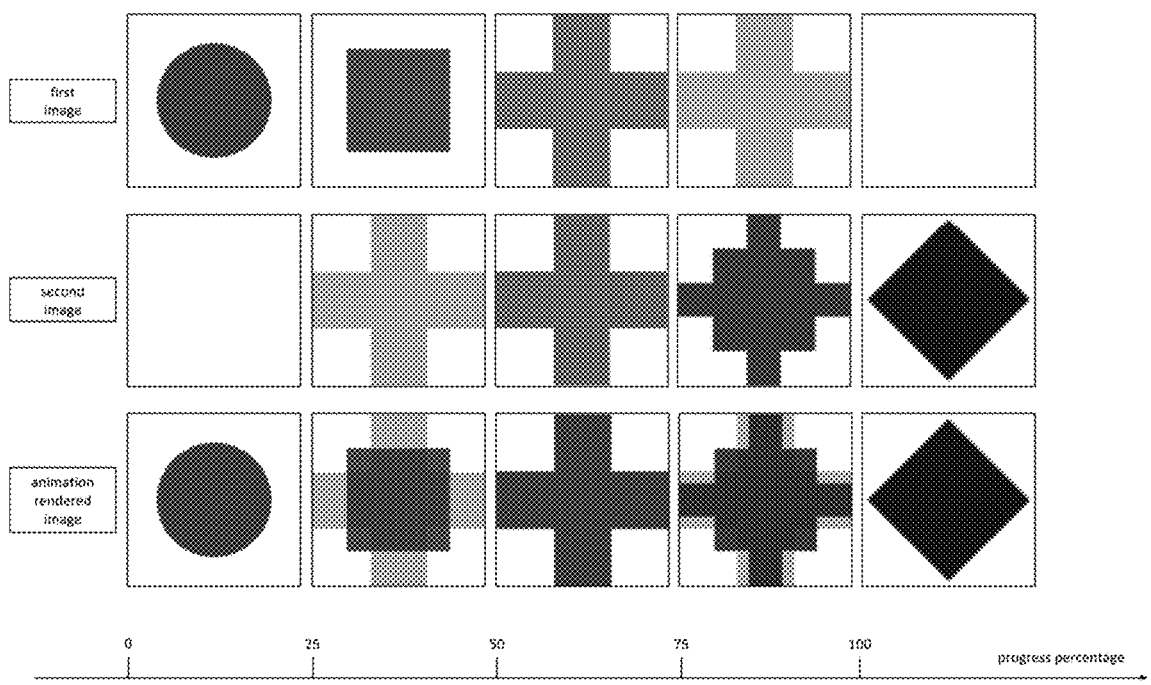

FIG. 25 shows different examples of pixelation transition animations.

e) Noise Transition Animation

For this transition animation, the images are being displayed with an opacity, noted "opacity" and a noise factor, noted "noisePercentage": this is the same process as the "opacity" animation, plus a noise effect.

The noise effect with value noisePercentage turns every pixel value $P_f(c,r)$ of an image into a new value, according to the following formula: $P_f(c,r)=(R_r, R_g, R_b, P_{oa}(c,r))$, where c is the column of this pixel, r its row, $P_{or}(c,r)$, $P_{og}(c,r)$, $P_{ob}(c,r)$ respectively the value of the pixel red, green and blue channels, $R_r=P_{or}(c,r)+(\text{random}-P_{or}(c,r))\times\text{noisePercentage}$, $R_g=P_{og}(c,r)+(\text{random}-P_{og}(c,r))\times\text{noisePercentage}$, $R_b=P_{ob}(c,r)+(\text{random}-P_{ob}(c,r))\times\text{noisePercentage}$, where random is a random integer number ranging from 0 to 255 which is computed for every pixel, hence producing a noise effect.

For the first image, the formula is as follows:

opacity=1−progressPercentage;

noisePercentage=Math.min(1, progressPercentage*2), which involves that the first image noise is null from the middle of the animation.

Regarding the second image, the formula is:

opacity=progressPercentage;

noisePercentage=Math.max(0, 1−progressPercentage*2), which involves that the second image noise is null from the middle of the animation.

Figure 26:
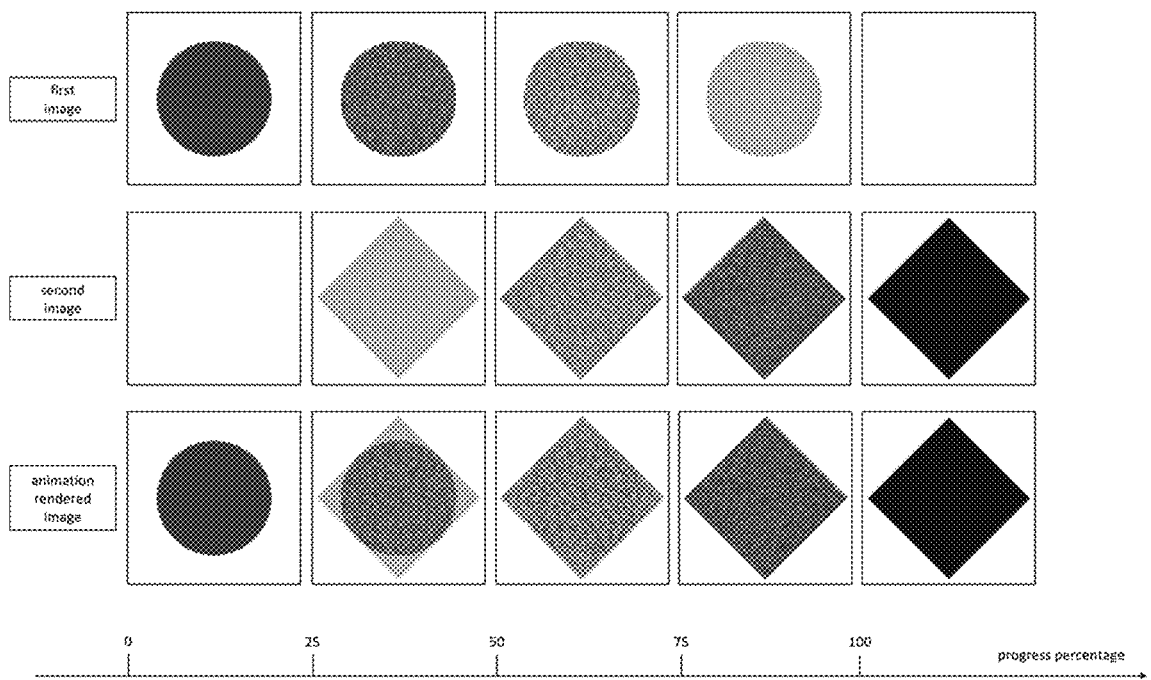
Figure 27E:
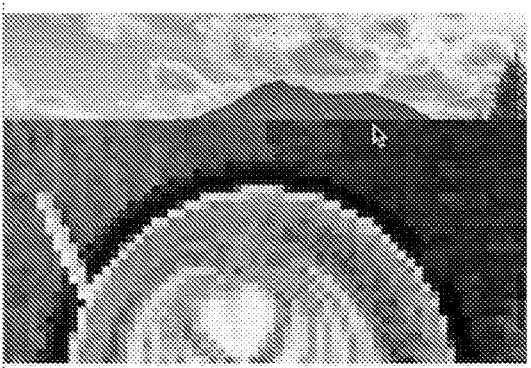
Figure 27F:
Figure 27G:
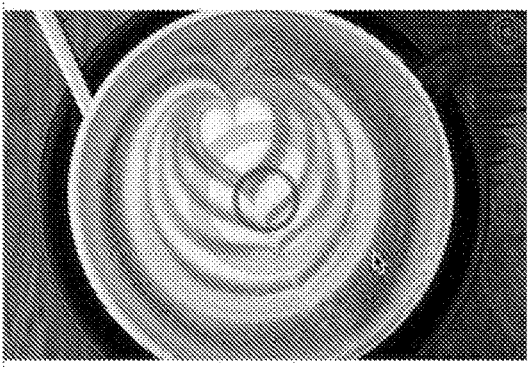
Figure 27H:
Figure 27I:
Figure 27J:
Figure 27K:
Figure 27L:
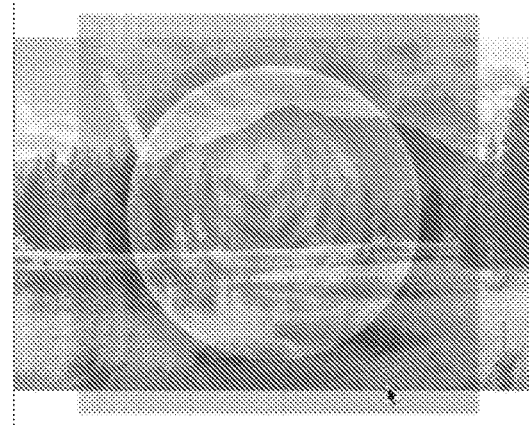
Figure 27M:
Figure 28A:
FIGS. 28A-28F illustrate different display renderings in a "horizontal overfly" user experience.
Figure 28B:
Figure 28C:
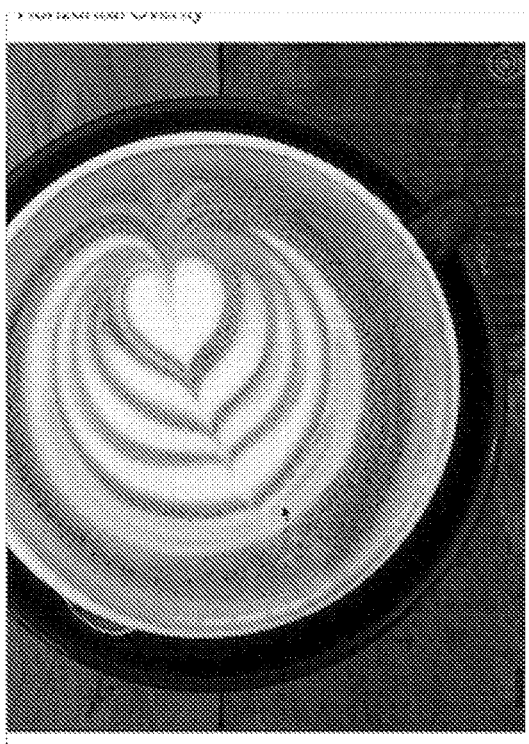
Figure 28D:
Figure 28E:
Figure 28F:

FIG. 26 shows different examples of noise transition animations.

7) Promotional Image Dynamic Display

Once the previous appearance transition animation is over, i.e. the "display" state is "OnPromotion" and "extension" state is "None", the overlay image is displayed over the illustration image. The way the overlay image is displayed over the illustration image is described in the "Overlay image dynamic display" section.

8) Sticker Display

This experience integrates the "sticker" described above in the "Sticker display" section.

9) Promotion Click-to-Open Animation

This experience integrates a promotion click-to-open animation, as described in the above "Promotion click-to-open animation" section dedicated to the Overlay and Overfly experiences.

10) Visible Promotion Closing Conditions

The "promotionMinimumDisplayInMilliseconds" parameter of this experience is a positive integer expressed in millisecond, which affects the conditions for the experience to close the visible promotion.

Once the promotion is visible, i.e. the "display" state is "OnPromotion" and the "extension" state is "None", there are three conditions under which the experience remains visible, i.e. in the same state:
1. as long as the end-user maintains a touch on the screen for touch-screen devices,
2. as long as the overlay frame is visible on the screen, i.e. its scrolling visibility is greater than 0,
3. as long as two consecutive scroller position change events occur with a timespan less than the "promotionMinimumDisplayInMilliseconds" parameter.

As soon as at least one those conditions is not met anymore, the visible promotion will be closed as described in the "Visible promotion closing" section.

Those conditions ensure that the promotion will be displayed as long as the end-user scrolls vertically and it is visible on the screen, and at least a minimum of time, in order for her to acknowledge it.

11) Visible Promotion Closing

The "display" state transitions to "TransitionToElement", the disappearance animation described in the "Overlay image appearance and disappearance transition animations" section is played and the "display" state transitions back to "OnElement". If the promotion click-to-open animation is running, it is immediately stopped, before the previous animation starts.

A reminder may be displayed over the illustration image, as described in the above "Reminder display" section.

12) Promotion Opening Animation

This experience integrates a opening animation, as described in the above "Promotion opening animation" section dedicated to the Overlay and Overfly experiences.

13) Promotion "Click-to-Action" Animation

This experience integrates a click-to-action animation, as described in the above "Promotion click-to-action animation" section dedicated to the Overlay and Overfly experiences.

14) Promotion Clicking Action

This experience integrates a promotion clicking action mechanism, as described in the above "Promotion clicking action" section dedicated to the Overlay and Overfly experiences.

15) Opened Promotion Closing Action

This experience integrates a promotion closing action mechanism, as described in the above "Opened promotion closing action" section dedicated to the Overlay and Overfly experiences.

16) Opened Promotion Closing Animation

This experience integrates a promotion closing animation, as described in the above "Opened promotion closing animation" section dedicated to the Overlay and Overfly experiences.

17) Reminder Display

This experience integrates a reminder display mechanism, as described above in the "Reminder display" section dedicated to the Overlay and Overfly experiences.

IV—the "Overfly" Experience

1) Overview

Similar to the "Overlay", this experience displays a "promotional image" above an "illustration image". Its "type" parameter is equal to "overfly". The illustration image is immediately displayed in the content and, as the end-user scrolls up or down the content, a portion of the promotional image will appear above the illustration image, fitting exactly either the width or the height of the illustration frame. The portion of the promotion image displayed will increase as the illustration frame is being centered on its wrapping content vertically, and as long as the promotional image does not fully covers the illustration image frame, a graphical filter may be applied on it. When the frame is vertically centered on the content, it totally covers it and in that case the end-user may click on it (via a touch-screen event or a mouse click), which will expanse it, revealing its entire estate. If the end-user clicks again on it while being expended, a content will be opened. If the end-user scrolls again while the promotional image is expended, the promotional image disappears, revealing an optional reminder.

The way the promotional image is handled is described above in the "Promotional image management" section.

2) Rendering

Two exemplary renderings of this experience, i.e. "Vertical Overfly" and "Horizontal Overfly", are shown in FIGS. 27A-20M and 28A-28M of the drawings, respectively.

3) Loading and Workflow States

The way the experience is loaded and the description of the states and related workflow is described above in the "Experience workflow states" section.

4) Promotional Image Dynamic Display

A portion of the overlay image will be displayed over the illustration image according to the scroller position.

Figure 29:
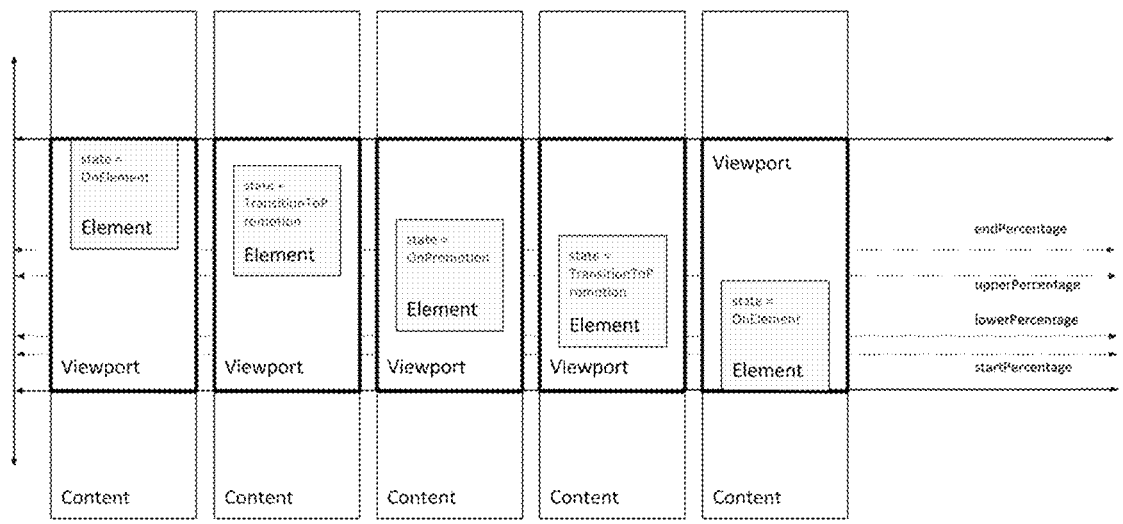
FIG. 29 illustrates the computation of an "overfly display" state depending on a scrolling percentage.

The portion of the overlay image depends on the illustration image frame scrolling percentage, named "scrollingPercentage", as illustrated in FIG. 29, and on the "scrollRanges" experience parameter, which an array of four increasing numbers, representing percentages, belonging to the [0, 100] range:
1. the first number is named the "startPercentage": when the scrollingPercentage is less than that value, the overlay image is not displayed, which corresponds to the "display" state set to "OnElement";
2. the second number is named the "lowerPercentage":
a. when the scrollingPercentage is greater than or equal to the "startPercentage" but less than that "lowerPercentage", the overlay image "upper part" is displayed over the illustration image, which corresponds to the "display" state set to "TransitionTo Promotion";
b. when the scrollingPercentage is greater than or equal to the "lowerPercentage" but less than or equal to the forthcoming "upperPercentage" value, the overlay image "middle part" is displayed over the whole illustration image frame, which corresponds to the "display" state set to "OnPromotion";
3. the third number is named the "upperPercentage": when the scrollingPercentage is greater than the "upperPercentage" but less than or equal to the forthcoming "endPercentage" value, the overlay image "lower part" is displayed over the illustration image, which corresponds to the "display" state set to "TransitionToPromotion";
4. the fourth number is named the "endPercentage": when the scrollingPercentage is greater than that value, the overlay image is not displayed, which corresponds to the "display" state set to "OnElement".

4) "OnElement" Display State

When the "display" state is set to "OnElement", the overlay image is not displayed at all, hence the end-user only sees the illustration image.

5) "OnPromotion" Display State

When the "display" state is set to "OnPromotion", the way the overlay image is displayed over the illustration image is described above in the "Overlay image dynamic display" section.

6) "TransitionToPromotion" Display State

Figure 30:
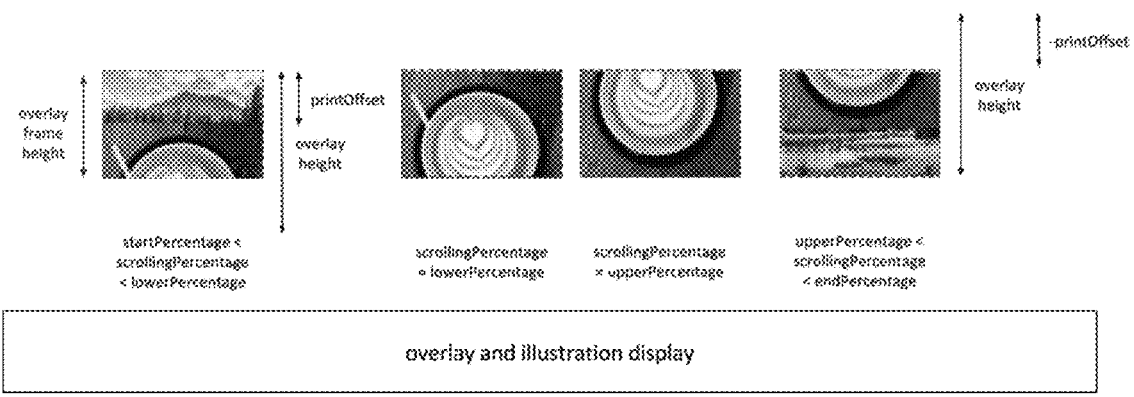
FIG. 30 illustrates a rendering scheme in a certain condition of a "display state"
Figure 31A:
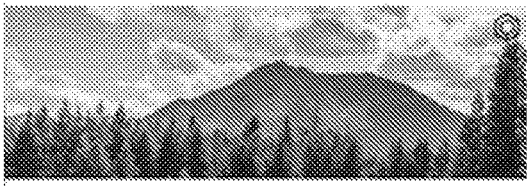
Figure 31B:
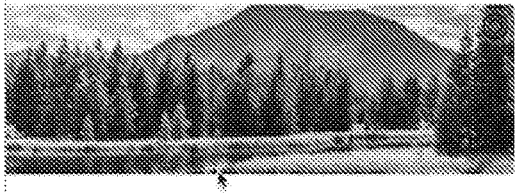
Figure 31C:
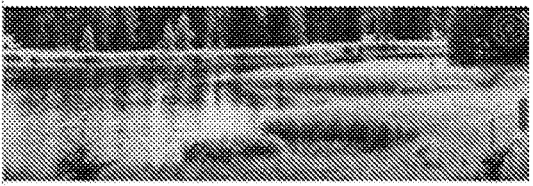
Figure 31D:
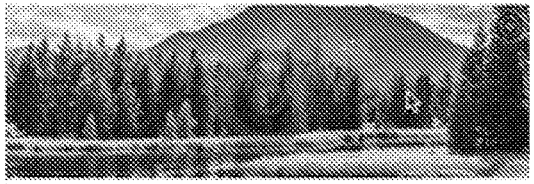
Figure 31I:
Figure 31J:
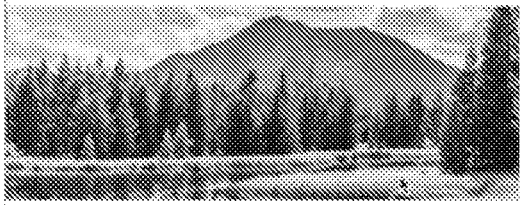
Figure 31K:
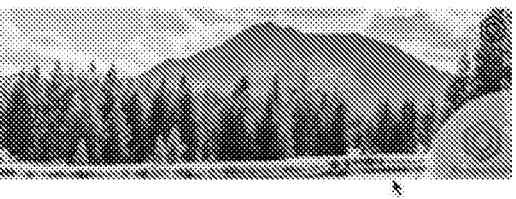

When the "display" state is set to "TransitionToPromotion", the overlay image will only cover a part of the illustration image, as shown in FIG. 30: it displayed over it from an offset relative to the overlay frame—let's name it "printOffset"—, which is vertical in case of a "larger ratio" case (recall that this happens when the image width/height ratio is greater for the illustration than for the promotion), and which is horizontal in case of "smaller ratio" case. This "printOffset" value is computed the following way:

printOffset=frameDimension−(scrollingPercentage−startPercentage)/(lowerPercentage−startPercentage)*frameDimension when visibilityPercentage<=lowerPercentage, printOffset=−overlayDimension+(endPercentage−scrollingPercentage)/(endPercentage−upperPercentage)*frameDimension when visibilityPercentage>=upperPercentage, where "frameDimension" and "overlayDimension" are respectively the overlay frame height and overlay height in case of a "larger ratio" situation, the overlay frame width and overlay width otherwise.

In addition, the experience applies on this overlay portion one of the four filters described in the "Overlay image appearance and disappearance transition animations" section dedicated to the Overlay experience, namely an opacity, grey, pixelation or noise effect, the "progressPercentage" parameter being defined as follows:

progressPercentage=(scrollingPercentage−startPercentage)/(lowerPercentage−startPercentage) when visibilityPercentage<=lowerPercentage, progressPercentage=(endPercentage−scrollingPercentage)/(endPercentage−upperPercentage) when visibilityPercentage>=upperPercentage.

7) Sticker Display

This experience integrates the "sticker" described above in the "Sticker display" section.

8) Promotion Click-to-Open Animation

This experience integrates a promotion click-to-open animation, as above described in the "Promotion "click-to-open" animation" section dedicated to the Overlay and Overfly experiences.

9) Promotion opening animation

This experience integrates a opening animation, as described above in the "Promotion opening animation" section dedicated to the Overlay and Overfly experiences.

10) Promotion Click-to-Action Animation

This experience integrates a click-to-action animation, as described above in the "Promotion click-to-action animation" section dedicated to the Overlay and Overfly experiences.

11) Promotion Clicking Action

This experience integrates a promotion clicking action mechanism, as described in the "Promotion clicking action" section dedicated to the Overlay and Overfly experiences.

12) Opened Promotion Closing Action

This experience integrates a promotion closing action mechanism, as described above in the "Opened promotion closing action" section dedicated to the Overlay and Overfly experiences.

13) Opened Promotion Closing Animation

This experience integrates a promotion closing animation, as described in the "Opened promotion closing animation" section dedicated to the Overlay and Overfly experiences.

14) Reminder Display

This experience integrates a reminder display mechanism, as described above in the "Reminder display" section dedicated to the Overlay and Overfly experiences.

V—the "Understitial" Experience

1) Overview

This experience displays a portion of an "image", that portion depending on the scroller position, i.e. as the end-user scrolls up and down the content on which it is displayed. Its "type" parameter is equal to "understitial". At any time, the end-user may click on it, which will expanse it, revealing its entire estate. If the end-user clicks again on it while being expended, a content will be opened. If the end-user scrolls again while the image is expended, the image shrinks again to its original size, revealing an optional reminder.

This experience is very similar to the Overlay and Overfly experiences when their "display" state is "OnPromotion", if you consider the "image" to be the "overlay": in the case of the Understitial rendering, there is no promotional image, but just an image, but the way this image is displayed is very similar to the way the Overlay and Overfly promotional image/overlay image is displayed. Likewise, the "image" may be clicked, extended so as to be fully displayed, clicked again and closed.

The experience image is defined via its URL, through the "source" parameter, which means that the SDK does not take into account the "img" "src" attribute, which should not be defined in order to prevent from experiencing a flickering effect when the SDK will replace this HTML element by the newly created HTML canvas.

2) Rendering

Two exemplary renderings of this experience, i.e. "Vertical Understitial" and "Horizontal Understitial", are shown in FIGS. 31A-31K and 32A-32D of the drawings, respectively.

3) Loading and Workflow States

The SDK maintains the common "load" state described above in the "The "load" state" section.

The created HTML5 canvas has the same width "imageWidth" as the "img" HTML element, its height being equal to imageWidth*percentage where "percentage" is a parameter dedicated to the Understitial experience, a number greater than 0 and less than or equal to 100. This means that the canvas frame height which is used to display the experience is smaller than the image height.

Provided the "percentage" is less than 100, in which case the experience does not offer any extension feature, The SDK maintains another internal additional "extension" state for the experience, which indicates whether it is extended.

Figure 33:
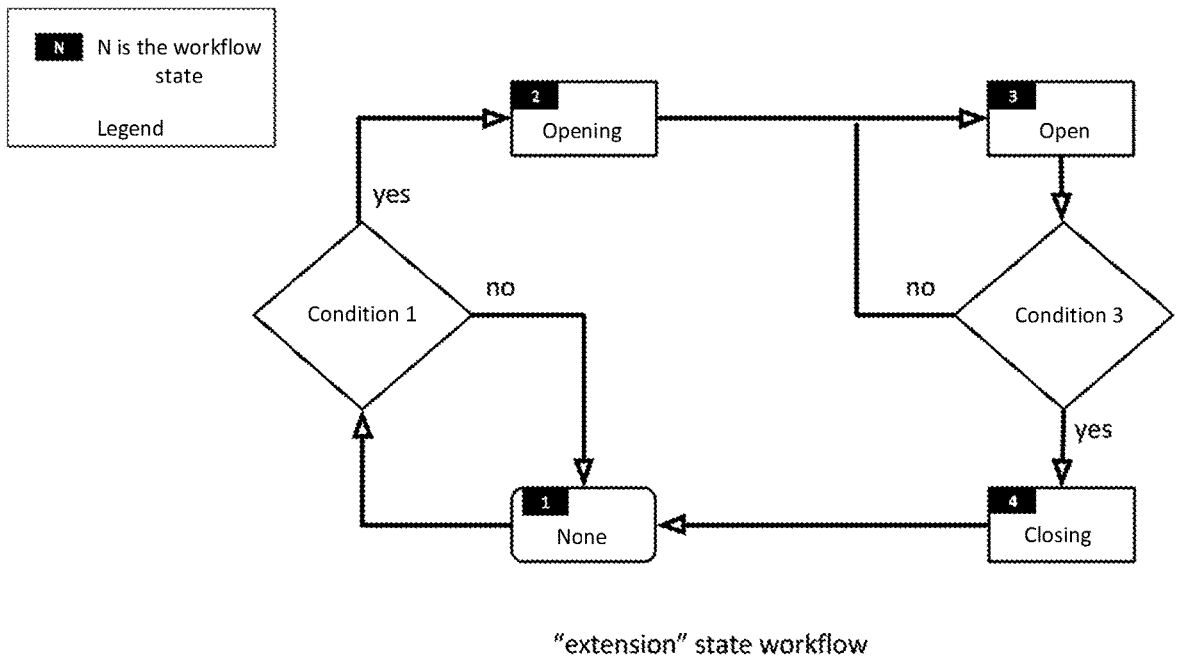
FIG. 33 shows a workflow for the determination of an "Extension" state variable.
Figure 34A:
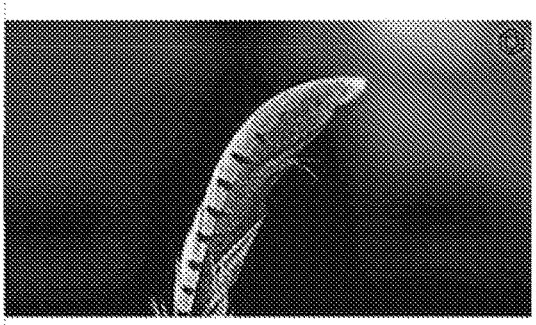
FIGS. 34A-34G illustrate different display renderings in a "lenticular" user experience.
Figure 34B:
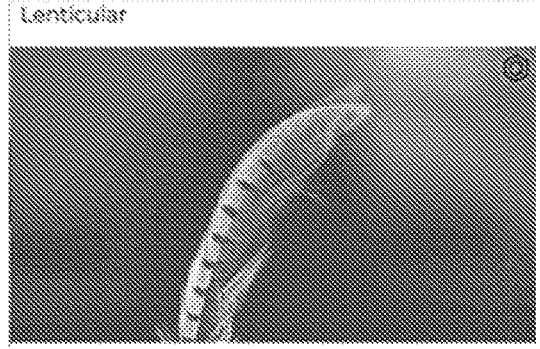
Figure 34C:
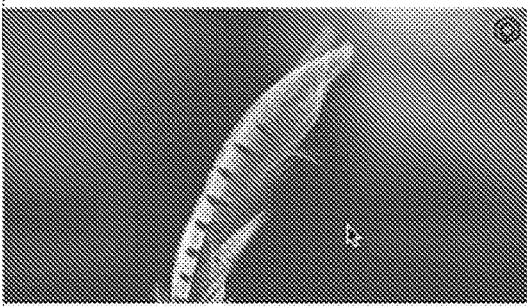
Figure 34D:
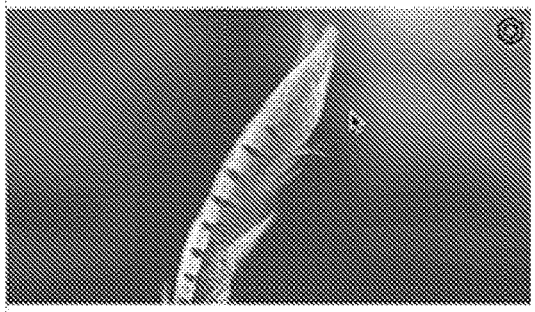
Figure 34E:
Figure 34F:
Figures 34G, 35A, 35B:
FIGS. 35A-35E illustrate different display renderings in a "scrolltoon" user experience.
Figure 35C:
Figure 35D:
Figure 35E:
Figure 36E:
Figure 36F:

Herebelow are the possible values of the "extension" state, as illustrated in FIG. 33.

1. "None": this is the initial state, which remains as long as the "load" state is not equal to "Ready". When the state is set or reset to that value, a click-to-open animation is being run once, as described in the "Click-to-open animation" section. As soon as the end-user clicks on the image, described in the "Opening animation" section, the state transitions to "Opening".

2. "Opening": this is a transient state which lasts as long as the animation, described in the "Opening animation" section, is running. Once completed, the state promotes to the "Open" state.

3. "Open": this is a state which remains as long as the end-user has not performed an action, described in the "Closing action", to close the opened promotion; in that latter case, it transitions to "Closing". As soon as the experience reaches that state, a click-to-action animation is run, as described in the "Click-to-action animation" section. The end-user may perform a specific action described in the "Clicking action" section.

4. "Closing": this is a transient state which lasts as long as the animation, described in the "Closing animation" section, is running. Once this animation is over, the state reverts to"None".

4) Image Dynamic Display

The portion of the image displayed, i.e. displayed over the frame, depends on the scroller position, a "gravityPercentage" experience parameter which is a number belonging to ]0, 100[ representing the percentage from the image top edge where its visual gravity center is supposed to be located, and on the "scrollRanges" parameter, which an array of three increasing numbers representing percentages, belonging to [0, 100]. The experience displays a kind of vertical parallax effect:

1. the first number is named the "minimumPercentage": when the scrollingPercentage is less than that value, the image will be displayed over the frame in a fixed way so that the bottom edge of the image matches the canvas frame bottom edge;
2. the second number is named the "centerPercentage":
    a. when the scrollingPercentage is greater than or equal to the "minimumPercentage" but less than "centerPercentage", the image "upper part" is displayed with a vertical offset equal to (scrollingPercentage−minimumPercentage)/(centerPercentage−minimumPercentage) *gravityPercentage*imageHeight, so that, when the scrollingPercentage is equal to centerPercentage, the display portion of the image is centered vertically on its declared gravity;
    b. when the scrollingPercentage is greater than or equal to "centerPercentage" but less than or equal to the forthcoming "maximumPercentage" value, the image "bottom part" is displayed with a vertical offset equal to (((scrollingPercentage−centerPercentage)/(maximumPercentage−centerPercentage))*(1−gravityPercentage)+gravityPercentage)*imageHeight;
3. the third number is named the "maximumPercentage": when the scrollingPercentage is greater than that value, the image will be displayed over the frame in a fixed way so that the top edge of the image matches the canvas frame top edge.

5) Sticker Display

This experience integrates the "sticker" described in the general "Sticker display" section.

6) Click-to-Open Animation (Note: in this experience and the next ones, the mention about the "display" state should be ignored here and, the "overlay" should be considered as the "image".)

This experience integrates a promotion click-to-open animation, similar to the Overlay and Overfly experiences, described in the "Promotion click-to-open animation" section.

7) Opening Animation

This experience integrates a opening animation, similar to the Overlay and Overfly experiences, described in the "Promotion opening animation" section.

8) Click-to-Action Animation

This experience integrates a click-to-action animation, similar to the Overlay and Overfly experiences, described in the "Promotion click-to-action animation" section.

9) Clicking Action

This experience integrates a clicking mechanism, similar to the Overlay and Overfly experiences, described in the "Promotion clicking action" section.

10) Closing Action

This experience integrates a closing action mechanism, similar to the one used in the Overlay and Overfly experiences as described above in the "Opened promotion closing action" section.

11) Closing Animation

This experience integrates a closing animation, similar to the one used in the Overlay and Overfly experiences described above in the "Opened promotion closing animation" section.

12) Reminder Display

This experience integrates a reminder display mechanism, similar to the one used in the Overlay and Overfly experiences and described in the "Reminder display" section. It should be considered here that a virtual "display" state was set to "OnElement" and went through the "OnPromotion" state if and only if the "extension" state went through the "Open" state.

VI—The "Lenticular" user experience

1) Overview

This experience consists in reproducing the physical lenticular effect (e.g. as described at https://en.wikipedia.org/wiki/Lenticular_lens), namely that the image displayed to the end-user progressively changes as the user looks at it from different angles. Its "type" parameter is equal to "lenticular". This experience uses the orientation on devices equipped with a gyroscope, uses the scroller position otherwise. If the end-user clicks on the image, a content will be opened.

2) Rendering

This experience from an end-user point of view is illustrated in FIGS. 34A-34G. The experience exposes a "sources" parameter which contains a series of images instead of a single "source" parameter: this "sources" parameter is an array of image URLs which compose the lenticular effect images. Those images are supposed to have all the same width over height ratio but do not necessarily need to have the same dimensions.

3) Loading and Workflow States

The SDK maintains the common "load" state described in the "The "load" state" section. However, during the 2.a. step, the SDK downloads in parallel the "sources" images with a rePictuR "render" parameter set to "inbox", with a width set to the HTML "img" width and a 0 height.

The HTML5 canvas frame dimensions on which the experience will run have a width equal to the "img" HTML element with and a height which is equal to the first "sources" downloaded image via the rePictuR service.

As soon as the experience is loaded, i.e. the "load" state comes through the "Ready" value, the experience will start listening to the device gyroscope, if available: if the device has a gyroscope, the scroller position is ignored, if not, the experience will listen to the scroller position.

4) Image Dynamic Display

The experience displays on its frame a composition of two consecutive images depending on the gyroscope orientation when the device is equipped with one, and on the scroller position for the other devices: at every rendering of the experience, which occurs whenever the gyroscope gamma (cf. explanation at https://developer.mozilla.org/en-US/docs/Web/API/Detecting device orientation changes or when the scroller position changes, the experience computes an image index "imageIndex", an integer greater than or equal to 0 and less than or equal to the number of images, "imagesCount", minus one; it clears the frame and then displays the first of the two images, at position "imageIndex" in the array, with an opacity equal to "firstOpacity" and then the second image, at position "(imageIndex+1) % imagesCount" in the array (% is the modulo operator), with an opacity equal to "secondOpacity".

The experience exposes an additional "steps" parameter, an integer ranging from 1 to 100, which enables to tune how many different intermediate compositions must be rendered between two consecutive images.

An intermediate variable named "sensorIndex", which will be used to compute the "imageIndex" and the "firstOpacity" and "secondOpacity" variable, is computed the following way:

if the device is equipped with a gyroscope, it is equal to Math.round((Math.abs(gamma) % fullSwingInDegree)/(fullSwingInDegree/((imagesCount−1)*steps)))), where "gamma" is the gyroscope gamma, "fullSwingInDegree" is a constant number set to 35;

if the device has no gyroscope, it is equal to Math.round((imagesCount−1)*steps scrollingPercentage).

The "imageIndex" is equal to Math.floor(((((sensorIndex % (casesCount))+casesCount)) % casesCount)/steps) % imagesCount) where "casesCount" is a variable equal to "steps*imagesCount", which represents the number of different possible renderings for the experience;

The "firstOpacity" is equal to 1−((((sensorIndex % steps)+steps) % steps)/steps);

The "secondOpacity" is equal to 1−firstOpacity, which involves that the opacity of the second image is the opposite of the first image.

The way the two consecutive images are selected and their opacity enable to reproduce the lenticular effect, because each rendering is a composition of the display of the two images, one over the other, with an opacity such as the end-user switches from one image to another with a smoothing effect.

The result is depicted in FIG. 23, which is the same as the one that may be used by the Overlay and Overfly experiences when they use the "opacity" animation described in the "Opacity transition animation" section, where the mentioned "opacity" variable should be interpreted as the "firstOpacity" (hence, for the second image, secondOpacity=1−opacity as described in the section).

5) Sticker Display

This experience integrates the "sticker" described above in the "Sticker display" section.

6) Clicking Action

The experience offers the mechanism described above in the "Clicking action" section.

VII—The "Scrolltoon" experience

1) Overview

This experience consists in displaying a short video animation with no sound (an animated GIF image or a video), which is played at a speed depending on the scroller position change speed and reversely if the scroller position decreases, which offers a video scrubbing effect and makes the reader responsible for playing the video sequence in response to vertical scrolling. Its "type" parameter is equal to "Scrolltoon". If the end-user clicks on the image, a content will be opened.

2) Rendering

An exemplary rendering of this experience is shown in FIGS. 35A-35E of the drawings.

3) Loading and Workflow States

The SDK maintains the common "load" state described above in the "The "load" state" section. The "source" parameter must be an animated image encoded as an animated GIF animated (cf. https://fr.wikipedia.org/wiki/Graphics_Interchange_Format), made of at least two images (frames). During the 2.a. step, the SDK downloads the resized animated image with a rePictuR "render" parameter set to "inbox", with a width set to the HTML "img" width and a height set to the HTML "img" height.

The HTML5 canvas frame dimensions on which the experience will run have a width equal to the "img" HTML element with and a height which is equal to the "source" downloaded image via the rePictuR service.

Since the animated GIF image may take much time to decompress and analyze, this process should be performed as a background task, in order to prevent the user interface from freezing.

4) Image Dynamic Display

Every time the scroller position changes, the frame is cleared and the experience displays on it the image at position "imageIndex", an integer greater than or equal to 0 and less than "imagesCount" where "imageCount" is the number of images within the animated GIF image, which depends on the scroller position and on the "scroll Ranges" experience parameter, which is an array of two increasing numbers "minimumPercentage" and "maximumPercentage" belonging to ]0, 100[ representing the lower and upper percentages from which the experience starts being animated, and which enable to compute the frame scroll-ranged percentage "scrollRangedPercentage". "imageIndex" is equal to Math.round((imagesCount−1)*scrollRangedPercentage): this means that when the "scrollingPercentage" is less than "minimumPercentage" the first animation image is displayed, when the "scrollingPercentage" is greater than "maximumPercentage" the last animation image is displayed, otherwise the interpolated image index is displayed.

This way, the end-user is given the impression to play the animation by scrolling and to reverse the animation when scrolling upwards, hence to scrub a video.

5) Sticker Display

This experience integrates the "sticker" described above in the "Sticker display" section.

6) Clicking Action

The experience provides the mechanism described above in the "Clicking action" section.

VIII—the "Scravelling" User-Experience

1) Overview

This experience consists in displaying the fragment of an image depending on the scroller position, focusing successively on some declared points of interest. Its "type" parameter is equal to "Scravelling". If the end-user clicks on the image, a content will be opened.

2) Rendering

An exemplary rendering of this experience is shown in FIGS. 36A-36F of the drawings.

3) Loading and Workflow States

The SDK maintains the common "load" state described in the "The "load" state" section. During the 2.a. step, the SDK downloads the resized animated image with a rePictuR "render" parameter set to "outbox", with a width set to the HTML "img" width and a height set to the HTML "img" height.

The HTML5 canvas frame dimensions on which the experience will run have a width equal to the "img" HTML element with and a height which is equal to the "source" downloaded image via the rePictuR service. This means that the frame width over height ratio may not be the same as the image width over height ratio. Let's name "frameWidth" the frame width and "frameHeight" the frame height.

4) Image Dynamic Display

Every time the scroller position changes, the frame is cleared and the experience displays on it a portion of the image which depends on the scroller position, and on the experience "pois", "zoom Factor" and "scroll Ranges" parameters. This portion is a sub-rectangle of the image having the same width-over-height ratio as the frame, defined by the coordinates of a top-left corner and a width and height pair which indicate its width and height: this sub-rectangle is displayed over the entire frame, by stretching it, while preserving its width-over-height ratio: let's name "x" and "y" the coordinates of the top-left corner and "width" and "height" the two previous dimensions.

5) Computer Program Implementation

The "pois" parameter is an array of "poisCount" objects which represents Points Of Interests (POI); each object/POI exposes two attributes "poi.x" and "poi.y" which are numbers ranging from 0 to 1, which represent respectively the percentage of the image width and height where the POI is located from the top-left corner of the image.

The "zoomFactor" parameter is a number greater than 1, which indicates how much the experience must zoom over each POI, compared to its natural zoom factor of 1.

The "scrollRanges" parameter, which is an array of 2+poisCount increasing numbers belonging to [0, 100] representing the lower and upper percentages from which the image starts and stops being travelled, and at which scroller position the $n^{th}$ POI focus is maximum. Let's name "starPercentage" and "endPercentage" the numbers respectively at position 0 and poisCount−1.

At every scroller position change, the way the "x", "y", "width" and "height" of the sub-rectangle displayed over the entire frame surface, i.e. the point with coordinates (x, y) on the image being displayed at coordinates (0, 0) on the frame and the point (x+width, y+height) being displayed at coordinates (frameWidth, frameHeight). We define the following constants:

"doubleZoomFactor" equal to zommFactor*2,

"zoomedWidth" equal to frameWidth/zoom Factor,

"zoomedHeight" equal to frameHeight/zoom Factor,

"halfZoomedWidth" equal to frameWidth/doubleZoomFactor,

"halfZoomedHeight" equal to frameHeight/doubleZoomFactor,

"secondPercentage" being the value of the "scrollRanges" number at position 1, i.e. the second number in the array, "penultimatePercentage" being the value of the "scrollRanges" number at position poisCount−2, i.e. the penultimate number in the array.

A ternary operator "?" (cf. https://en.wikipedia.org/wiki/%3F:) is also used the forthcoming formulas. Those variables are computed as follows:

when the "scrollingPercentage" is less than or equal to "secondPercentage", the experience starts focusing and zooming on the first POI, we consider the POI "poi" at position 0, i.e. the first POI, the "phasePercentage" constant being equal to Math.max(0, (scrollingPercentage−startPercentage)*(1/(secondPercentage−startPercentage))):

x=(Math.max(0, ((poi.x*imageWidth−halfZoomedWidth)<0?1/doubleZoomFactor: ((poi.x*imageWidth+halfZoomedWidth)>imageWidth?1−1/doubleZoomFactor: poi.x))*imageWidth−halfZoomedWidth))*phasePercentage, y=(Math.max(0, ((poi.y*imageHeight−halfZoomedHeight)<0?1/doubleZoomFactor: ((poi.y*imageHeight+halfZoomedHeight)>imageHeight?1−1/doubleZoomFactor: poi.y))*imageHeight halfZoomedHeight))*phasePercentage, width=frameWidth+(zoomedWidth−frameWidth)*phasePercentage, height=frameHeight+(zoomedHeight−frameHeight)*phasePercentage;

when the "scrollingPercentage" is greater than or equal to "penultimatePercentage", the experience starts focusing and zooming on the last POI, we consider the POI "poi" at position poisCount−1, i.e. the last POI, the "phasePercentage" constant being equal to Math.min (1, (scrollingPercentage−penultimatePercentage)/(endPercentage−penultimatePercentage)):

x=startX−(startX−(imageWidth−frameWidth))*phasePercentage where startX=Math.max(0, Math.min(imageWidth, ((poi.x*imageWidth−halfZoomedWidth)<0?1/doubleZoom Factor:((poi.x*imageWidth+halfZoomedWidth)>imageWidth?1−1/doubleZoomFactor: poi.x))*imageWidth+halfZoomedWidth)−startWidth), y=startY−(startY−(imageHeight−frameHeight))*phasePercentage where startY=Math.max(0, Math.min(imageHeight, ((poi.y*imageHeight−halfZoomedHeight)<0?1/doubleZoomFactor: ((poi.y*imageHeight+halfZoomedHeight)>imageHeight?1−1/doubleZoomFactor: poi.y))*imageHeight+halfZoomedHeight)−startHeight), width=frameWidth+(zoomedWidth−frameWidth)*phasePercentage, height=frameHeight+(zoomedHeight−frameHeight)*phasePercentage;

when the "scrollingPercentage" is greater than "secondPercentage" and less than "penultimatePercentage", the experience focuses successively to all the POIs except the first and the last. Since the formulas are too long to explicit, herebelow is the JavaScript code which computes the "x", "y", "width" and "height" variables, where the "[n]" operator returns the element at position n in an array, ".length" is a function which returns the numbers of items in an array:

```
var innerPercentage = scrollingPercentage;
var innerStartPercentage = scrollRanges[1];
var innerEndPercentage = scrollRanges[2];
var startPoiIndex = 0;
for (var rangeIndex = 1; rangeIndex < scrollRanges.length − 2; rangeIndex++)
{
if (scrollingPercentage <= scrollRanges[rangeIndex + 1])
{
   break;
}
startPoiIndex++;
innerStartPercentage = scrollRanges[rangeIndex];
innerEndPercentage = scrollRanges[rangeIndex + 1];
}
innerStartPercentage = innerStartPercentage;
innerEndPercentage = innerEndPercentage;
var middlePercentage = (innerStartPercentage + innerEndPercentage) / 2;
var startPoi = pois[startPoiIndex];
var endPoi = pois[startPoiIndex + 1];
var startFixedPoi = {
x: (startPoi.x * imageWidth − halfZoomedWidth ) < 0 ? 1 / doubleZoomFactor : ((startPoi.x *
imageWidth + halfZoomedWidth ) > imageWidth ? 1 − 1 / doubleZoomFactor : startPoi.x),
y: (startPoi.y * imageHeight − halfZoomedHeight ) < 0 ? 1 / doubleZoomFactor : ((startPoi.y *
imageHeight + halfZoomedHeight ) > imageHeight ? 1 − 1 / doubleZoomFactor : startPoi.y)
};
var endFixedPoi = {
x: (endPoi.x * imageWidth − halfZoomedWidth ) < 0 ?1 / doubleZoomFactor : ((endPoi.x * imageWidth
+ halfZoomedWidth ) > imageWidth ? 1 − 1 / doubleZoomFactor : endPoi.x),
y: (endPoi.y * imageHeight − halfZoomedHeight ) < 0 ? 1 / doubleZoomFactor : ((endPoi.y *
imageHeight + halfZoomedHeight ) > imageHeight ? 1 − 1 / doubleZoomFactor : endPoi.y)
};
var left = startFixedPoi.x <= endFixedPoi.x ? startFixedPoi.x : endFixedPoi.x;
var right = startFixedPoi.x > endFixedPoi.x ? startFixedPoi.x : endFixedPoi.x;
var top = startFixedPoi.y <= endFixedPoi.y ? startFixedPoi.y : endFixedPoi.y;
var bottom = startFixedPoi.y > endFixedPoi.y ? startFixedPoi.y : endFixedPoi.y;
var canvasRatio = frameWidth / frameHeight;
var frameRatio = ((right − left ) / (bottom − top));
var idealFrameWidth = Math.min(imageWidth, right * imageWidth + halfZoomedWidth) −
Math.max(0, left * imageWidth − halfZoomedWidth);
var idealFrameHeight = Math.min(imageHeight, bottom * imageHeight + halfZoomedHeight) −
Math.max(0, top * imageHeight − halfZoomedHeight);
var xOffset;
var yOffset;
if (innerPercentage < middlePercentage)
{
phasePercentage = (innerPercentage − innerStartPercentage) / (middlePercentage −
innerStartPercentage);
startWidth = zoomedWidth;
startHeight = zoomedHeight;
if (frameRatio >= canvasRatio)
{
   endWidth = idealFrameWidth;
   endHeight = endWidth / canvasRatio;
   xOffset = 0;
   yOffset = (idealFrameHeight − endHeight) * phasePercentage;
}
else
{
   endHeight = idealFrameHeight;
   endWidth = endHeight * canvasRatio;
   xOffset = (idealFrameWidth − endWidth) * phasePercentage;
   yOffset = 0;
}
width = startWidth + (endWidth − startWidth) * phasePercentage;
height = startHeight + (endHeight − startHeight) * phasePercentage;
x = Math.max(0, startFixedPoi.x <= endFixedPoi.x ? (startFixedPoi.x * imageWidth −
halfZoomedWidth + xOffset) : (Math.min(imageWidth, startFixedPoi.x * imageWidth +
halfZoomedWidth) − width + xOffset));
y = Math.max(0, startFixedPoi.y <= endFixedPoi.y ? (startFixedPoi.y * imageHeight −
halfZoomedHeight + yOffset) : (Math.min(imageHeight, startFixedPoi.y * imageHeight +
halfZoomedHeight) − height + yOffset));
}
else
{
phasePercentage = (innerPercentage − middlePercentage) / (innerEndPercentage −
middlePercentage);
if (frameRatio >= canvasRatio)
{
   startWidth = idealFrameWidth;
   startHeight = startWidth / canvasRatio;
   xOffset = 0;
```

```
  yOffset = startFixedPoi.y <= endFixedPoi.y ? 0 : 2 * ((idealFrameHeight - startHeight) * (1 -
phasePercentage));
}
else
{
  startHeight = idealFrameHeight;
  startWidth = startHeight * canvasRatio;
  xOffset = startFixedPoi.x <= endFixedPoi.x ? 0 : (2 * ((idealFrameWidth - startWidth) * (1 -
phasePercentage)));
  yOffset = 0;
}
endWidth = zoomedWidth;
endHeight = zoomedHeight;
width = startWidth - (startWidth - endWidth ) * phasePercentage;
height = startHeight - (startHeight - endHeight ) * phasePercentage;
x = Math.max(0, startFixedPoi.x <= endFixedPoi.x ? (Math.min(imageWidth, endFixedPoi.x *
imageWidth + halfZoomedWidth) - width + xOffset) : (endFixedPoi.x * imageWidth -
halfZoomedWidth + xOffset));
y = Math.max(0, startFixedPoi.y <= endFixedPoi.y ? (Math.min(imageHeight, endFixedPoi.y *
imageHeight + halfZoomedHeight) - height + yOffset) : (endFixedPoi.y * imageHeight -
halfZoomedHeight + yOffset));
}
```

In this way, the end user is given the impression that she performs a travelling inside the image while zooming successfully on the points of interest as she scrolls up and down the content.

6) Sticker Display

This experience integrates the "sticker" described above in the "Sticker display" section.

7) Clicking Action

The experience offers the mechanism described above in the "Clicking action" section.

The present invention is not limited to the embodiments described above and illustrated in the drawings, but the skilled person will be able to devise numerous variants and modifications.

More particularly:
- although the above description refers to a vertical scroller, the invention can also be used with a horizontal scroller, or with a horizontal+vertical scroller,
- as discussed at some points of the description, the input data can be among others, in addition to scrolling data or alternatively to scrolling data, position or movement or acceleration data (in translation and/or in rotation), e.g. as provided by the motion sensor units (accelerometers and/or gyroscopes) of commercial smart devices.

The invention claimed is:

1. A method for generating a dynamic display rendering in a viewing area of a display of a smart device, comprising the following steps:
providing a main content from a source for display in the viewing area,
displaying said main content,
providing input data for causing a movement of the main content displayed in the viewing area,
providing at least one alternative content distinct from the main content, said main content comprising a plurality of content particles each having associated thereto its own set of substitution parameters,
in response to a substitution input variable in combination with substitution parameters embedded in said main content and associated with the respective content particles, dynamically substituting to at least one element of the main content a modified element containing at least part of said alternative content, and
displaying said main content with the modified element.

2. The method according to claim 1, wherein said substitution input variable is derived from the current position of a given portion of the main content relative to the viewing area when the content moves inside the viewing area in response to input data.

3. The method according to claim 2, wherein said element of the main content is an image or a pointer to an image, embedded in the main content.

4. The method according to claim 3, wherein said dynamic substitution step comprises providing predetermined element substitutions for given value of the substitution input variable, and further comprises a step of interpolating between said predetermined element substitutions for an intermediate value of the substitution input variable.

5. A The method according to claim 1, wherein said substitution input variable is derived from data selected in a group comprising user input data and time data.

6. The method according to claim 5, comprising a step of selectively overriding a time-related substitution input variable with a user input-related substitution variable.

7. The method according to claim 5, wherein said user input data are selected in a group comprising data for content scrolling, user position or motion data, and smart device position or motion data caused by a user.

8. The method according to claim 7, wherein said user input data comprise content scrolling data, said alternative content comprises a video content, and said dynamic substitution comprises scrubbing through said video content in response to variation of the substitution input variable.

9. The method according to claim 1, wherein said main content comprises a marked-up content such as a HyperText Markup Language, abbreviated as HTML, content.

10. The method according to claim 9, wherein said substitution parameters are embedded in said marked-up content in association with at least one image tag of the element in said main content.

11. The method according to claim 10, wherein the dynamically substitution step comprises an initial step of substituting to said image tag an image content tag inside which the dynamic substitution is performed.

12. The method according to claim 1, wherein said dynamic substitution step is performed by a dedicated rendering program package downloaded from a source associated with the main content.

13. A system for dynamic display rendering, comprising:
a source for providing a main content,
   a source for providing an alternative content distinct from the main content, said alternative content comprising a plurality of content particles each having associated thereto its own set of substitution parameters,
   a smart device in communications with said sources and having a display defining a viewing area, a display processor for displaying and moving the main content in the viewing area in response to input data, said smart device further comprising a rendering engine adapted, in response to a substitution input variable in combination with substitution parameters embedded in said main content and associated with the respective content particles, to dynamically substitute to at least one element of said main content a modified element containing at least part of said alternative content, for display by means of said display processor.

14. A The system according to claim 13, wherein said rendering engine is capable, from predetermined element substitutions for given value of the substitution input variable, of interpolating between said predetermined element substitutions for an intermediate value of the substitution input variable.

15. The system according to claim 13, wherein said rendering engine is a dedicated rendering program package downloaded from a source associated with the main content.

16. A smart device with display rendering capability, said device being capable of communicating with a source for providing a main content and a source for providing an alternative content distinct from the main content, said alternative content comprising a plurality of content particles each having associated thereto its set of substation parameters, said smart device comprising a display defining a viewing area, a display processor for displaying and moving the main content display in the viewing area in response to input data, and a rendering engine adapted, in response to a substitution input variable in combination with substitution parameters embedded in said main content and associated with the respective content particles, to dynamically substitute to at least one element of the main content a modified element containing at least part of said alternative content, for display by said display processor.

17. A marked-up digital content, containing at least one displayable element or a pointer to such element, and associated thereto, at least a description of, or pointer to, an alternative digital content and a set of substitution parameters, for use by a smart device according to claim 16 for generating therein a dynamic substitution of said content.

18. The marked-up digital content according to claim 17, wherein said substitution parameters comprise a substitution type and substitution rendering parameters.

19. The marked-up content according to claim 17, wherein said substitution parameters are contained in a tagged area associated with the displayable element.

* * * * *